United States Patent [19]

Shimizu et al.

[11] Patent Number: 5,787,310
[45] Date of Patent: Jul. 28, 1998

[54] MICROCOMPUTER

[75] Inventors: Toru Shimizu; Katsunori Sawai; Yukihiko Shimazu; Masaki Kumanoya; Katsumi Dosaka, all of Itami, Japan

[73] Assignee: Mitsubishi Denki Kabushiki Kaisha, Tokyo, Japan

[21] Appl. No.: 500,039

[22] Filed: Jul. 10, 1995

[30] Foreign Application Priority Data

Jan. 31, 1995 [JP] Japan ................. 7-014605

[51] Int. Cl.$^6$ .................. G06F 9/02; G06F 9/06; G06F 12/06
[52] U.S. Cl. ............ 395/862; 365/189.02; 364/DIG. 1; 364/DIG. 2
[58] Field of Search ............. 395/800, 394, 395/280, 189.03, 189.04, 430, 481, 421.07, 862, 281, 310, 309; 365/185.06, 185.13, 230.03, 195, 205, 218, 185.09, 185.17, 189.01, 200, 149, 102, 189.05, 189.02; 364/491, DIG. 1, 489, DIG. 2, 786; 257/208; 437/209, 217, 219; 371/10.2

[56] References Cited

U.S. PATENT DOCUMENTS

| | | | |
|---|---|---|---|
| 4,636,965 | 1/1987 | Smith et al. | 314/491 |
| 4,852,016 | 7/1989 | McGehee | 364/491 |
| 4,945,469 | 7/1990 | Yamada | 395/800 |
| 4,994,411 | 2/1991 | Naito et al. | 437/209 |
| 5,017,993 | 5/1991 | Shibata | 357/40 |
| 5,025,368 | 6/1991 | Watanabe | 395/800 |
| 5,257,234 | 10/1993 | Matsuo et al. | 365/185.06 |
| 5,581,503 | 12/1996 | Matsubara et al. | 365/185.33 |

FOREIGN PATENT DOCUMENTS

| | | |
|---|---|---|
| 0 584 783A2 | 3/1994 | European Pat. Off. |
| 63-81569 | 4/1988 | Japan |

(List continued on next page.)

OTHER PUBLICATIONS

European Search Report dated May 27, 1997.

Jouppi et al., "Designing, Packaging, and Testing a 300–MHz, 115W ECL Microprocessor", 8207 IEEE Micro, Apr. 14, 1994, No. 2., pp. 50–58.

Joe Brewer et al., "A Single–Chip Digital Signal Processing Subsystem", Proceedings of the Annual International Conference on Wafer Scale Integration, Jan. 19–21, 1994, pp. 265–272.

"MCS–96 8X9X Architectural Overview", 1991, Intel 16 Bit Embedded Controller Handbook.

"A Concurrent Operating CDRAM for Low Cost Multi-Media," by Akira Yamazaki et al., Mitsubishi Electric Engineering Co., Ltd., pp. 61–62.

PRAM: Parallel Processing Random Access Memory & Practical Parallel Random Access Machine, by Kazuaki Murakami et al., Department of Information Systems, Interdisciplinary Graduate School of Engineering Sciences, Kyushu University.

"A 100 MHz 4Mb Cache DRAM with Fast Copy–Back scheme," by K. Dosaka et al., Mitsubishi Electric Engineering Corp. pp. 27–34.

"A 100–MHz 4–Mb Cache DRAM with Fast Copy–Back Scheme," by Katusmi Dosaka et al., *IEEE Journal of Solid–State Circuits*, vol. 27, No. 11, Nov. 1992.

"A Cache DRAM for Graphic Application" by Akira Yamazaki et al., The Institute of Electronics, Information and Communication Engineers.

M16/10 Group, Users Manual, Mitsubishi Electric Corporation, 1995.

*Primary Examiner*—Daniel H. Pan
*Attorney, Agent, or Firm*—McDermott, Will & Emery

[57] ABSTRACT

A microcomputer which comprises a processor and a memory integrated on one chip wherein the memory is arranged in a plurality of memory cell region rows, and a processor is arranged between the memory cell region rows. A microcomputer wherein the memory cell regions are connected to each other row by row through a bus each of which is connected to the processor.

13 Claims, 59 Drawing Sheets

FOREIGN PATENT DOCUMENTS

| | | |
|---|---|---|
| 4-247535 | 9/1992 | Japan . |
| 5-94366 | 4/1993 | Japan . |
| 5-160265 | 6/1993 | Japan . |
| 5-166902 | 7/1993 | Japan . |
| 5-299968 | 11/1993 | Japan . |
| 5-310130 | 11/1993 | Japan . |

MICROCOMPUTER

BACKGROUND OF THE INVENTION

1. Field of the Invention

The present invention relates generally to a microcomputer which includes a processor and a memory integrated on the same chip, and more particularly to a layout for mounting a general purpose processor and a general purpose memory having a large capacity on the same chip.

2. Description of the Related Art

An integration of a general purpose processor and a general purpose memory having a large capacity on one chip provides a merit in that the integration leads to an improved processing capability of the general purpose processor and reduced cost. However, general purpose processors are basically different in the manufacturing process and designing technique from general purpose large capacity memories, so that it is difficult to combine them on the same chip as they are.

First, the manufacturing process will be explained: Although the memory has at most two wirings in the form of layers, many steps are employed due to a finely configured memory cell. On the other hand, a processor often employs a multi-layer wiring to improve the degree of integration.

Next, the designing technique will be explained: The layout of a memory is designed to optimize analog characteristics such as cell capacity and wiring delay, so that changing the layout requires a longer period and a higher cost. FIG. 1 shows an example of the layout of a 16-Mbit DRAM. A common 16-Mbit DRAM has 4-Mbit cell regions arranged in the form of array. On the other hand, with regard to a processor, particularly a control logic unit a CAD tool (automatic arranging/wiring tool) is utilized which allows the layout to be automatically formed in a given region. It means that the processor has a high degree of freedom for changing layout.

As an idea of achieving one chip on which general purpose processors and large capacity memories are integrated under such a condition as described above, the following method can be considered. The manufacturing process technique employs the technique for the memory as a base, and the layout also employs it in memory cell regions without being changed. The processor is made as small as possible so as to reduce an effect of worsening characteristics due to the fact that the manufacturing process technique is based on the memory. Utilizing the degree of freedom for changing the layout, the processor is arranged in a gap in the memory.

For example, in "Proposal of a New General purpose Functional Parts PPRAM toward the 21st Century, by Murakami et al., Computer Architecture Research Report No. 108, 94-ARC-108, pp 49-56, The Information Processing Society, Research Report Vol. 94, No. 91, ISSN 0919-6072" (Literature 1), there is proposed a PPRAM (Parallel Processing Random Access Memory, Practical Parallel Random Access Machine) in which four general purpose processors 11 and a large capacity, general purpose memory 12 having a plurality of memory cell regions 12a are integrated on one chip in a layout as shown in FIG. 2. In FIG. 2, the four general purpose processors 11 are arranged in a row on one side of the chip, and arranged on the remaining region are a plurality of the memory cell regions 12a of the general purpose memory 12 in the form of array.

Also, in the Japanese Patent Application Laid-Open No. 5-94366 (1993) (Literature 2), there is disclosed a microcomputer in which a CPU 14 is arranged between two memory spaces 13, and arranged on one side of the CPU 14 and memory spaces 13 and in parallel with the row of the memory spaces 13 and the CPU 14 are an address bus 15 and a data bus 16 as shown in FIG. 3.

Further, in the Japanese Patent Application Laid-Open No. 63-81569 (1988) (Literature 3), there is disclosed a microcomputer in which a plurality of modules 31, 32, 33 having respective functions such as memories and peripheral circuits, and a CPU 34 are arranged in a manner to have the same width each, and arranged on one side of them and in parallel with the row of the modules 31, 32, 33 and the CPU 34 is a bus 35 as shown in FIG. 4. In this microcomputer, where the modules 31, 32, ... and the CPU 34 are arranged in two rows, the bus 35 is provided therebetween (FIG. 5), and where the modules 31, 32 ... and the CPU 34 with different widths are arranged, the bus 35 is provided along the perimeter of the modules, that is, the periphery of the chip (FIG. 6). In either of the drawings, the CPU 34 is arranged substantially in the middle of a plurality of the modules 31, 32 ... In addition, the modules 31, 32 ..., and the CPU 34 are oriented in a manner to be opposed to the bus 35 in a straight line.

In the layout (Literature 1) shown in FIG. 2, the memory cell regions 12a are located at different distances from the general purpose processors 11 depending on their positions, and the longer the distance, the longer the bus is, so that a delay in data transmission is larger. The difference in the length of the bus causes the difference in the data transmission time, so that it is necessary to adapt a faster data in transmission to a slower one. Further, where the distance to the bus is longer, the area on the layout required for the bus is larger.

Also, in the Literature 2, the address bus 15 and the data bus 16 provided on one side of the row of the memory spaces 13 and the CPU 14, are required by the same length as that of the row, so that a problem exists in that the larger the memory spaces, the longer the buses.

Further, also in the Literature 3, the same problem exists where the bus 35 is arranged in parallel with the row of the modules 31, 32, 33 and the CPU 34, and where the bus 35 is arranged along the perimeter of the modules 31, 32 ... and the CPU 34, that is, the periphery of the chip.

Also, in a configuration in which the bus (15, 16 or 35) is provided on one side of the memory spaces 13 (or the modules 31, 32, ... and the CPU 14 (or 34), a disadvantage exists in that the area required for bus formation increases in proportion to the number of bits.

SUMMARY OF THE INVENTION

The present invention is devised to solve the problems discussed above and it is a principal object of the invention to provide a microcomputer in which a memory is divided into a plurality of memory cell regions between which a processor is arranged, thereby improving a processing capability.

The microcomputer according to the present invention includes a processor arranged between the memory cell regions, so that the distance (bus length) between the processor and the memory cell regions is shortened and the processor is situated at substantially the same distance from the memory cell regions. Buses connecting the processor with the memory are arranged between the processor and the memory, so that the bus wiring region increasing in proportion to the number of bits as compared with the prior art can be also made relatively smaller. Where the bus is divided into a plurality of branches each of which is connected to the processor, the memory cell regions connected to different bus branches can be separately controlled and accessed. Hereinafter, the bus branch will be referred to as "system" in light of its function rather than its physical configuration. Also, dividing the bus into a plurality of systems allows the bus length to be shortened.

The layout of the memory is formed simply by spacing apart the gap between memory cell region rows consisting of a plurality of memory cell regions, so that it can employ an existing layout, thus the processor is arranged to adapt to it. A configuration in which with the long sides made adjacent to each other, the processor is arranged between the short sides is smaller in increased area than that in which with the short sides made adjacent to each other, the processor is arranged between the long sides.

Where the bus is connected to the long side of a rectangular memory cell region, more addresses can be accessed at the same time compared with a case where it is connected to the short side thereof. Also, respective signal output terminals to the outside of the chip can be concentrated on the one side of the chip or decentralized onto the two sides thereof.

The configuration is such that a space is provided between the memory cell region rows and the processor is arranged in the space, so that the remaining spaces between the memory cell region rows can be also provided with circuits such as a peripheral circuit, a bus interface, and a latch circuit between the pad and the processor. Other processors can be further arranged in the spaces to configure a multiprocessor. Where a bus interface is provided at the signal output terminal, each signal can be outputted at a high speed. Where a latch circuit is arranged in the above-mentioned space, the distance between the latch circuit and the processor is short, so that a skew can be made small.

Where a buffer is provided between the processor and the memory cell region, the processor and the memory can be synchronized. Providing a cache memory between the buffer and the processor allows a higher speed operation.

The above and further objects and features of the invention will more fully be apparent from the following detailed description with accompanying drawings.

DESCRIPTION OF THE PREFERRED EMBODIMENTS

Figure 7:
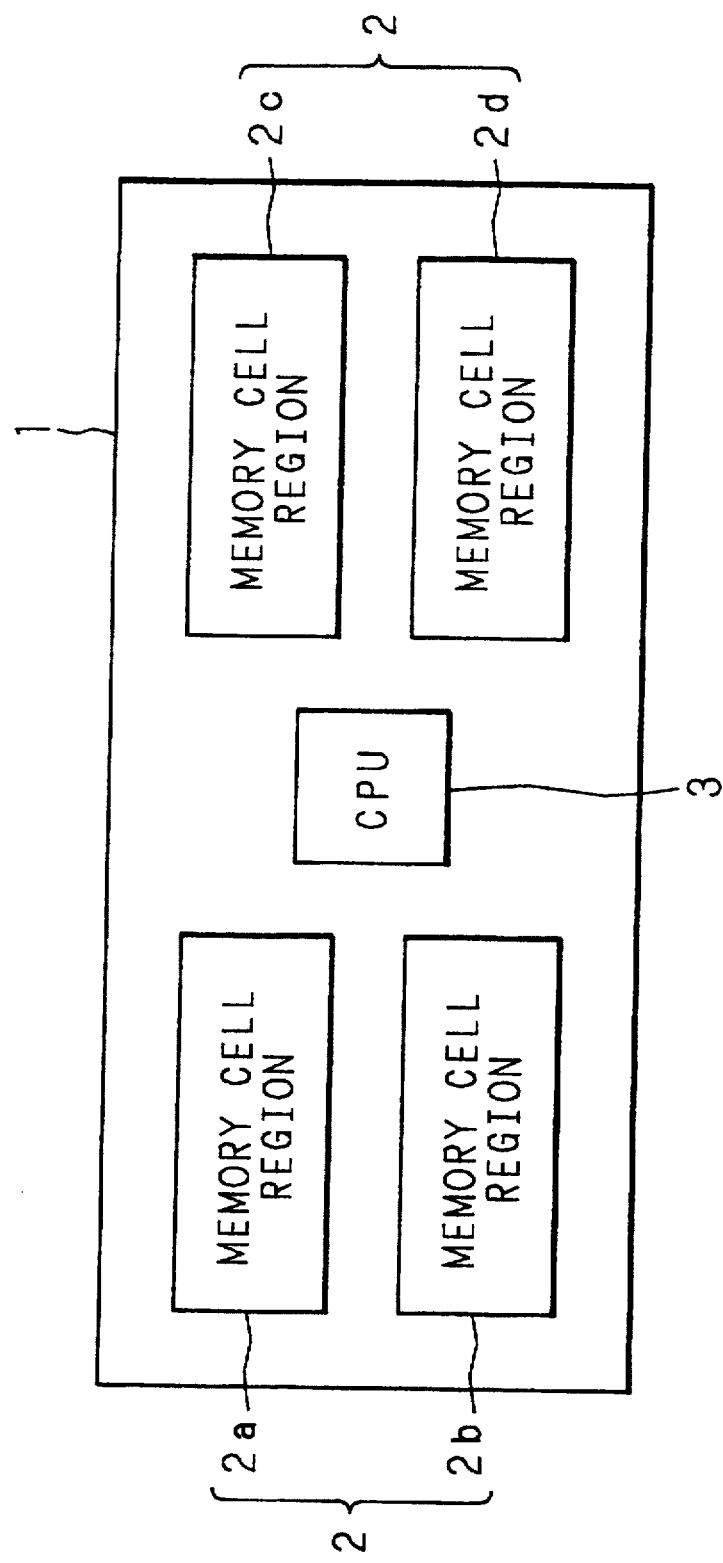
FIG. 7 is a plan view showing a conception of a microcomputer of the present invention.
Figure 8:
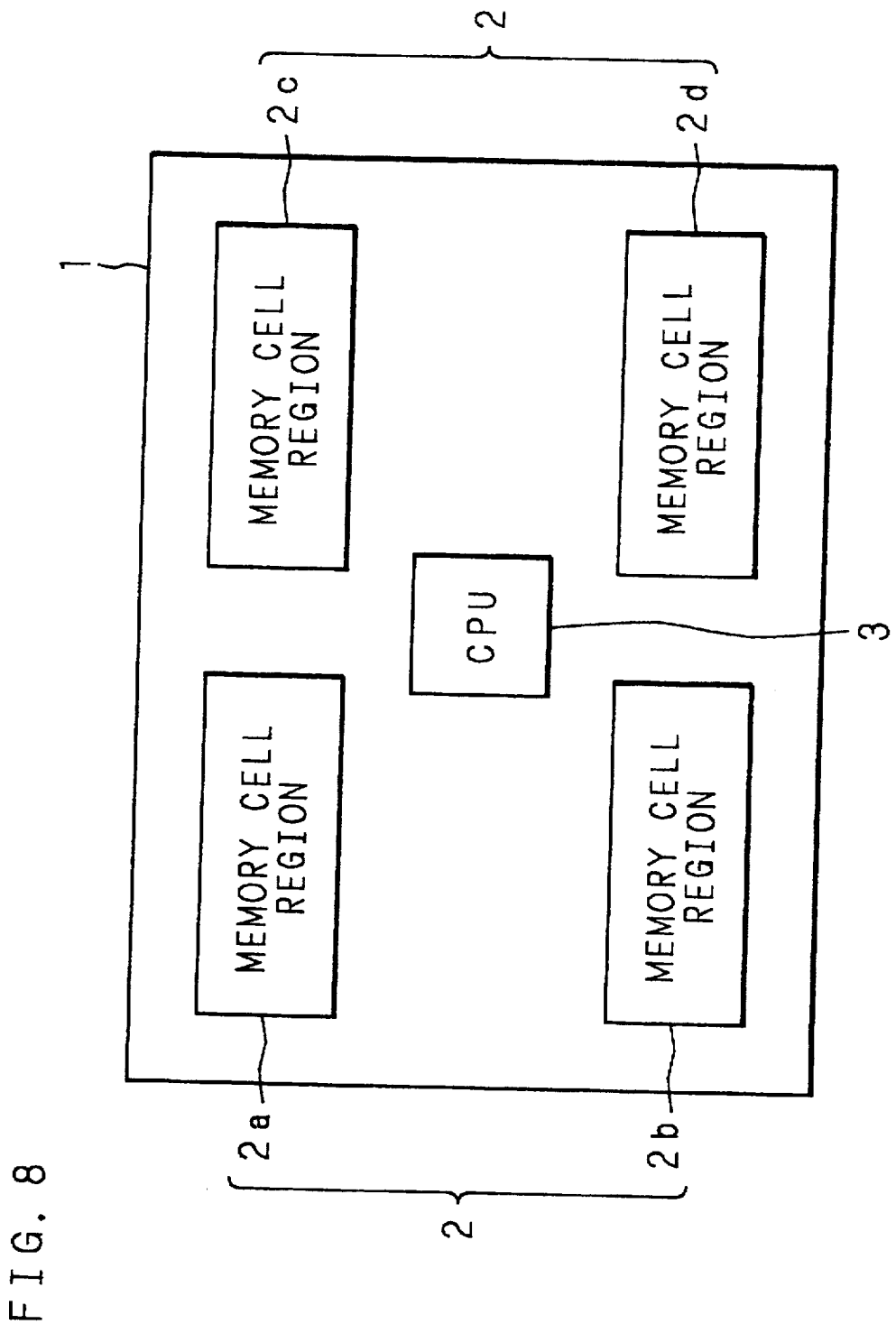
FIG. 8 is a plan view showing a conception of a microcomputer of the present invention.

With reference to the drawings showing various examples embodying the present invention will be described hereinafter:

FIGS. 7 and 8 are schematic plan views showing a microcomputer in connection with the present invention, and showing a fundamental concept in the following embodiments. In the figures, numeral 1 designates an outer frame of a chip on which circuits such as a memory 2 and a CPU 3 are integrated. In FIG. 7, four laterally-long memory cell regions 2a, 2b, 2c and 2d, which configure the memory 2 and are located in the form of array, are arranged in two rows (2a and 2b, and 2c and 2d) with the long sides thereof made adjacent to each other. In FIG. 8, four memory cell regions 2a, 2b, 2c and 2d are arranged in two rows (2a and 2c and 2b and 2d) with the short sides thereof made adjacent to each other. The rows are spaced apart by a predetermined gap, in which the CPU 3 is arranged. The CPU 3 is a typical processor such as "CPU Core" shown in "Mitsubishi Electric Corporation, M16/10 Group User's Manual".

Although FIGS. 7 and 8 show the memory cell regions in two rows, memory cell regions in three or more rows can be also applied. The number of memory cell regions included in one memory cell region row is not limited to two, and may be one, or three or more. Further, the number of memory cell regions is not limited to four.

Figure 1:
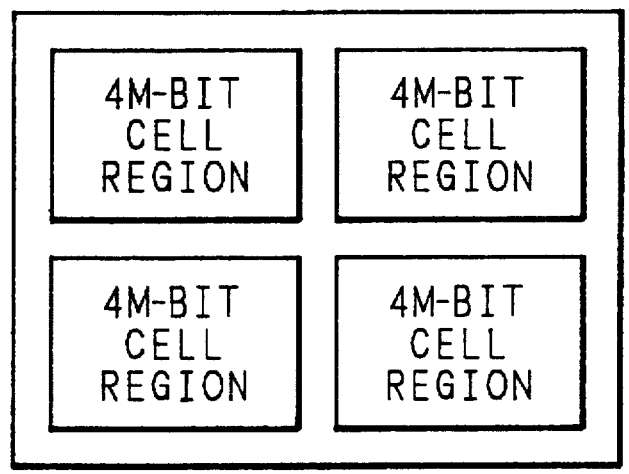
FIG. 1 shows an example of the layout of a conventional 16 Mbit-DRAM.
Figure 2:
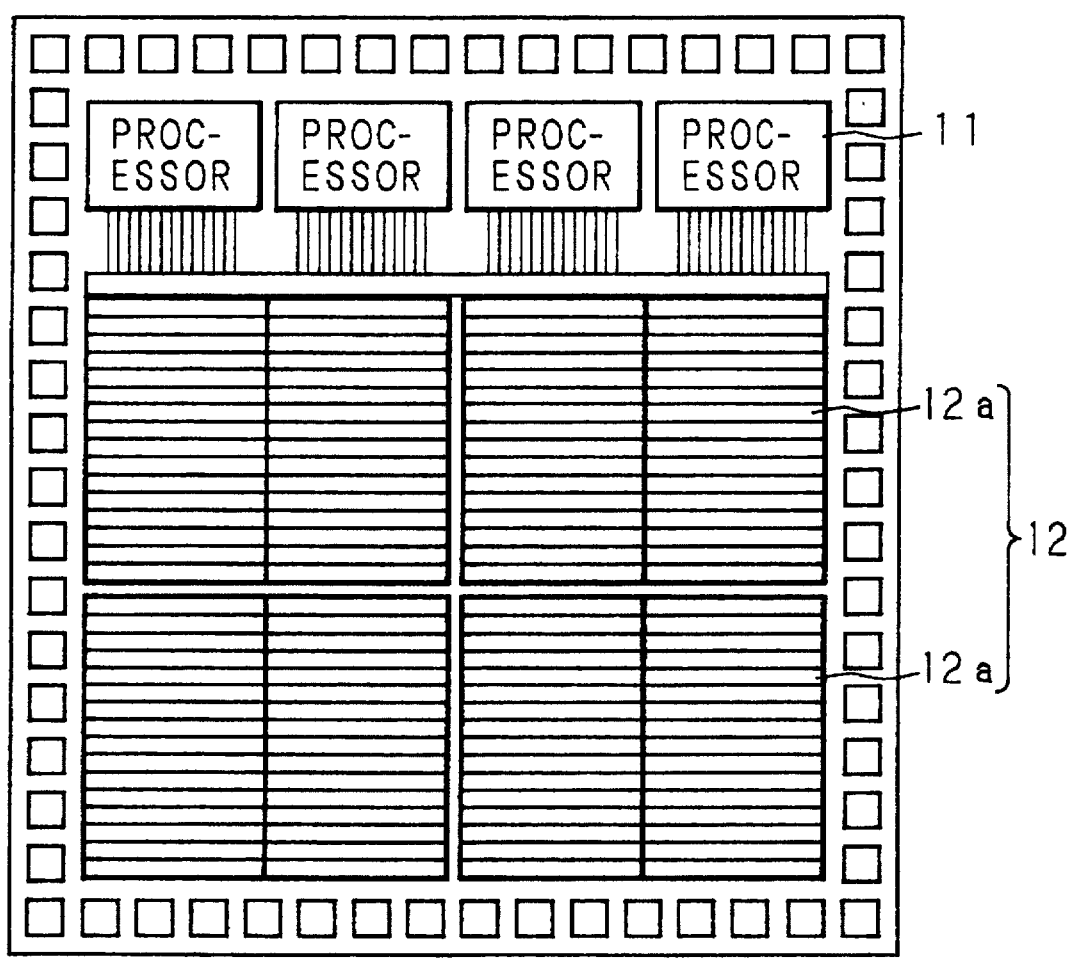
FIG. 2 is a plan view showing a conventional microcomputer.
Figure 3:
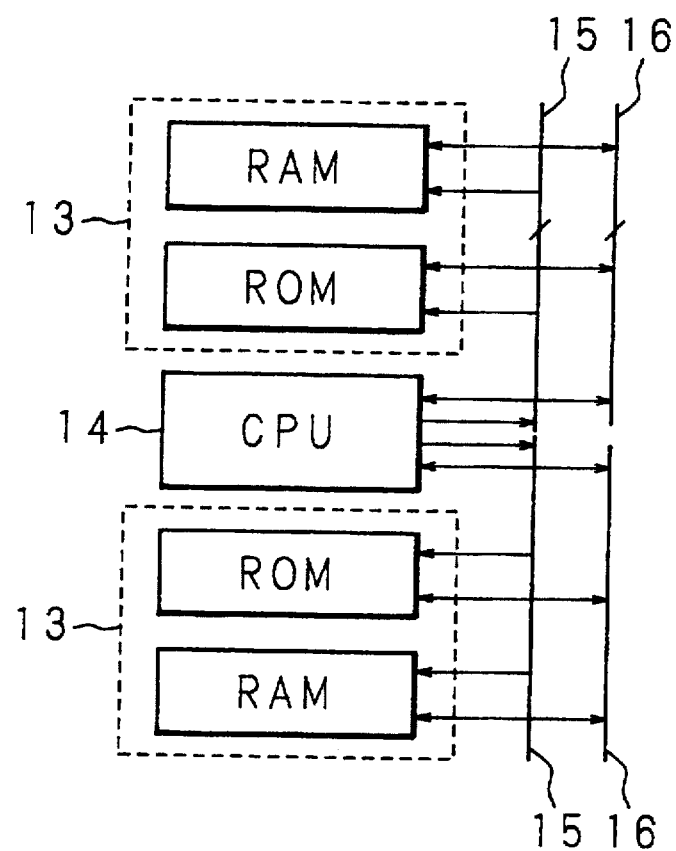
FIG. 3 is a plan view showing a conventional microcomputer.
Figure 4:
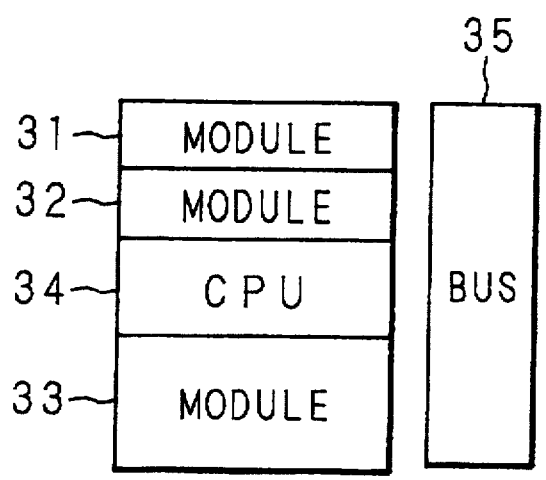
FIG. 4 is a plan view showing a conventional microcomputer.
Figure 5:
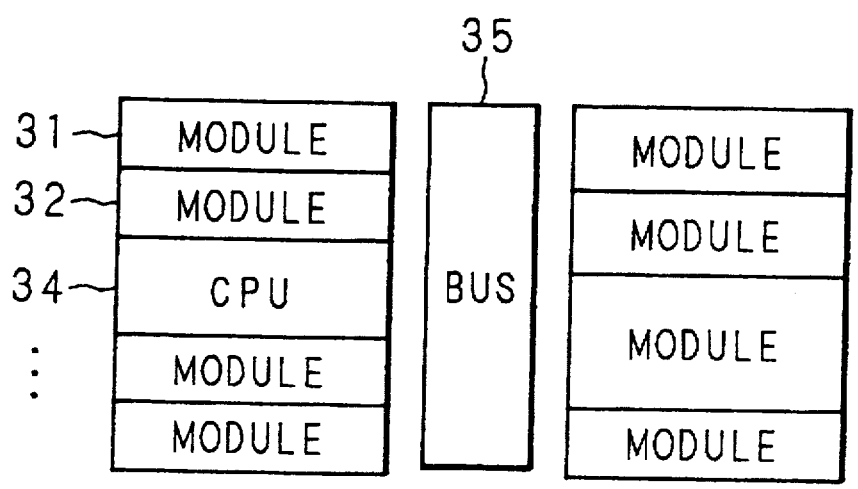
FIG. 5 is a plan view showing a conventional microcomputer.
Figure 6:
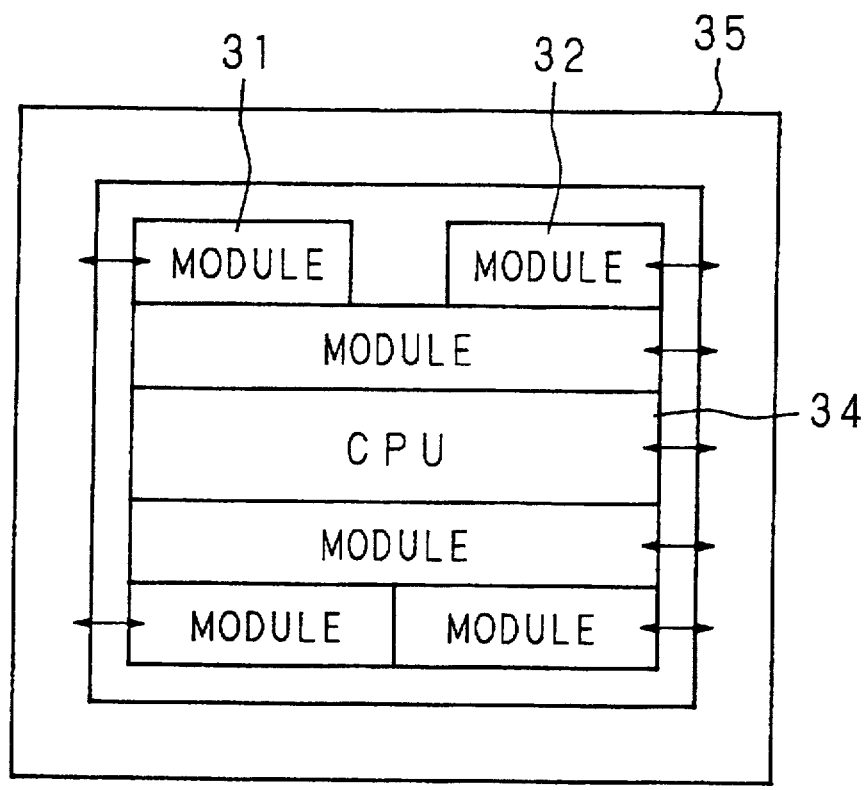
FIG. 6 is a plan view showing a conventional microcomputer.

In the configuration shown in FIGS. 7 and 8, the distance between the each memory cell region and the CPU 3 is more uniform than in the prior art, so that the bus lengths become substantially the same and thus the delays in data transmission are substantially equal. This makes it unnecessary to adapt a faster data transmission to a slower one, thereby realizing a high speed operation. The bus length is significantly reduced compared with a prior art example shown in FIG. 2, thereby also realizing a high speed operation.

Further, where the memory 2 including the memory cell regions 2a, 2b, 2c and 2d are DRAMs, though various control signals are given from the CPU 3 to the memory cell regions 2a, 2b, 2c and 2d, the bus lengths are equal to each other as described above, so that a skew of the control signals is reduced. The shortened bus length allows a high speed control.

The configuration shown in FIG. 7 has a smaller area portion increased to arrange the CPU 3 compared with that shown in FIG. 8. Conversely, the configuration shown in FIG. 8 has a larger area portion increased, so that an advantage exists in that a space in which other circuits can be installed is larger.

Examples of the layout of a bus where the configuration shown in FIG. 7 is used will be described hereinafter. In the following drawings like reference numerals designate like elements and components to those in FIG. 7.

EXAMPLE 1

Figure 9:
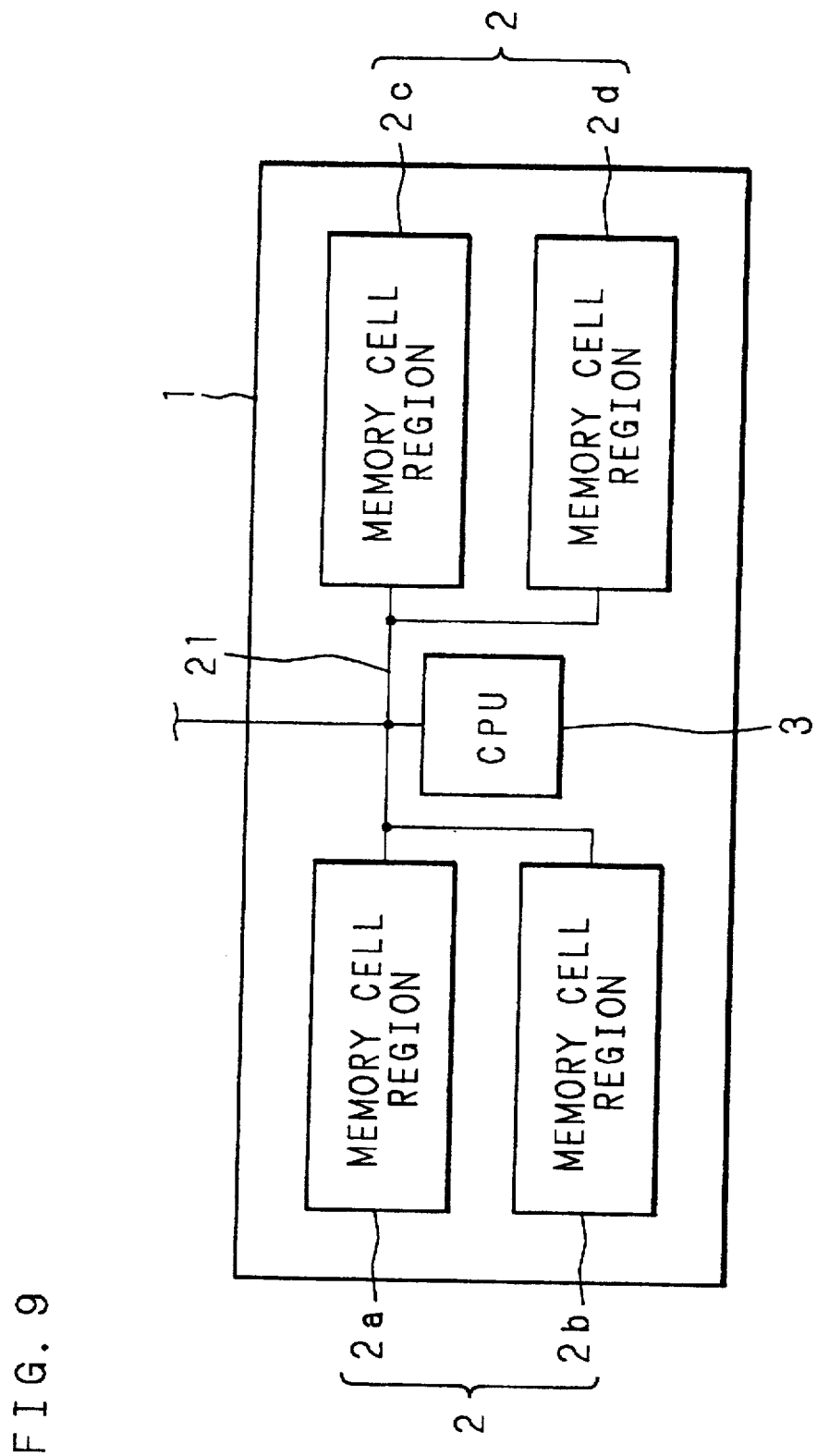
FIG. 9 is a schematic plan view showing an Example 1 of the present invention.

FIG. 9 is a schematic plan view showing an Example 1 of the present invention. A bus 21 is drawn from the short sides of the memory cell regions 2a and 2c and connected therebetween, while the bus 21 drawn from the short sides of the memory cell regions 2b and 2d and the bus 21 drawn from the upper side of the CPU 3 are connected to the bus 21 between the memory cell regions 2a and 2c. In the following all embodiments, the bus 21 is assumed to be used for sending and receiving of signals such as address signals, data signals, word line activation signals, column line activation signals and control signals (for example, refresh control signals). Therefore, the CPU 3 can execute instructions stored in the memory 2.

EXAMPLE 2

Figure 10:
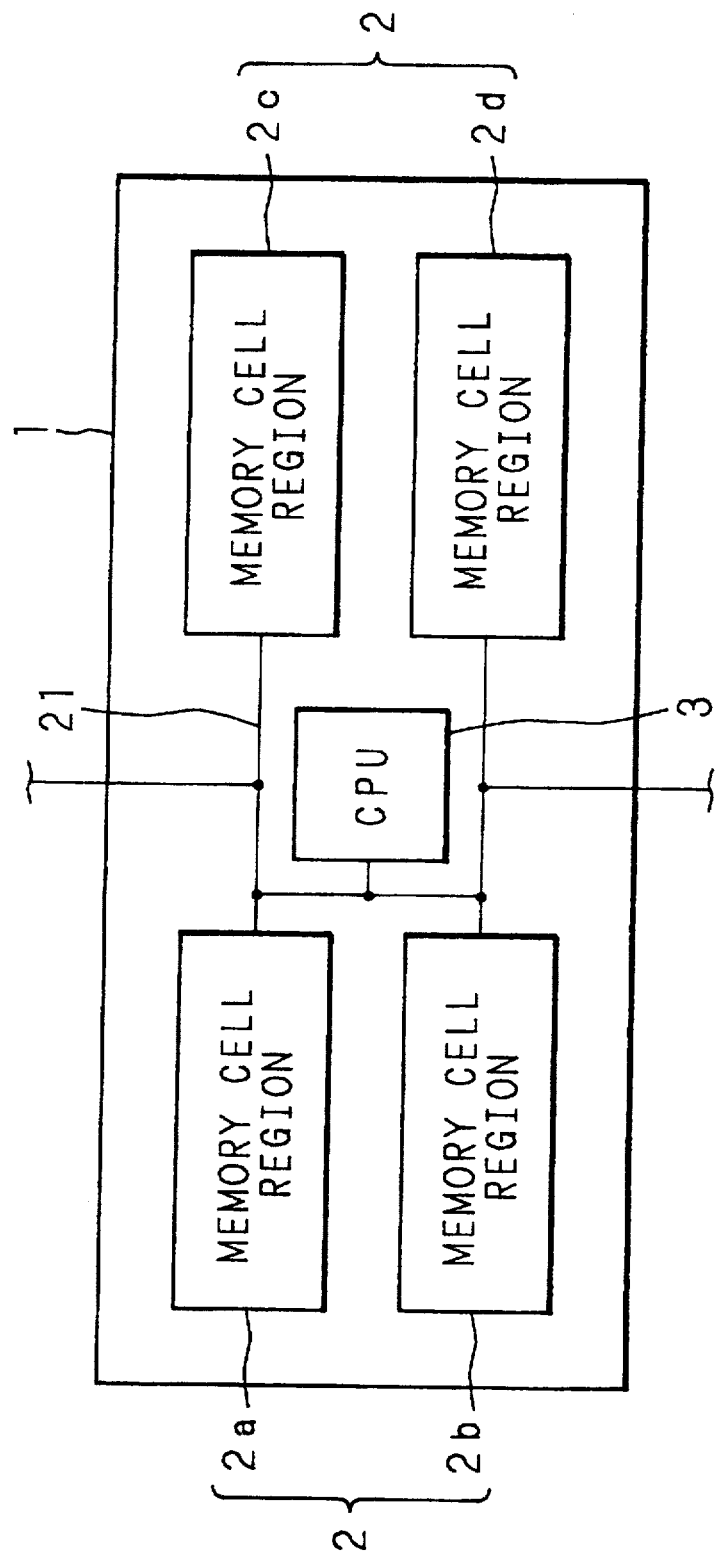
FIG. 10 is a schematic plan view showing an Example 2 of the present invention.

FIG. 10 is a schematic plan view showing an Example 2 of the present invention. The bus 21 is drawn from the short sides of the memory cell regions 2a and 2c and connected therebetween, while the bus 21 is drawn from the short sides of the memory cell regions 2b and 2d. The bus 21 drawn from the left side (or may be from the right side) of the CPU 3 is connected through the vertical bus 21 to the above-mentioned buses 21, 21.

The Example 1 is suitable where a signal is outputted from one side (upper side) of the chip 1, while the Example 2 is suitable where a signal is outputted from two sides (upper and lower sides).

EXAMPLE 3

Figure 11:
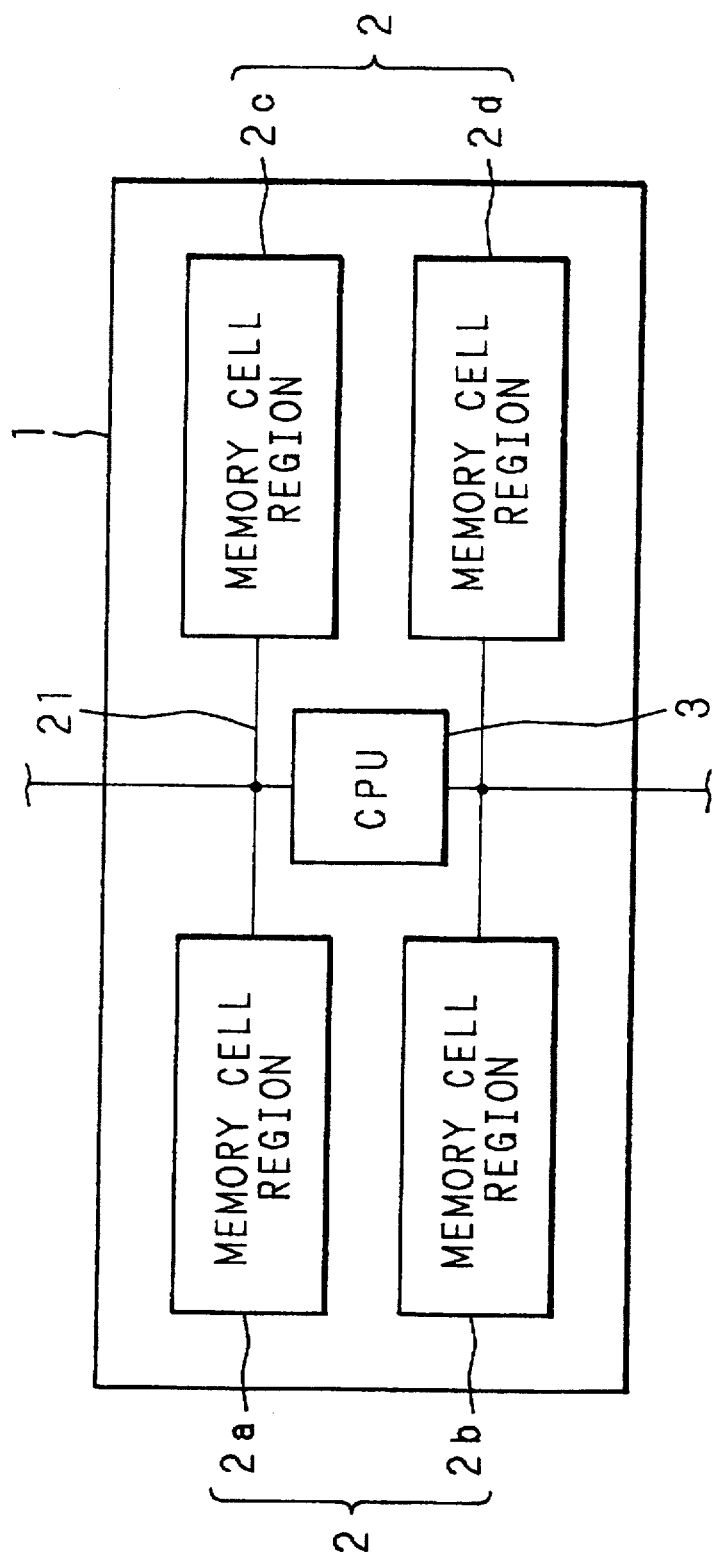
FIG. 11 is a schematic plan view showing an Example 3 of the present invention.

FIG. 11 is a schematic plan view showing an Example 3 of the present invention. The bus 21 is drawn from the short sides of the memory cell regions 2a and 2c and connected therebetween, while the bus 21 is drawn from the short sides of the memory cell regions 2b and 2d and connected therebetween. The buses 21, 21 drawn in the vertical direction from the upper and lower sides of the CPU 3 are connected the above-mentioned buses 21, 21, respectively.

In this schematic plan view, the bus 21 is divided into two systems, which are separately connected to the CPU 3. This allows the bus 21 connected to the memory cell regions 2a, 2c and the bus 21 connected to the memory cell regions 2b, 2d to be separately controlled and accessed in parallel. Therefore, this configuration is suitable where the memory cell regions 2a, 2c are different in size or application from the memory cell regions 2b, 2d. The dividing of the bus 21 into two systems allows the length of the bus 21 to be made shorter than that of the schematic plan views 1, 2.

EXAMPLE 4

Figure 12:
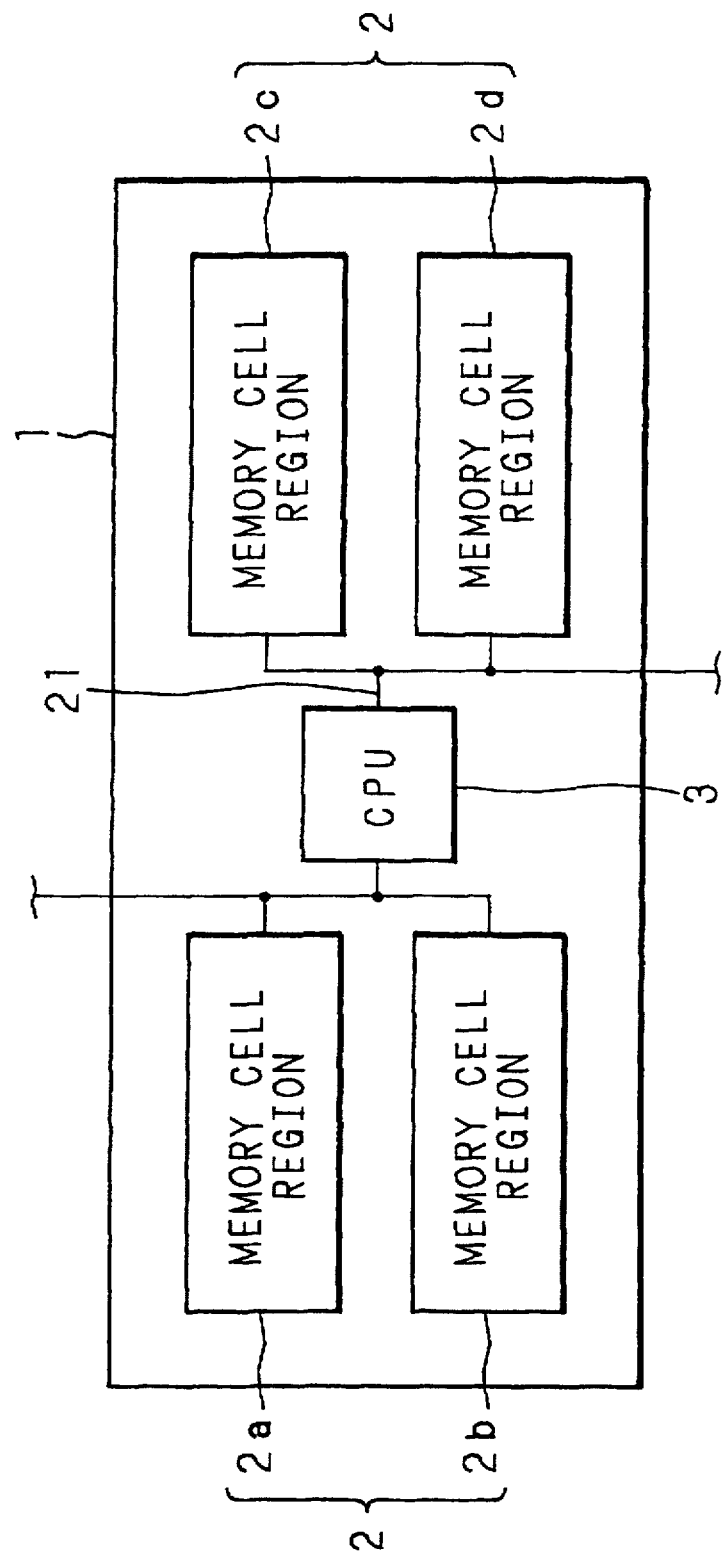
FIG. 12 is a schematic plan view showing an Example 4 of the present invention.

FIG. 12 is a schematic plan view showing an Example 4 of the present invention. The bus 21 is drawn from the short sides of the memory cell regions 2a and 2b and connected with the vertical bus 21, while the bus 21 is drawn from the short sides of the memory cell regions 2c and 2d and connected with the vertical bus 21. The buses 21, 21 drawn in the lateral direction from the left and right sides of the CPU 3 are connected with the above-mentioned vertical buses 21, 21, respectively.

Also, in this schematic plan view, the bus 21 is divided into two systems, which are separately connected to the CPU 3. This allows the bus 21 connected to the memory cell regions 2a, 2b and the bus 21 connected to the memory cell regions 2c, 2d to be separately controlled and accessed in parallel. Therefore, this configuration is suitable where the memory cell regions 2a, 2b are different in size or application from the memory cell regions 2c, 2d. The dividing of the bus 21 into two systems allows the length of the bus 21 to be made shorter than that of the examples 1, 2.

EXAMPLE 5

Figure 13:
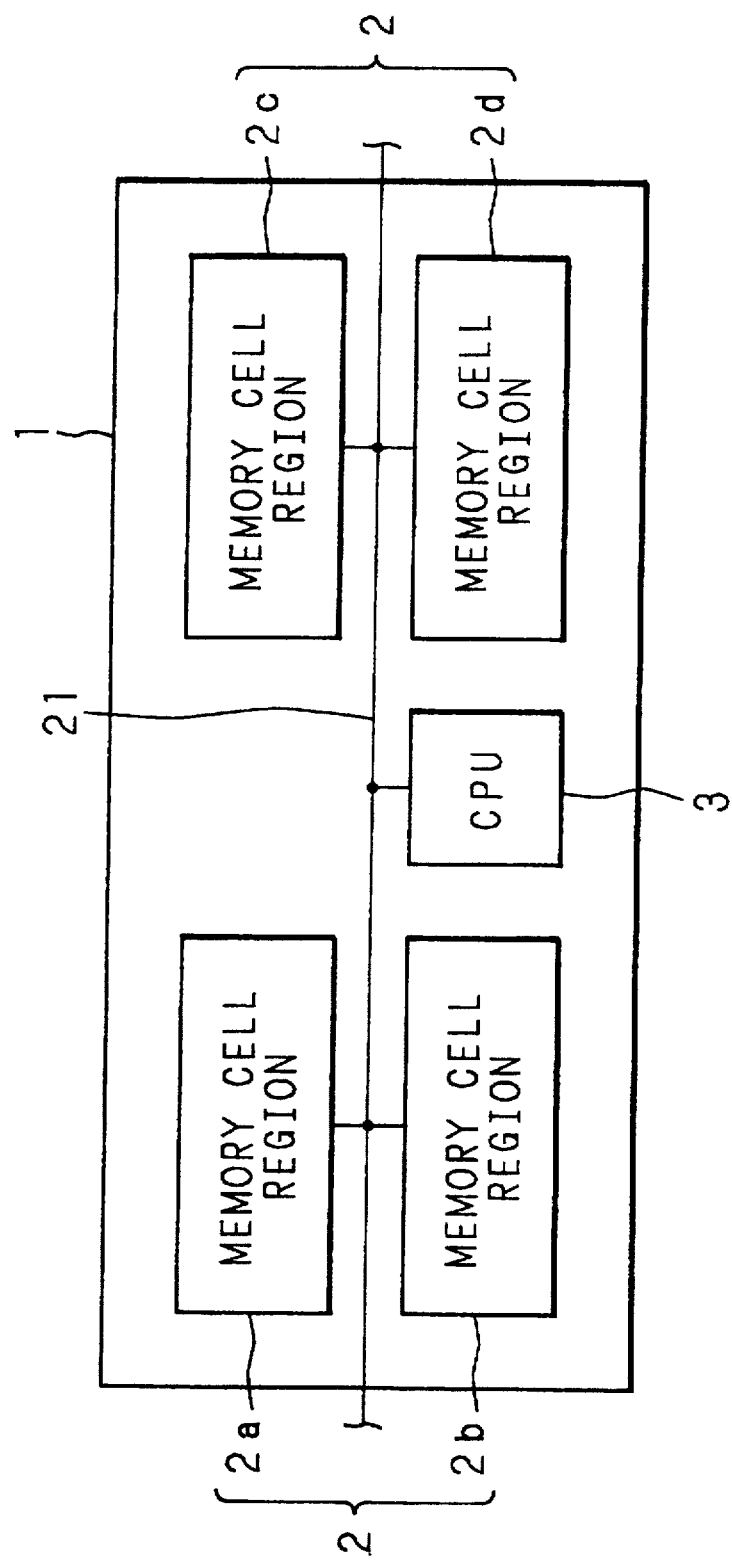
FIG. 13 is a schematic plan view showing an Example 5 of the present invention.

FIG. 13 is a schematic plan view showing an Example 5 of the present invention. The bus 21 is drawn from the long sides of the memory cell regions 2a and 2b and connected therebetween, while the bus 21 is drawn from the long sides of the memory cell regions 2c and 2d and connected therebetween. The bus 21 drawn from the upper side of the CPU 3 is connected through the lateral bus 21 with the above-mentioned bus 21, 21.

Though the Example 5 is larger in the area occupied by the buses on the chip than that for the Example 1, the Example 5 draws the bus 21 from the long sides, so that it can access simultaneously more addresses, and for example, read them.

EXAMPLE 6

Figure 14:
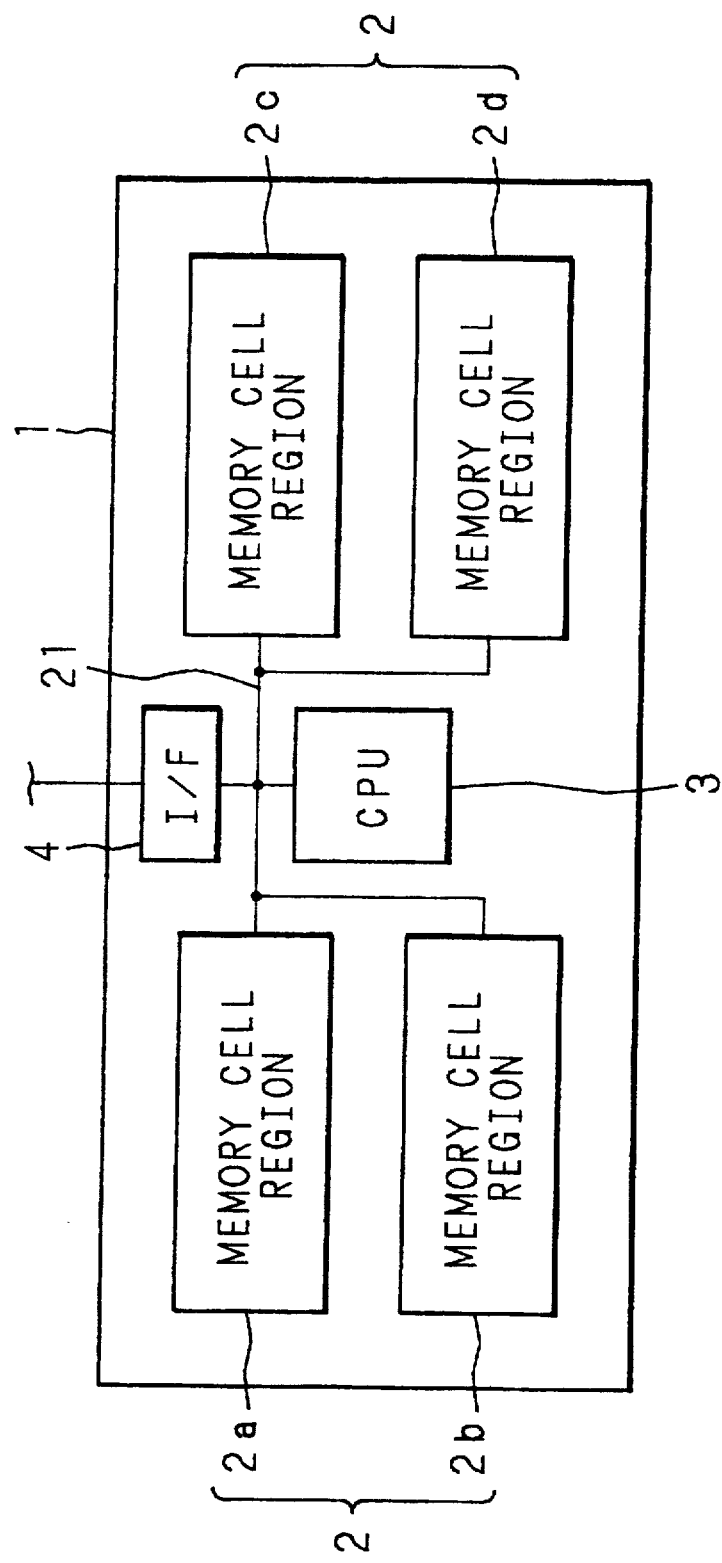
FIG. 14 is a schematic plan view showing an Example 6 of the present invention.

FIG. 14 is a schematic plan view showing an Example 6 of the present invention. This Example is configured such that in the configuration of FIG. 9 (Example 1), a bus interface (I/F) 4 is installed on the upper side of the bus 21 between the memory cell regions 2a and 2c.

The Example 1 will be compared with the Example 6.

In the Example 1, the bus interface 4 is not provided, so that signals from the memory 2 and the CPU 3 are outputted, as they are, to the outside of the chip. Therefore, although many pins are required, a load applied to the bus 21 is small. Also, the CPU 3 interfaces directly the pins, and thus a dedicated interface unit is not required to be provided on the outside of the CPU 3, so that the area required to form a driver for pins is small.

On the other hand, in the Example 6, the bus interface 4 receives an external bus access request from the CPU 3 and controls dedicatedly pins, so that signals can be outputted as they are at a high speed. Therefore, where a frequent access is performed, the configuration of the Example 6 provided with the bus interface 4 is suitable for such a case. Also, where the bus interface 4 is provided, the number of pins can be also reduced by providing a configuration in which the bus interface 4 holds temporarily the data from the CPU 3 and performs a control such that, for example, the bus interface 4 divides the data into halves and outputs it half by half to the pins.

EXAMPLE 7

Figure 15:
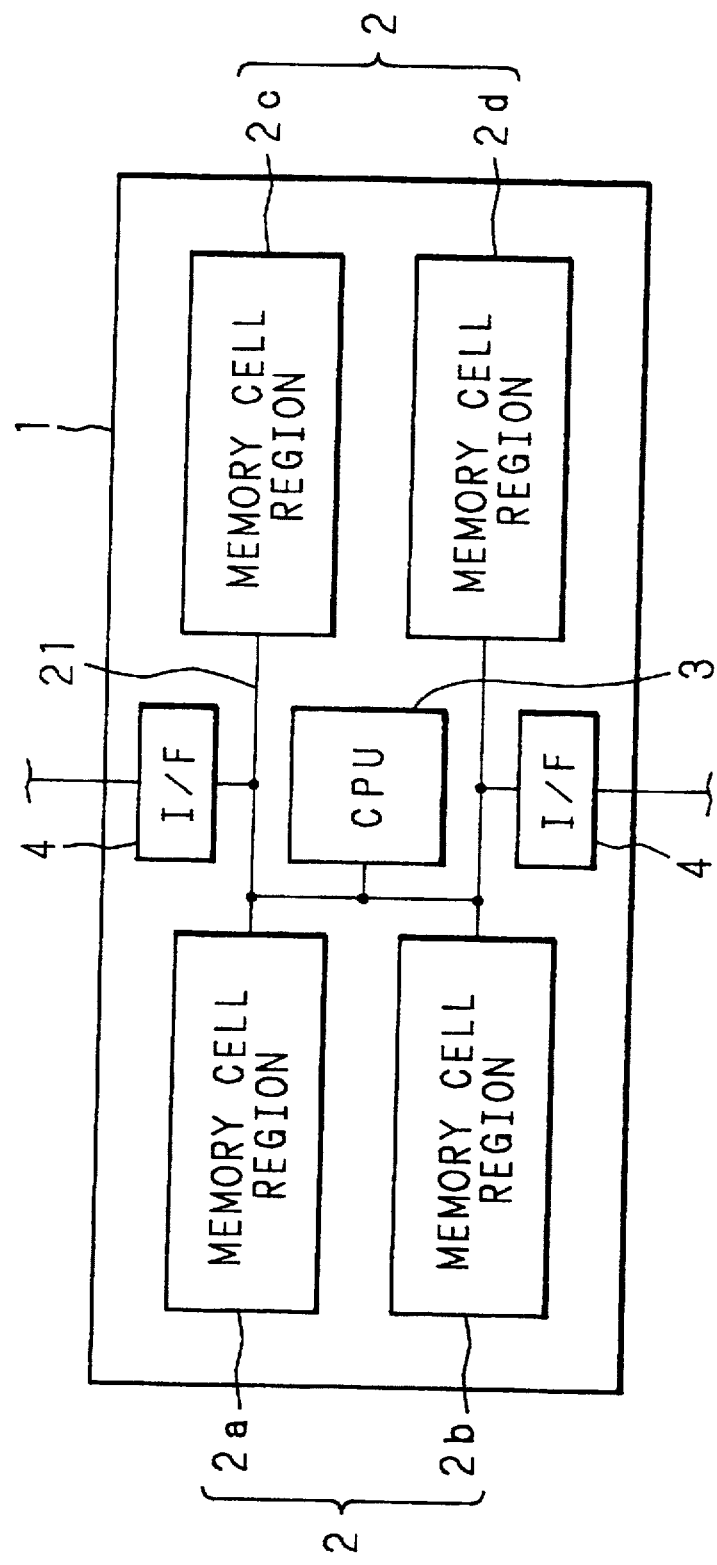
FIG. 15 is a schematic plan view showing an Example 7 of the present invention.

FIG. 15 is a schematic plan view showing an Example 7 of the present invention. This Example is configured such that in the configuration of FIG. 10 (Example 2), bus interfaces 4 are installed on the upper side of the bus 21 between the memory cell regions 2a and 2c and on the lower side of the bus 21 between the memory cell regions 2b and 2d.

Compared with the Example 2, in this Example signals can be outputted as they are at a high speed, so that this Example is suitable when accessed frequently.

EXAMPLE 8

Figure 16:
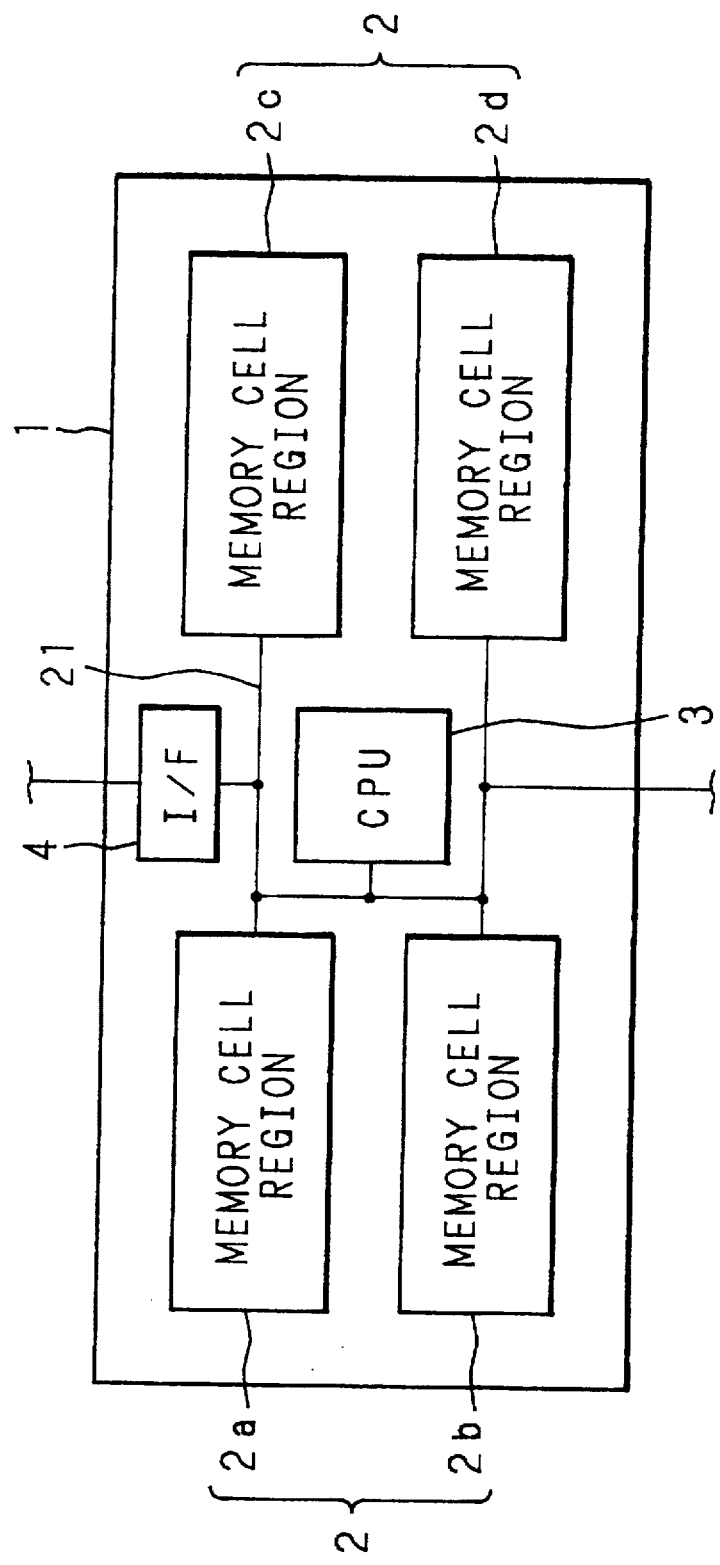
FIG. 16 is a schematic plan view showing an Example 8 of the present invention.

FIG. 16 is a schematic plan view showing Example 8 of the present invention. This Example is configured such that in the configuration of FIG. 15 (Example 7), only one of the bus interfaces 4 is provided.

This allows the pins for the bus interface 4 to be concentrated and provided on one side and thus the pins on the other side to be used for other signals. Also, the memory cell regions can be used separately such that the memory cell regions connected to the bus interface 4 are used for data, and the memory cell regions not connected to the bus interface 4 are used for instructions. On the other hand, in the Example 7, the pins can be arranged equally with the number of pins per side made fewer.

EXAMPLE 9

Figure 17:
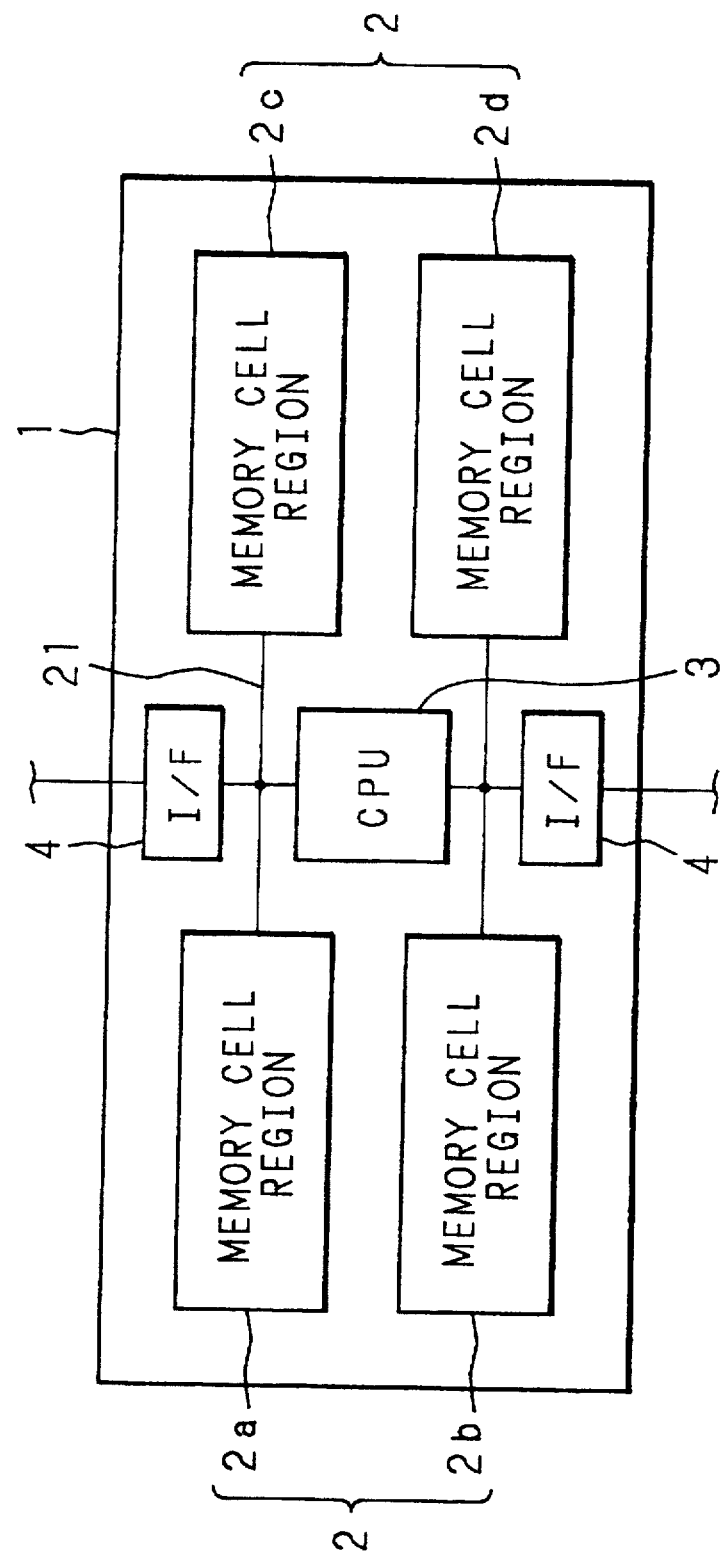
FIG. 17 is a schematic plan view showing an Example 9 of the present invention.

FIG. 17 is a schematic plan view showing Example 9 of the present invention. This Example is configured such that in the configuration of FIG. 11 (Example 3), bus interfaces 4 are installed on the upper side of the bus 21 between the memory cell regions 2a and 2c and on the lower side of the bus 21 between the memory cell regions 2b and 2d.

Compared with the Example 3, in this Example signals can be outputted as they are at a high speed, so that this Example is suitable when accessed frequently.

EXAMPLE 10

Figure 18:
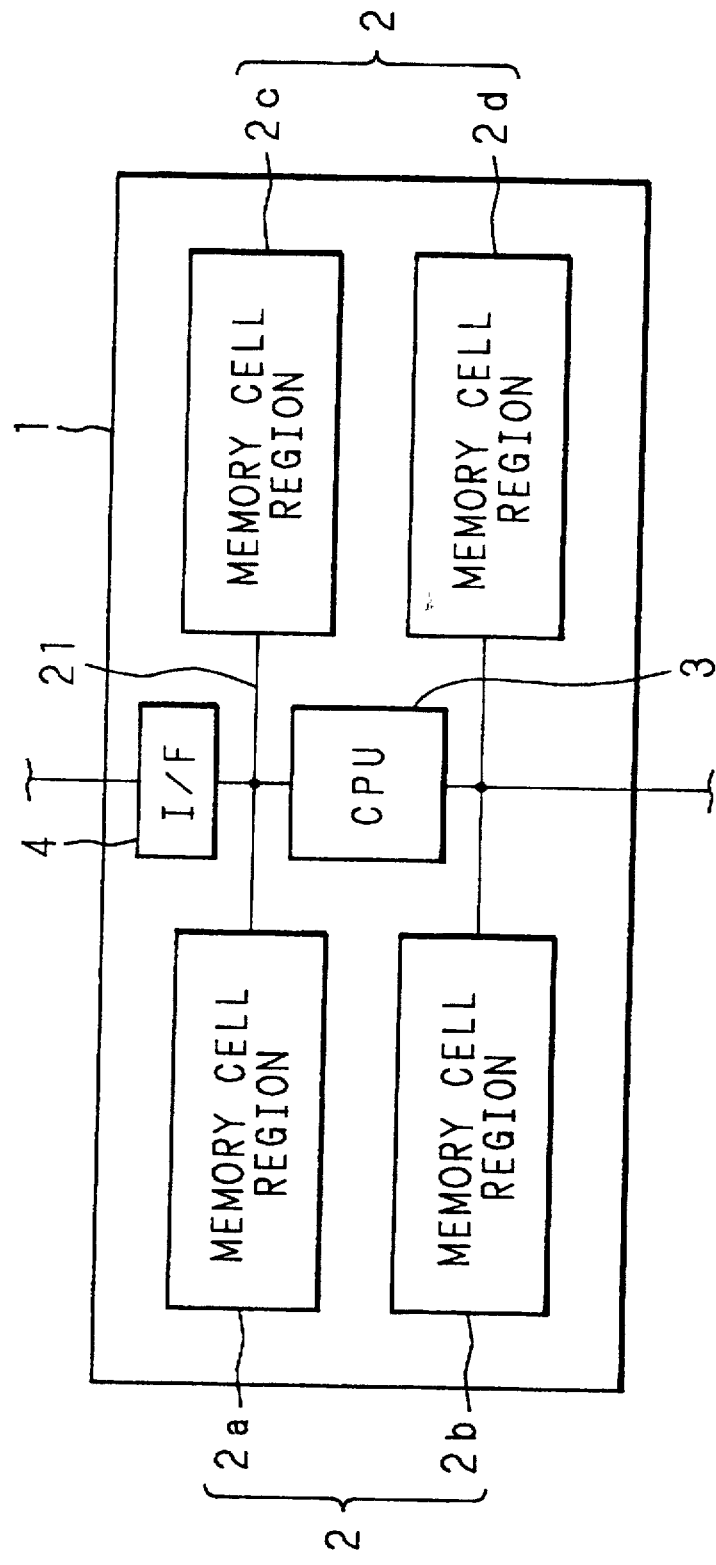
FIG. 18 is a schematic plan view showing an Example 10 of the present invention.

FIG. 18 is a schematic plan view showing Example 10 of the present invention. This Example is configured such that in the configuration of FIG. 17 (Example 9), only one of the bus interfaces 4 is provided.

This allows the same effect as the Example 8 to be obtained.

EXAMPLE 11

Figure 19:
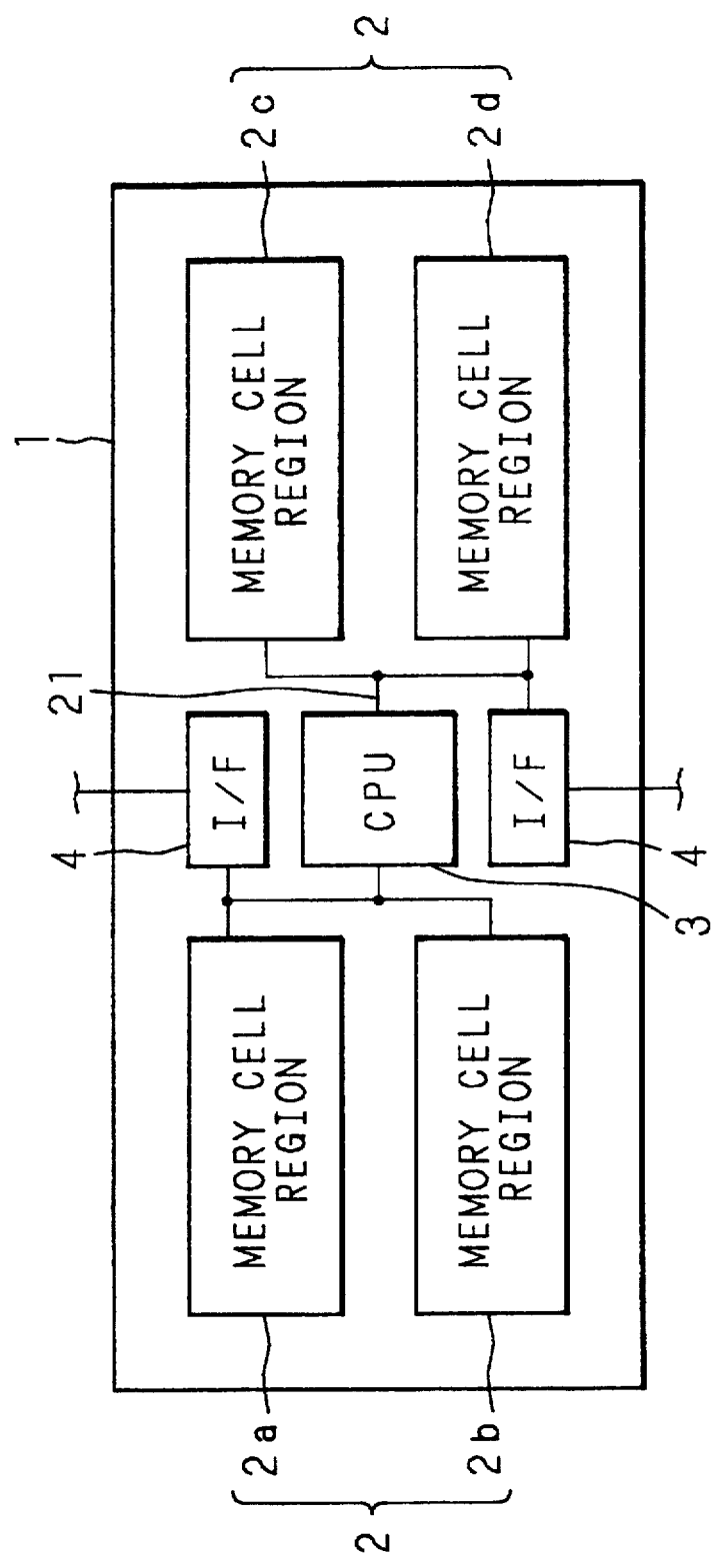
FIG. 19 is a schematic plan view showing an Example 11 of the present invention.

FIG. 19 is a schematic plan view showing Example 11 of the present invention. This Example is configured such that in the configuration of FIG. 12 (Example 4), a bus interfaces 4 is installed on the upper side of the CPU 3 and connected with the bus 21 between the memory cell regions 2a and 2b, and a bus interfaces 4 is installed on the lower side of the CPU 3 and connected with the bus 21 between the memory cell regions 2c and 2d.

Compared with the Example 4, in this Example signals can be outputted as they are at a high speed, so that this Example is suitable when accessed frequently.

EXAMPLE 12

Figure 20:
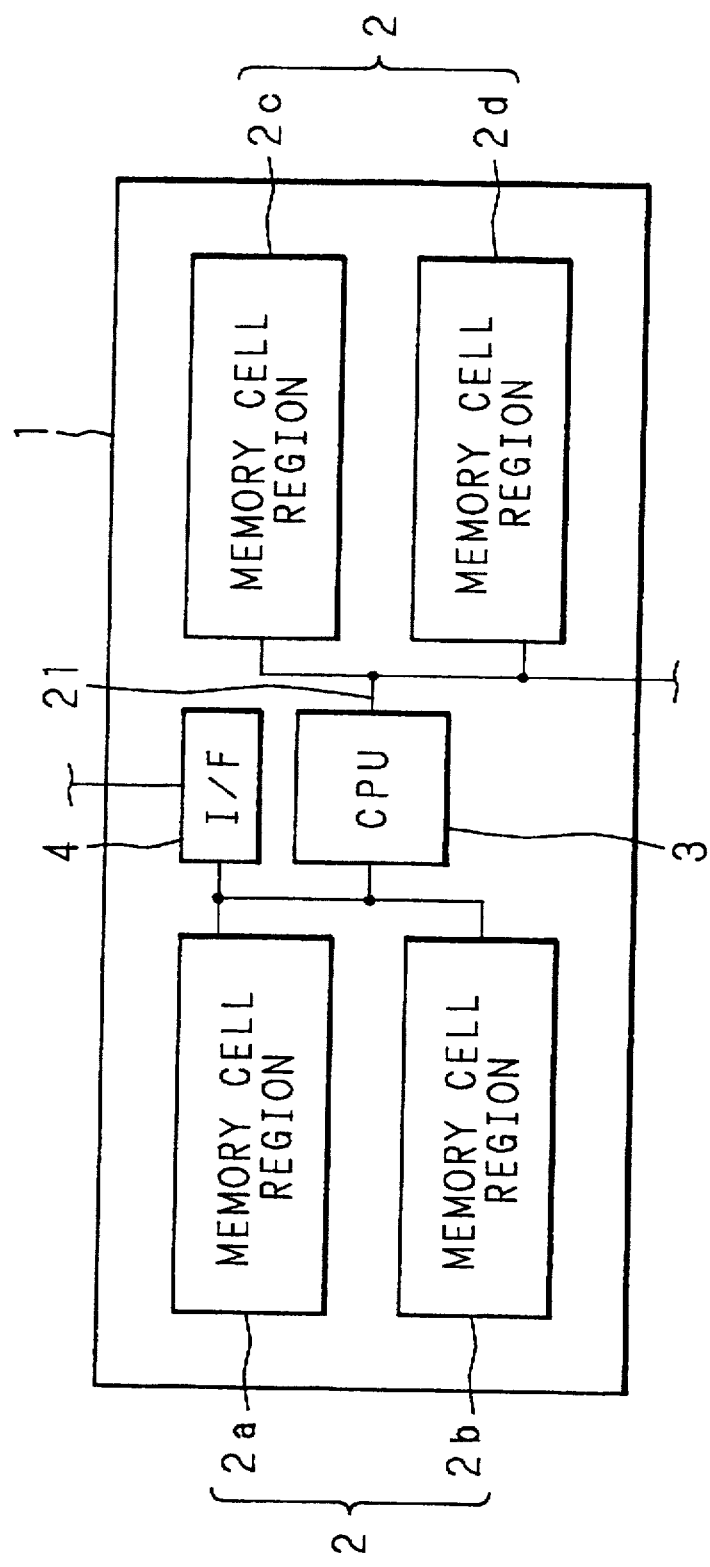
FIG. 20 is a schematic plan view showing an Example 12 of the present invention.

FIG. 20 is a schematic plan view showing Example 12 of the present invention. This Example is configured such that in the configuration of FIG. 19 (Example 11), only one of the bus interfaces 4 is provided.

This allows the same effect as the Example 8 to be obtained.

EXAMPLE 13

Figure 21:
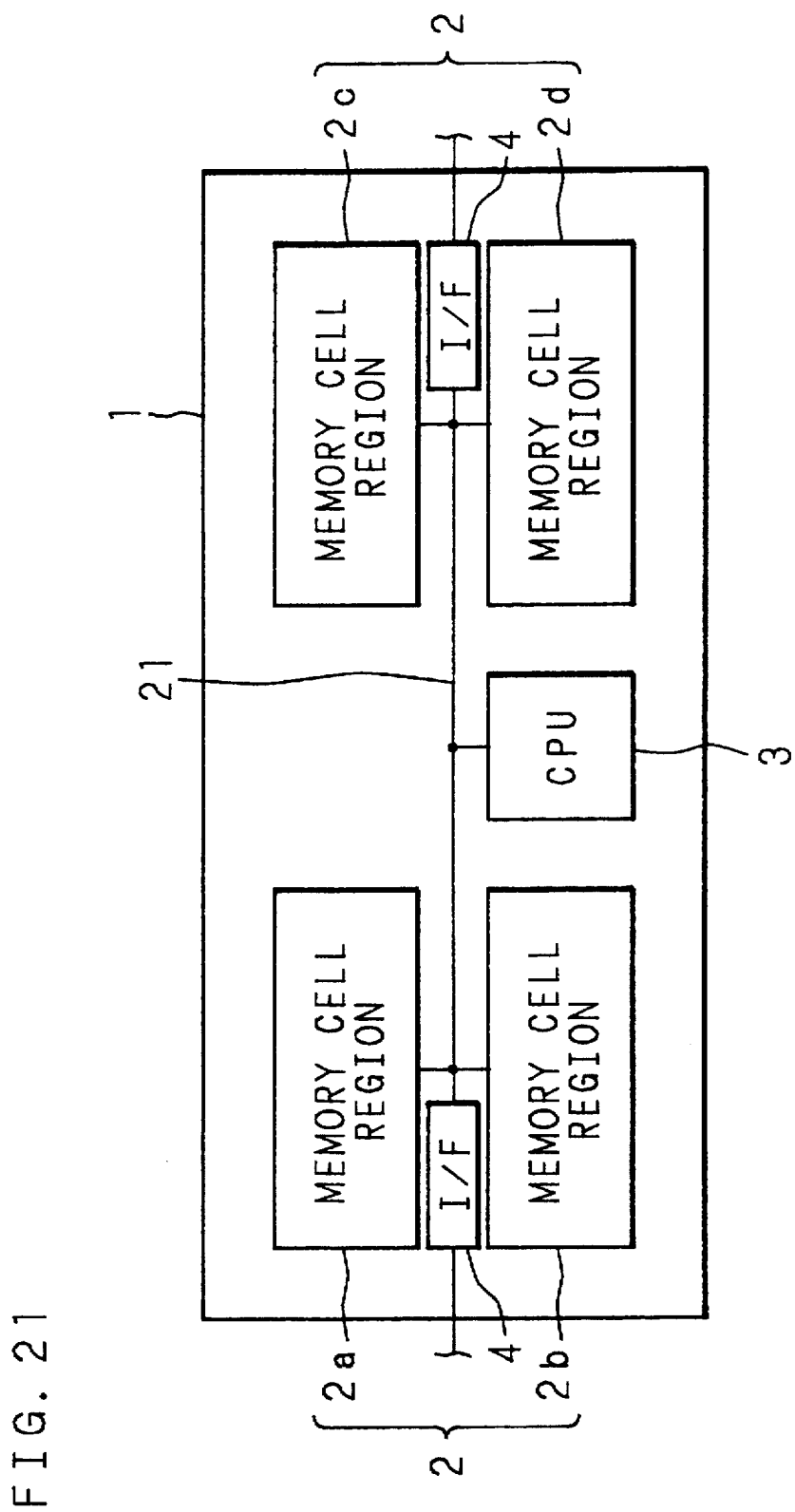
FIG. 21 is a schematic plan view showing an Example 13 of the present invention.

FIG. 21 is a schematic plan view showing Example 13 of the present invention. This Example is configured such that in the configuration of FIG. 13 (Example 5), a bus interface 4 is installed on the left side of the bus 21 between the memory cell regions 2a and 2b and connected with the above-mentioned bus 21, and a bus interface 4 is installed on the right side of the bus 21 between the memory cell regions 2c and 2d and connected with the above-mentioned bus 21.

Compared with the Example 5, in this Example signals can be outputted as they are at a high speed, so that this Example is suitable when accessed frequently.

EXAMPLE 14

Figure 22:
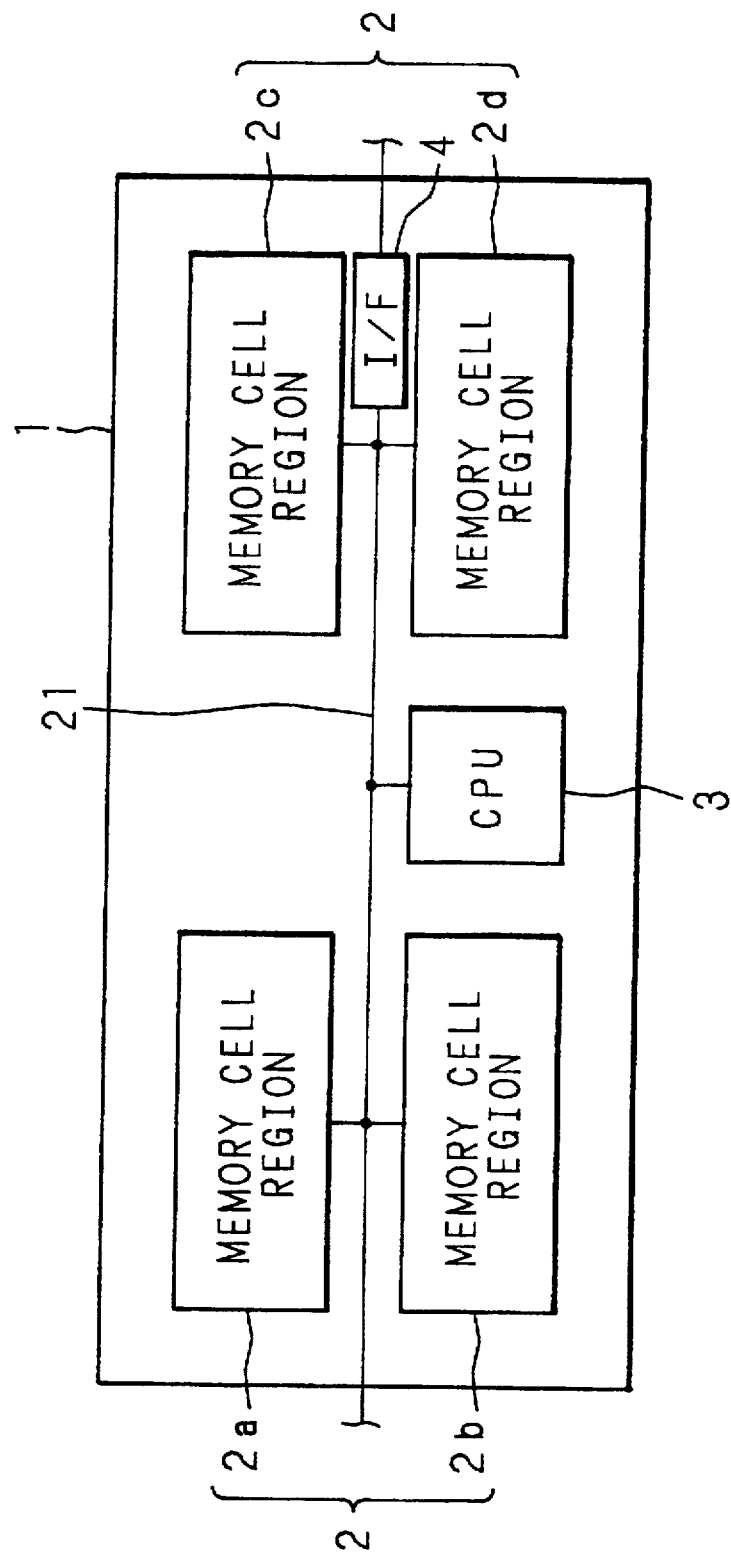
FIG. 22 is a schematic plan view showing an Example 14 of the present invention.

FIG. 22 is a schematic plan view showing Example 14 of the present invention. This Example is configured such that in the configuration of FIG. 21 (Example 13), only one of the bus interfaces 4 is provided.

This allows the same effect as the Example 8 to be obtained.

EXAMPLE 15

Figure 23:
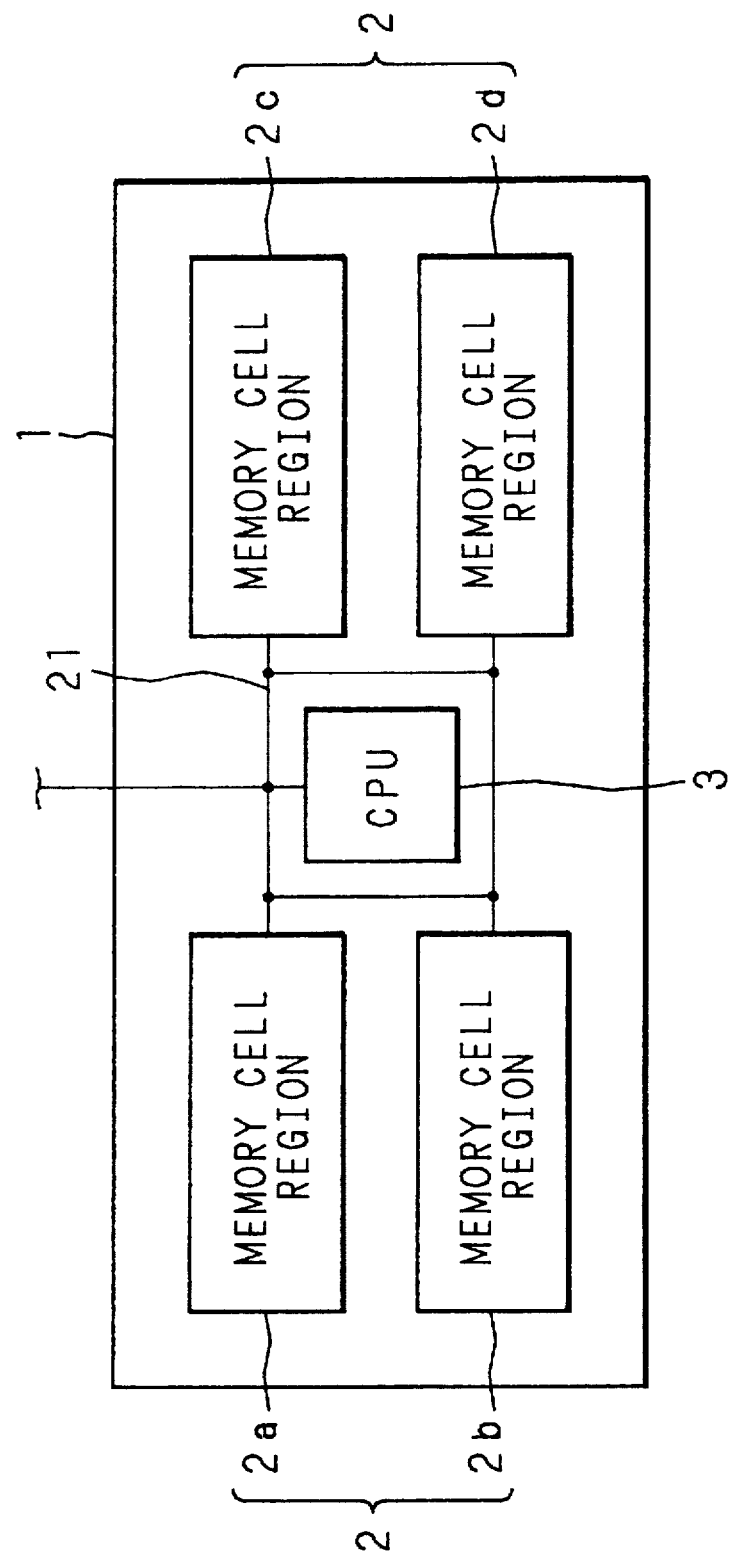
FIG. 23 is a schematic plan view showing an Example 15 of the present invention.

FIG. 23 is a schematic plan view showing Example 15 of the present invention. The bus 21 is drawn from the short sides of the memory cell regions 2a and 2c and connected therebetween, while the bus 21 is drawn from the short sides of the memory cell regions 2b and 2d and connected therebetween. The upper and lower buses 21 are connected through the vertical buses 21 to each other on the left and right sides of the CPU 3. The bus 21 drawn from the upper side of the CPU 3 is connected with the upper, lateral bus 21.

This configuration allows substantially the same effect as the Example 2 (FIG. 10) to be obtained. Further, a configuration of providing the bus interface 4 may be employed.

Figure 24:
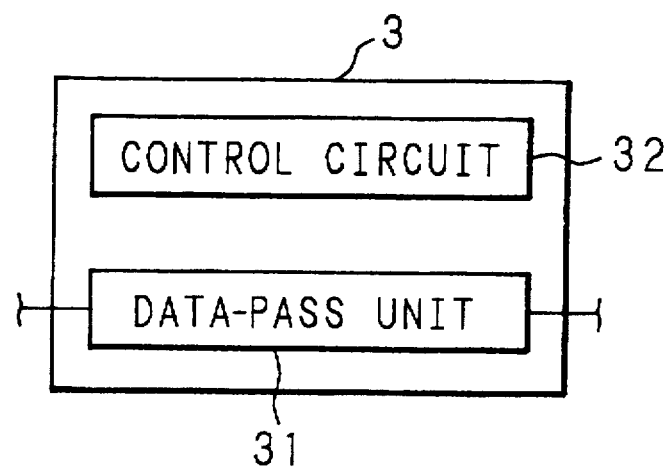
FIG. 24 is a block diagram showing a configuration of a general CPU.
Figure 25:
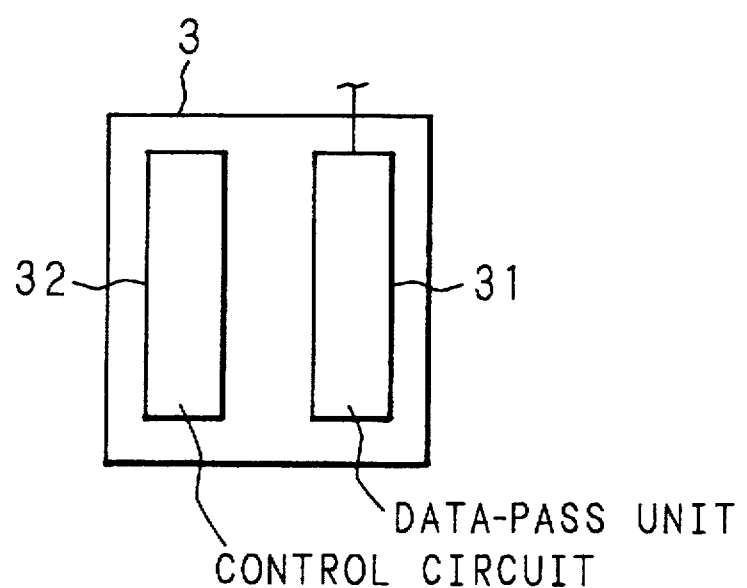
FIG. 25 is a block diagram showing a configuration of a general CPU.
Figure 26:
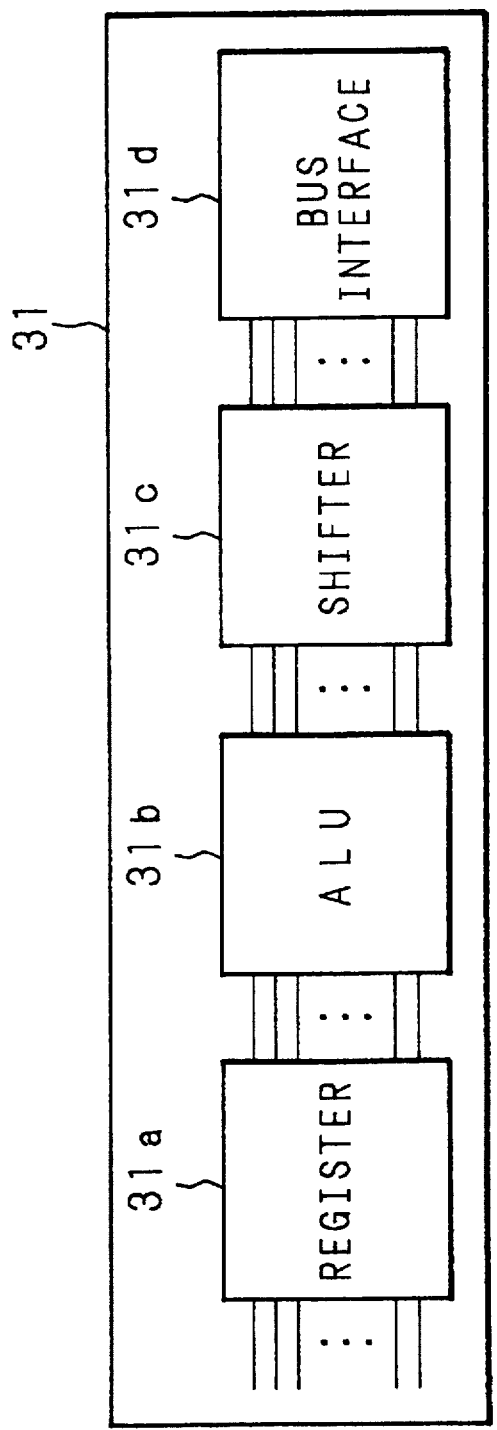
FIG. 26 is a block diagram showing a configuration of a data pass unit shown in FIGS. 24 and 25.

FIGS. 24 and 25 are block diagrams showing a configuration of a general CPU 3. The CPU 3 is provided with a data pass unit 31 and with a control circuit 32 for controlling the operation of the data pass unit 31. In the data pass unit 31, as shown in FIG. 26, devices such as a register 31a, an ALU 31b, a shifter 31c and a bus interface 31d are arranged in a row, and signal lines are connected therebetween. In this case, the data pass unit 3 has a long and narrow shape, and signal lines exist in the longitudinal direction thereof, so that where the connection with the bus 21 is at the upper side (or lower side), an arrangement in which the data pass unit 31 is placed lengthwise in the longitudinal directions suitable as shown in FIG. 25, while where the connection with the bus 21 is at the left side (or right side), an arrangement in which the data pass unit 31 is placed lengthwise in the lateral direction is suitable as shown in FIG. 24.

A case where a peripheral circuit is provided will be explained hereinafter. The peripheral circuit is assumed to be typical ones, such as timers, counters and various controllers.

EXAMPLE 16

Figure 27:
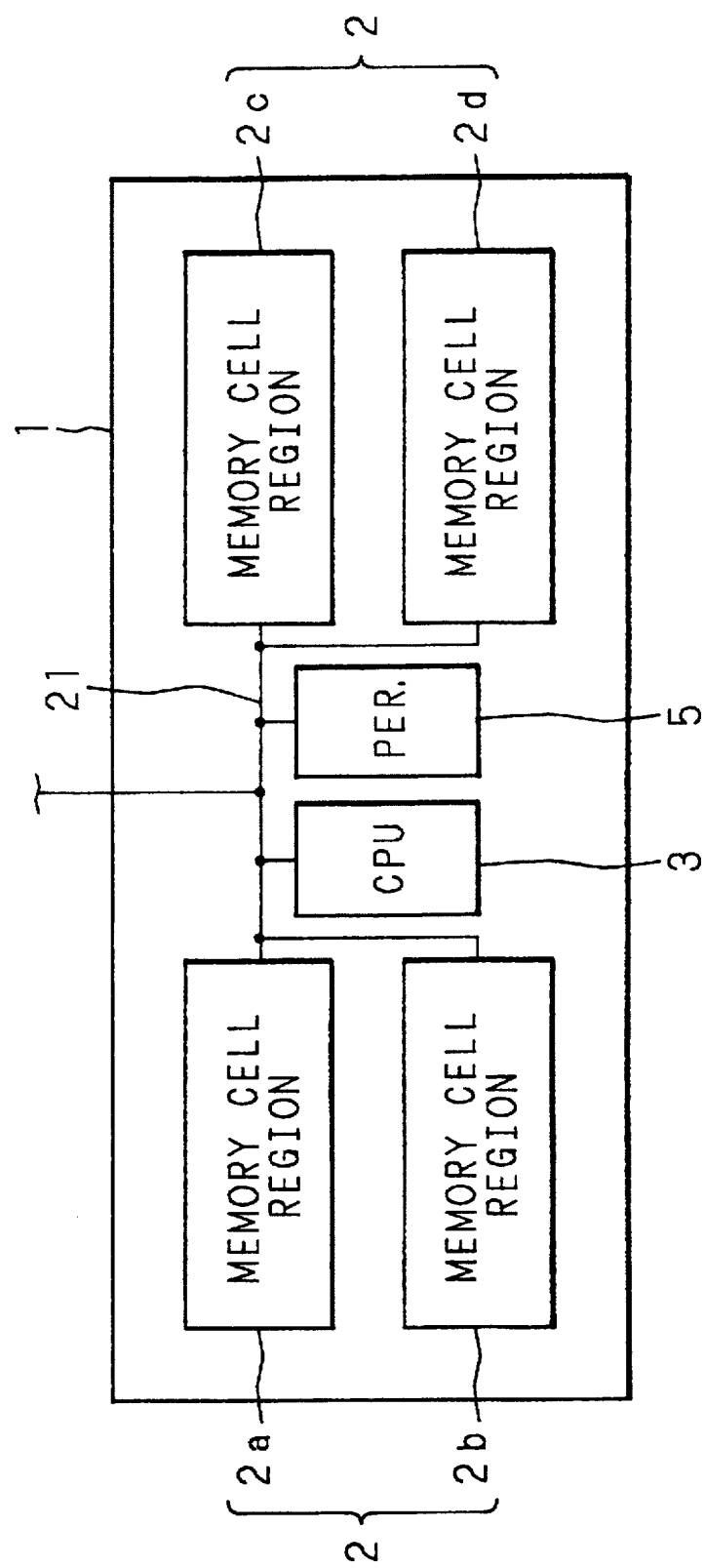
FIG. 27 is a schematic plan view showing an Example 16 of the present invention.

FIG. 27 is a schematic plan view showing Example 16 of the present invention. This Example is configured such that in the configuration of FIG. 9 (Example 1), a peripheral circuit (PER.) 5 is placed laterally and side by side with the CPU 3 and connected with the bus 21 between the memory cell regions 2a and 2c.

EXAMPLE 17

Figure 28:
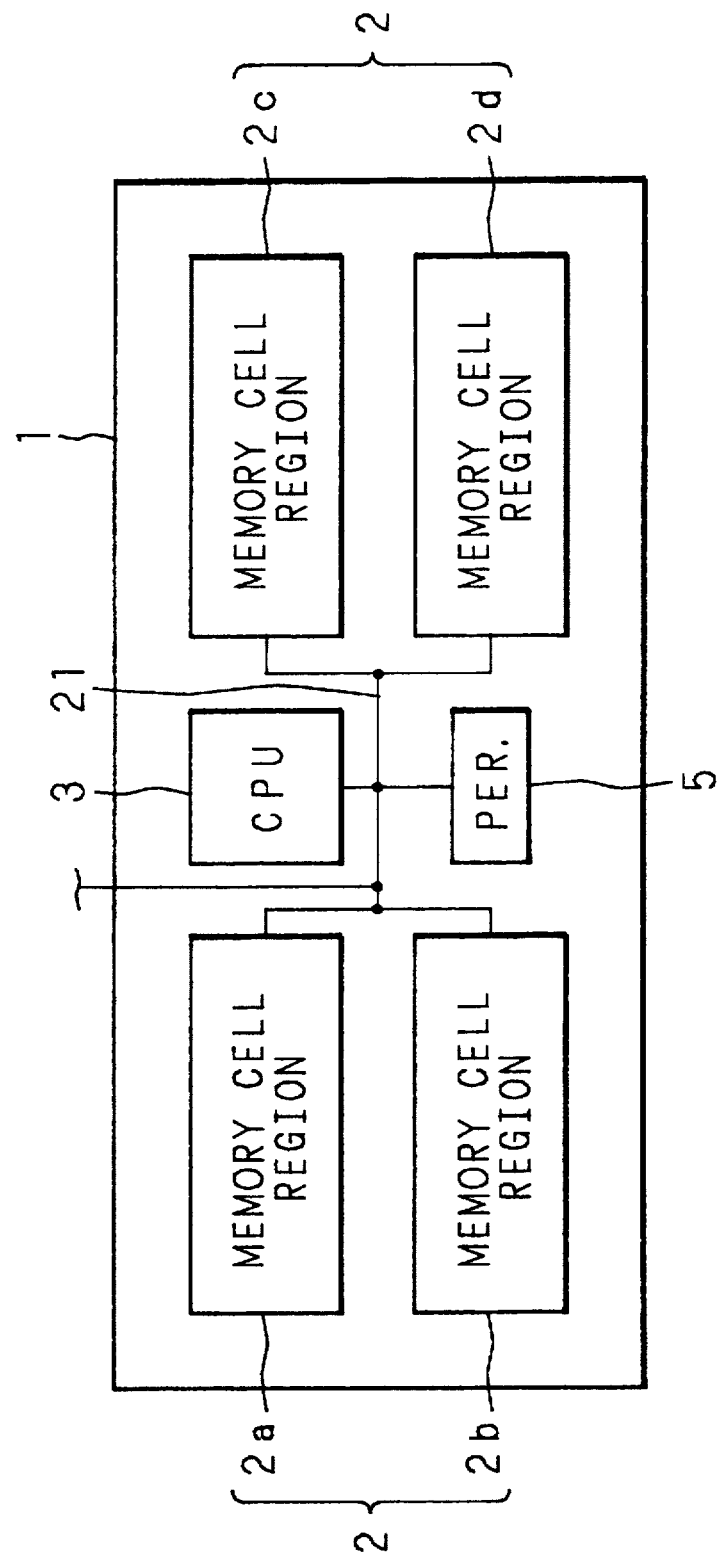
FIG. 28 is a schematic plan view showing an Example 17 of the present invention.

FIG. 28 is a schematic plan view showing Example 17 of the present invention. This Example is configured such that in the configuration of FIG. 27 (Example 16), the peripheral circuit 5 is installed on the opposite side (upper side) of the CPU 3 with respect to the lateral bus 21, and connected with the bus 21 between the memory cell regions 2a and 2c.

In the Example 16, the pins for sending/receiving control signals to/from the peripheral circuit 5 can be concentrated at one side, while in the Example 17, they can be divided into two sides.

EXAMPLE 18

Figure 29:
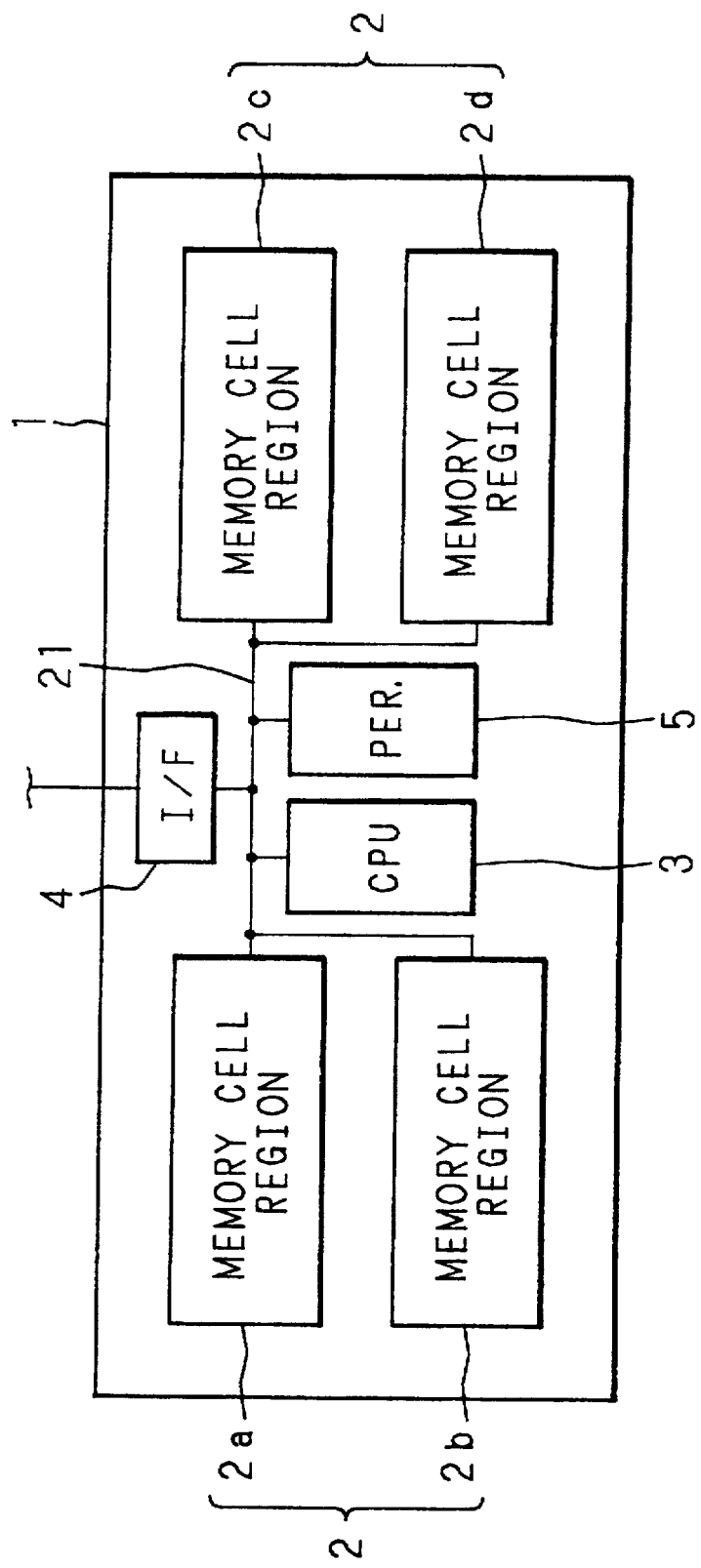
FIG. 29 is a schematic plan view showing an Example 18 of the present invention.

FIG. 29 is a schematic plan view showing Example 18 of the present invention. This Example is configured such that in the configuration of FIG. 27 (Example 16), a bus interface 4 is installed on the opposite side (upper side) of the CPU 3 and the peripheral circuit 5 with respect to the bus 21 between the memory cell regions 2a and 2c, and connected with the bus 21.

EXAMPLE 19

Figure 30:
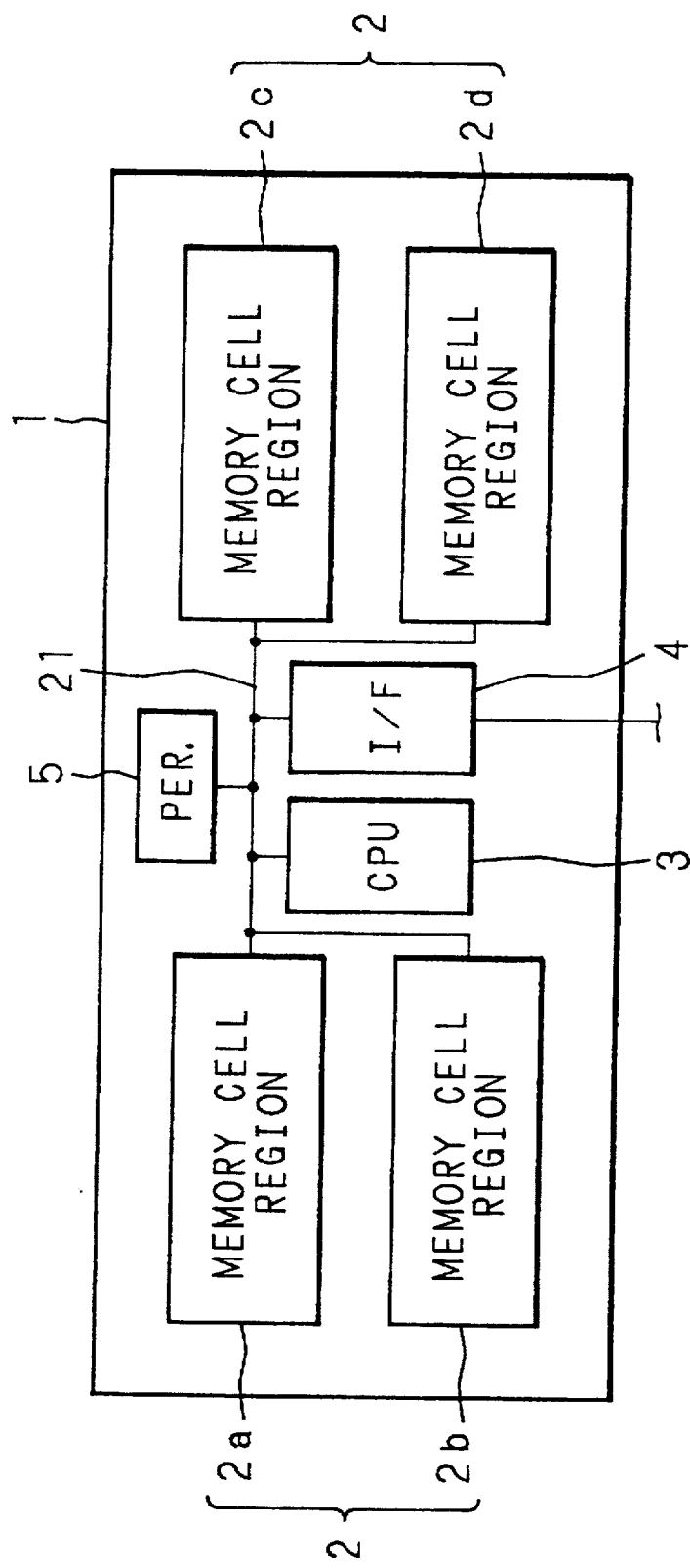
FIG. 30 is a schematic plan view showing an Example 19 of the present invention.

FIG. 30 is a schematic plan view showing Example 19 of the present invention. This Example is configured such that in the configuration of FIG. 29 (Example 18), the bus interface 4 and the peripheral circuit 5 are reversely interchanged in position with each other, and connected with the bus 21.

EXAMPLE 20

Figure 31:
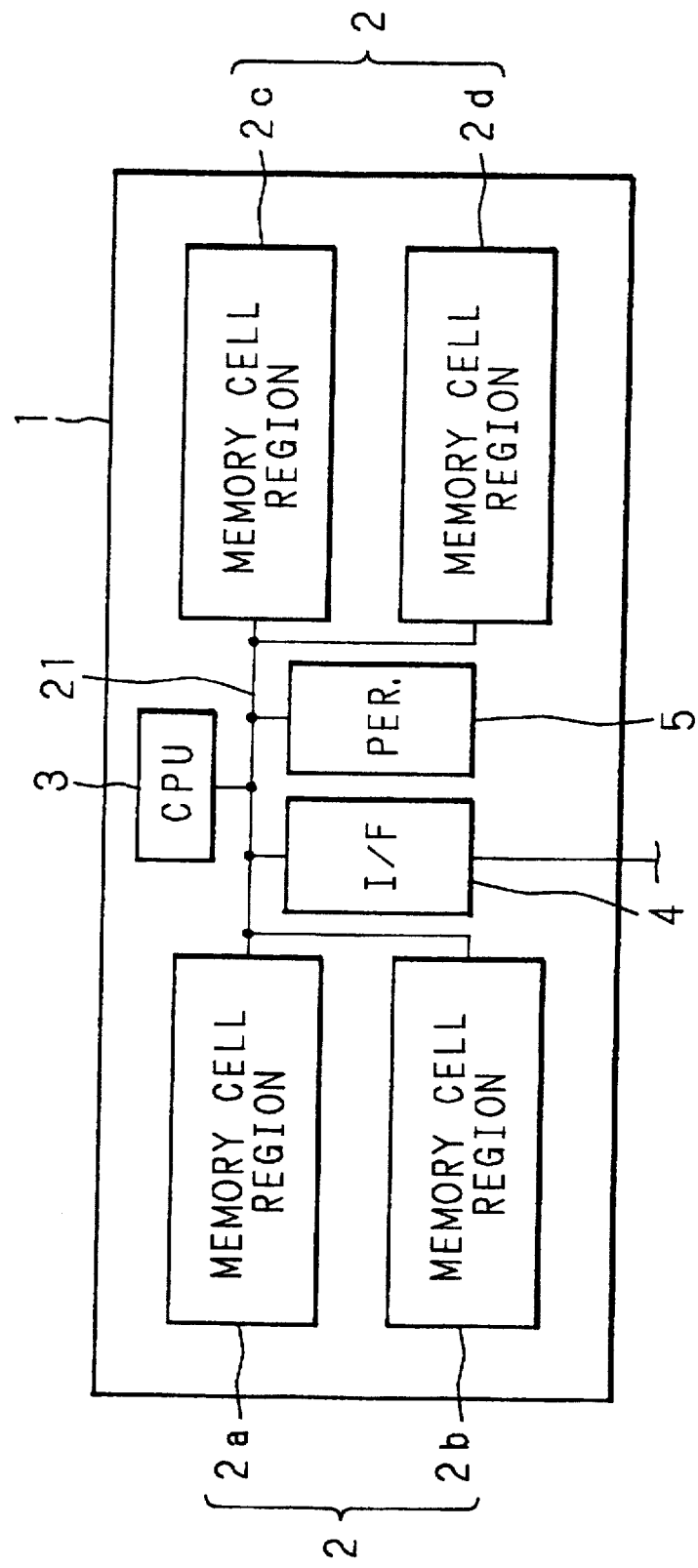
FIG. 31 is a schematic plan view showing an Example 20 of the present invention.

FIG. 31 is a schematic plan view showing Example 20 of the present invention. This Example is configured such that in the configuration of FIG. 28 (Example 17), a bus interface 4 is placed side by side with the peripheral circuit 5, and connected with the bus 21 between the memory cell regions 2a and 2c.

In the present invention, a space is provided between the memory cell regions, in which space the CPU 3 is arranged. Therefore, the peripheral circuit 5 (and the bus interface 4) can be arranged in the remaining space between the memory cell regions as described in the examples 16 through 20. In this manner, the present invention realizes a one-chip microcomputer utilizing effectively the area.

EXAMPLE 21

Figure 32:
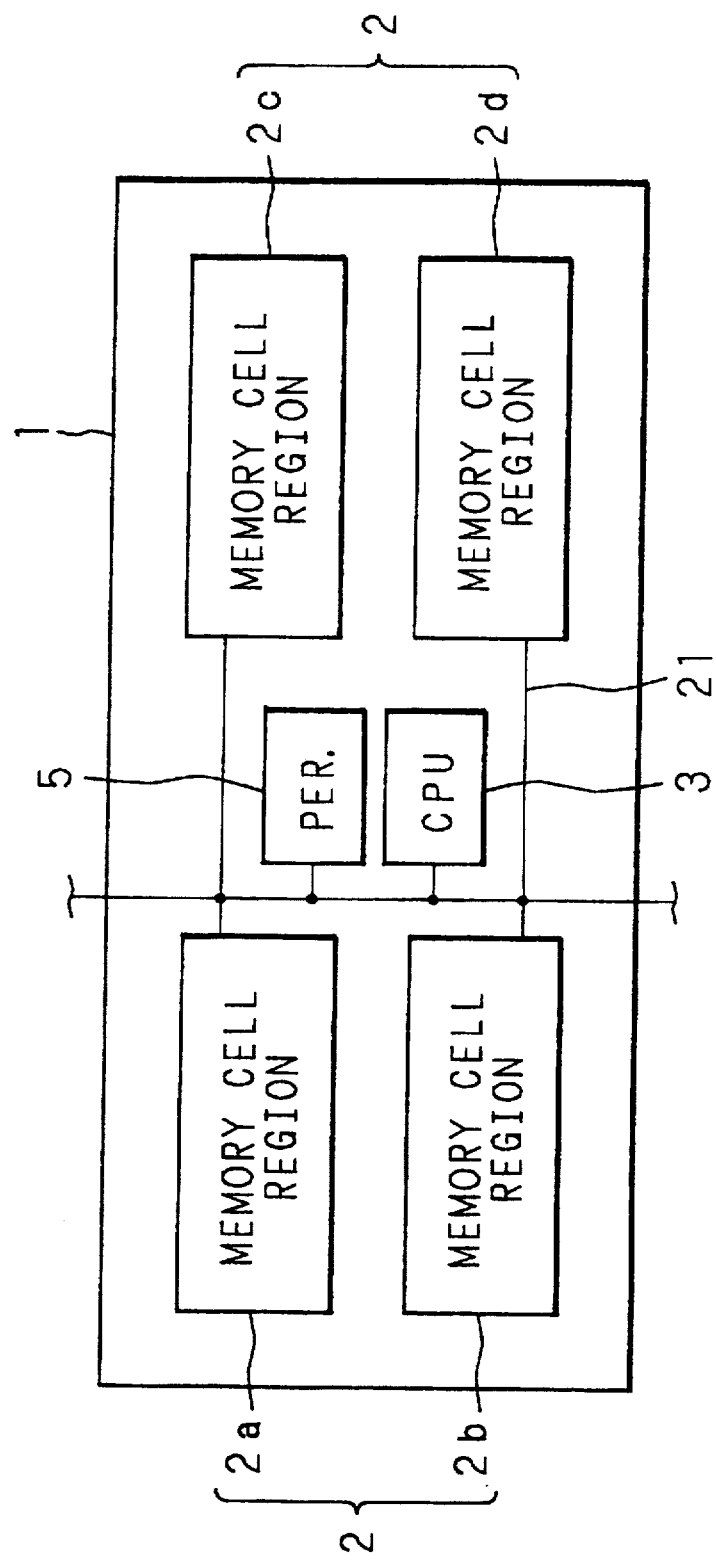
FIG. 32 is a schematic plan view showing an Example 21 of the present invention.

FIG. 32 is a schematic plan view showing Example 21 of the present invention. This Example is configured such that in the configuration of FIG. 10 (Example 2), a peripheral circuit 5 is placed on the upper side of the CPU 3, and connected with the bus 21 between the memory cell regions 2a and 2b.

EXAMPLE 22

Figure 33:
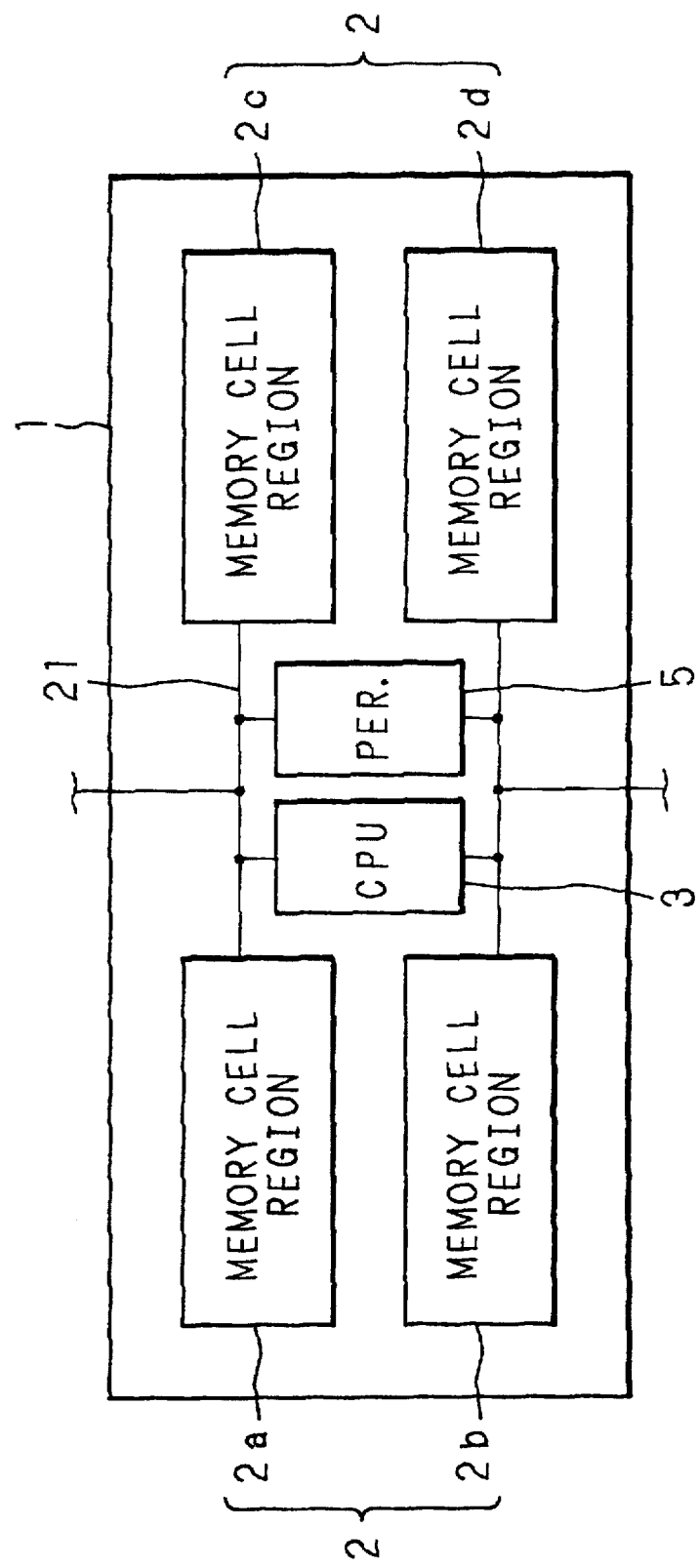
FIG. 33 is a schematic plan view showing an Example 22 of the present invention.

FIG. 33 is a schematic plan view showing Example 22 of the present invention. This Example is configured such that in the configuration of FIG. 11 (Example 3), a peripheral circuit 5 is placed laterally and side by side with the CPU 3, and connected with the bus 21 between the memory cell regions 2a and 2c, and with the bus 21 between the memory cell regions 2b and 2d.

EXAMPLE 23

Figure 34:
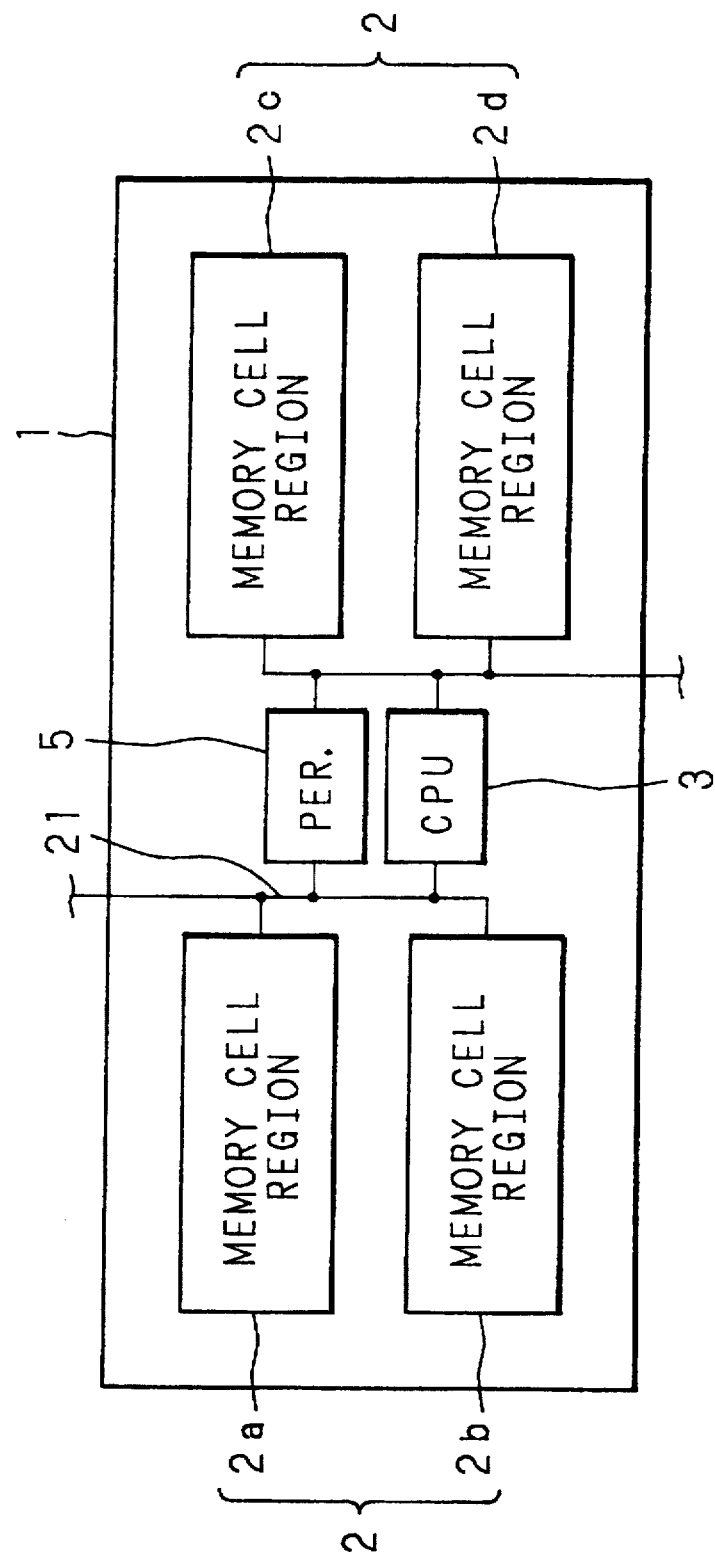
FIG. 34 is a schematic plan view showing an Example 23 of the present invention.

FIG. 34 is a schematic plan view showing Example 23 of the present invention. This Example is configured such that in the configuration of FIG. 12 (Example 4), the peripheral circuit 5 is placed on the upper side of the CPU 3, and connected with the bus 21 between the memory cell regions 2a and 2b, and with the bus 21 between the memory cell regions 2c and 2d.

EXAMPLE 24

Figure 35:
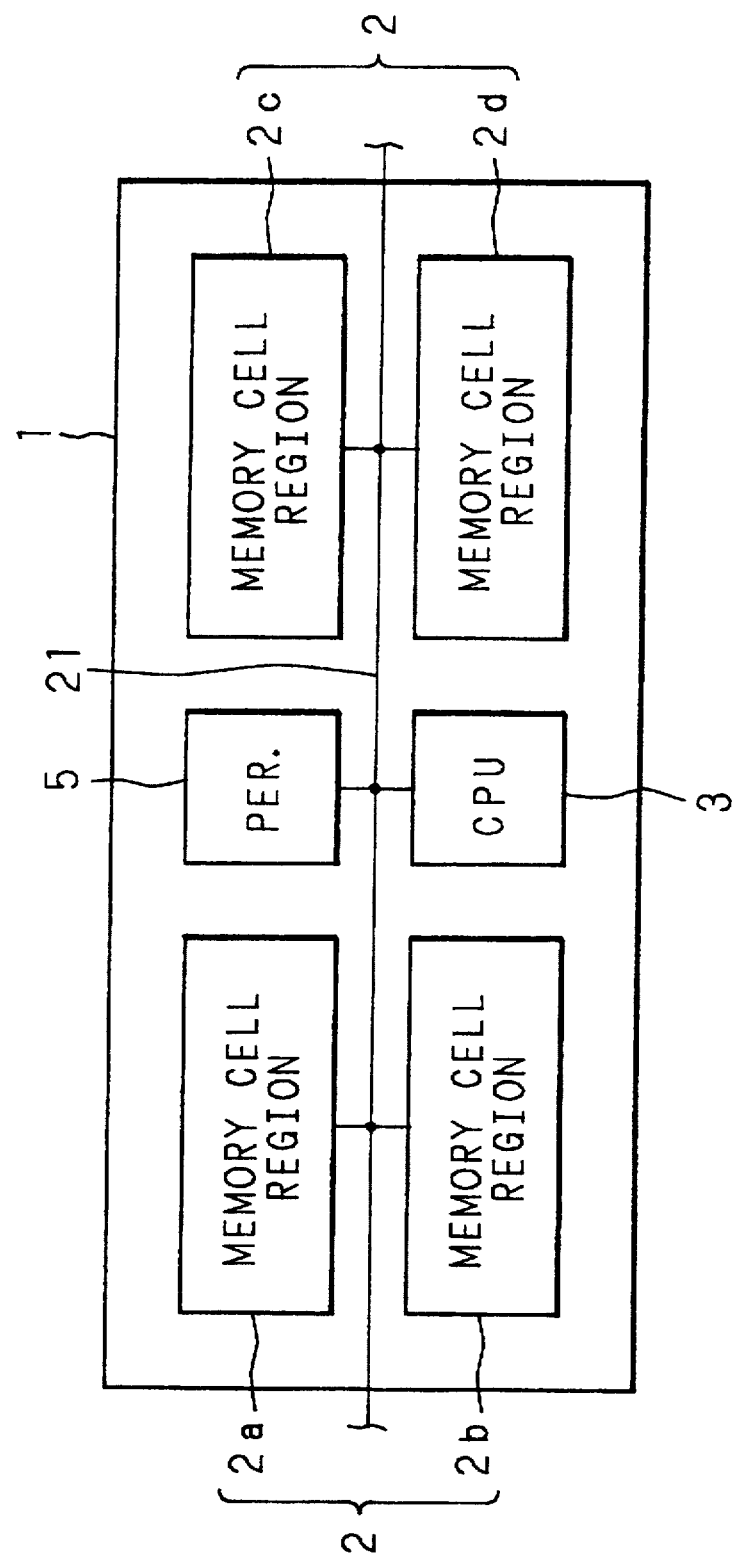
FIG. 35 is a schematic plan view showing an Example 24 of the present invention.

FIG. 35 is a schematic plan view showing Example 24 of the present invention. This Example is configured such that in the configuration of FIG. 13 (Example 5), a peripheral circuit 5 is placed on the upper side of the CPU 3, and connected with the lateral bus 21.

As shown in the Examples 21 through 24, even the configuration shown in the Examples 2 through 5 can include the peripheral circuit 5. Also, as with the Examples 16 through 20, the configuration may include the bus interface 4. This allows the same effect as the Examples 16 through 20 to be obtained.

EXAMPLE 25

Figure 36:
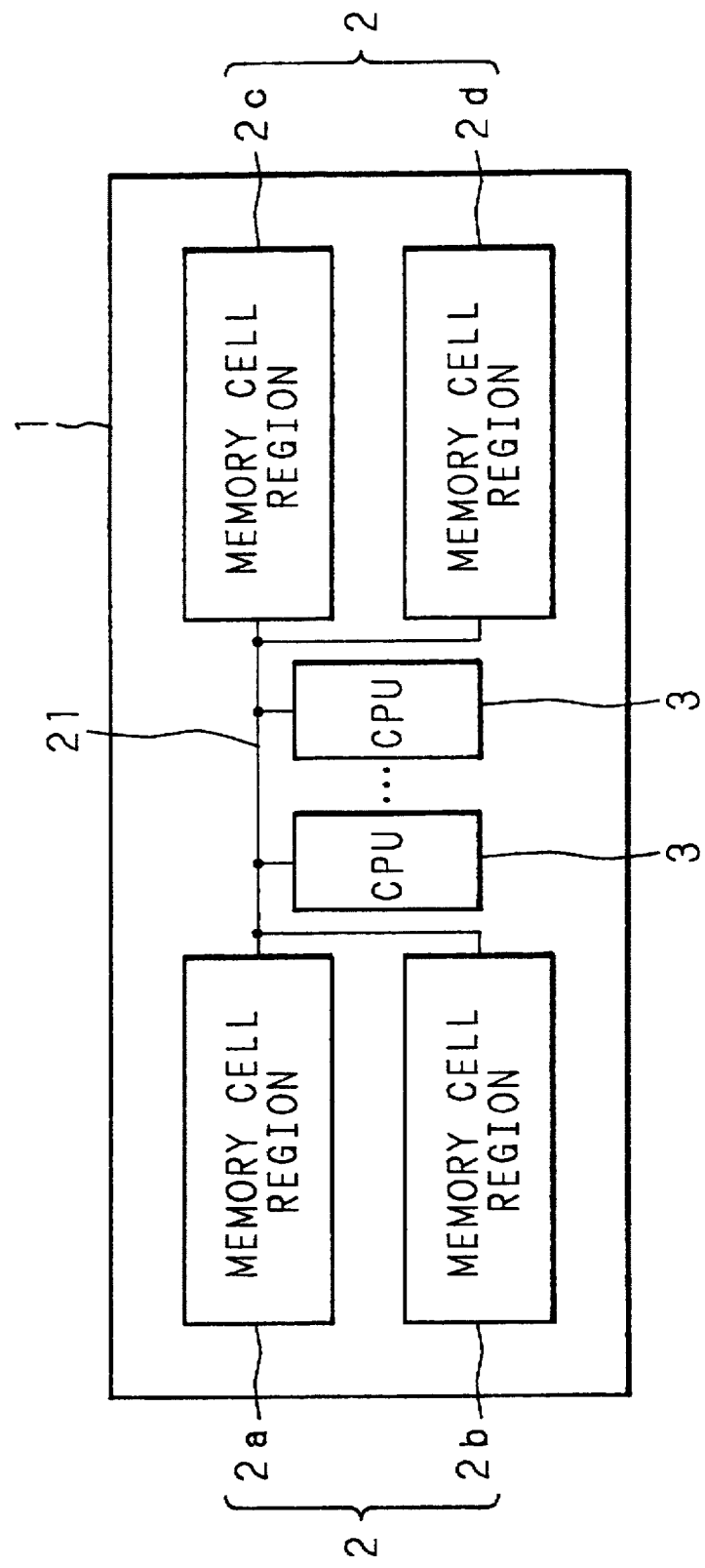
FIG. 36 is a schematic plan view showing an Example 25 of the present invention.

FIG. 36 is a schematic plan view showing Example 25 of the present invention. This Example is configured such that in the configuration of FIG. 27, instead the peripheral circuit 5, another CPU 3 is included and thus two (or more) CPUs 3 are included to form a multi-processor.

EXAMPLE 26

Figure 37:
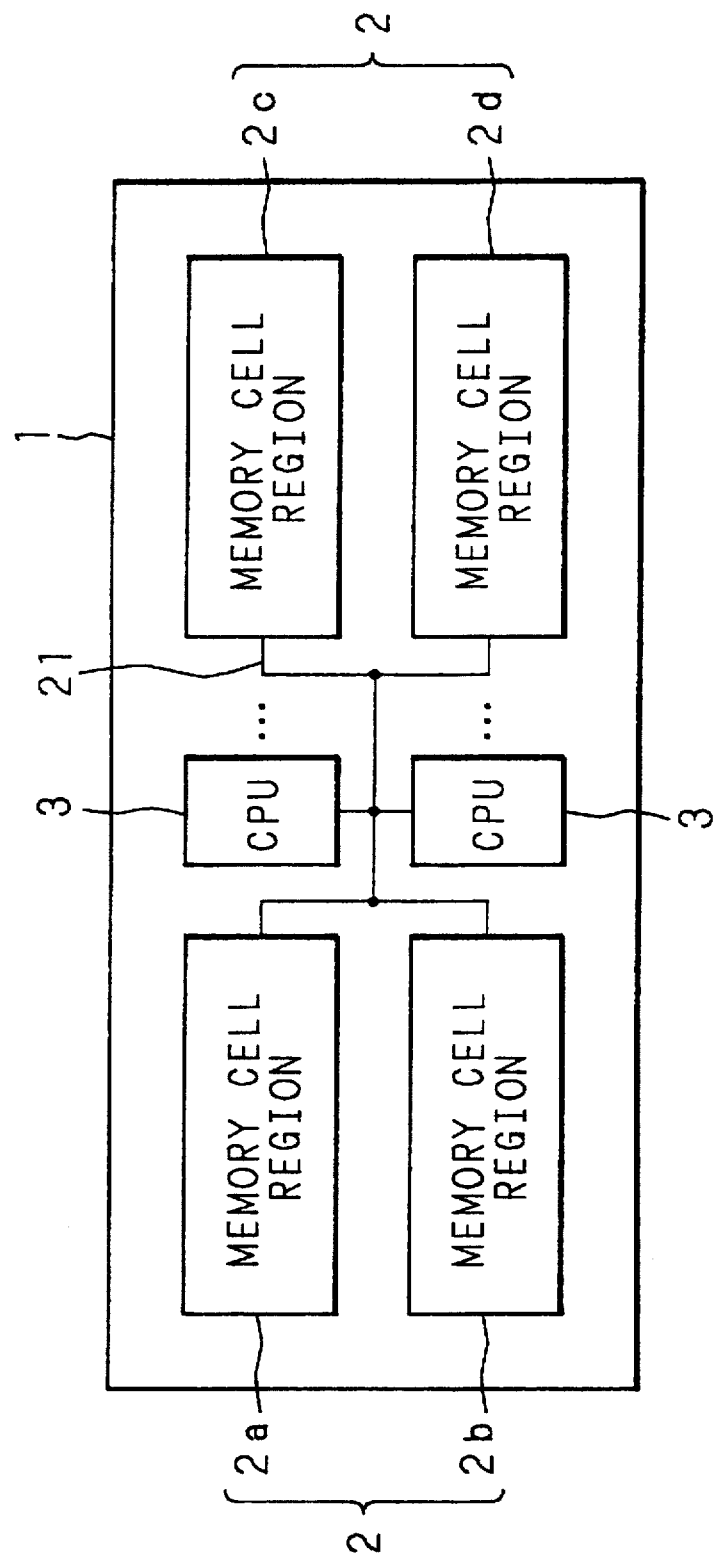
FIG. 37 is a schematic plan view showing an Example 26 of the present invention.

FIG. 37 is a schematic plan view showing Example 26 of the present invention. This Example also shows a multi-processor including two (or more) CPUs on both the (upper and lower) sides of the bus 21 between the memory cell regions 2a and 2c.

EXAMPLE 27

Figure 38:
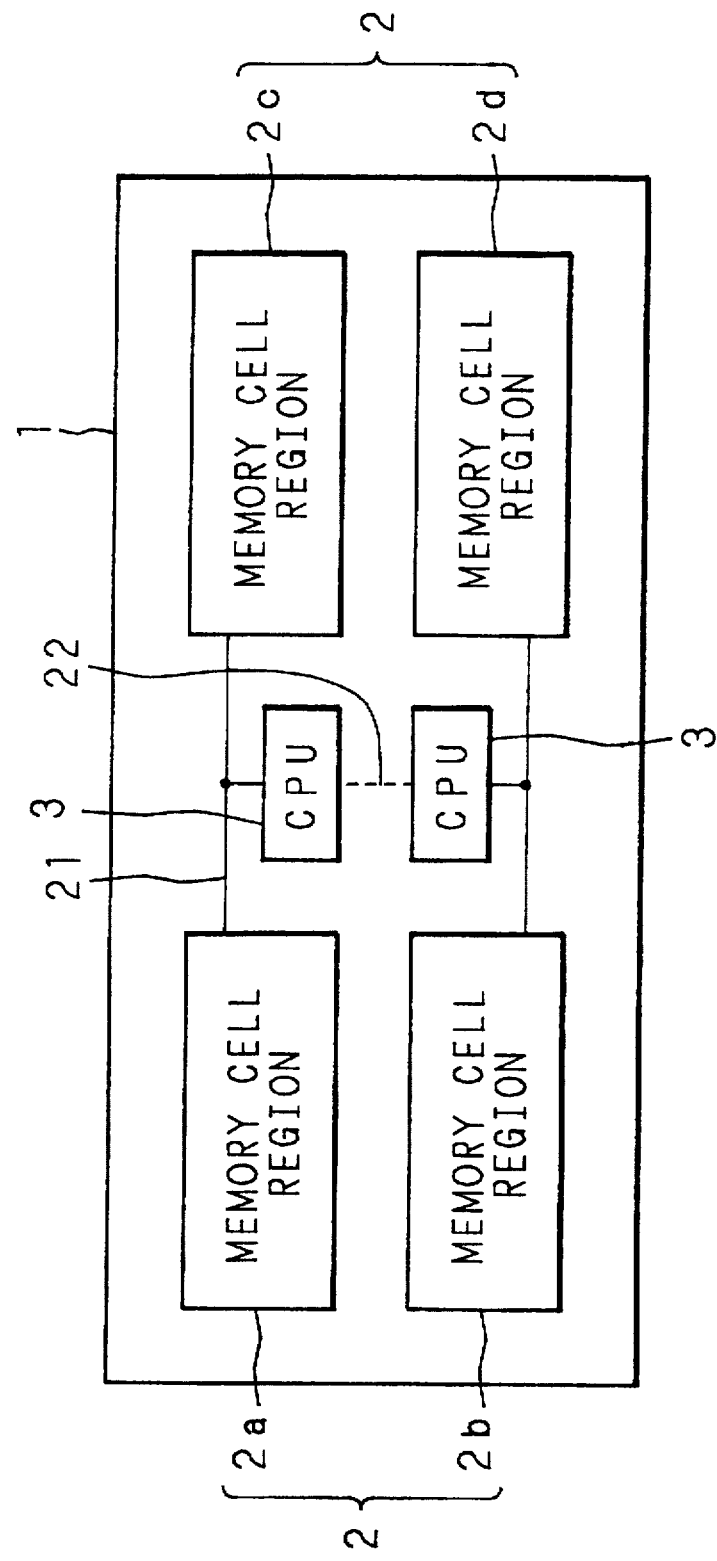
FIG. 38 is a schematic plan view showing an Example 27 of the present invention.

FIG. 38 is a schematic plan view showing Example 27 of the present invention. This Example also shows a multi-processor including two (or more) CPUs between the bus 21 between the memory cell regions 2a and 2c, and the bus 21 between the memory cell regions 2b and 2d. In FIG. 38, a bus 22 between the CPUs 3 is a control signal bus.

Employing these configurations of the multi-processor allows a plurality of programs to be executed. In this case, the function and size of a plurality of CPUs 3 may be equal to or different from each other.

EXAMPLE 28

Figure 39A:
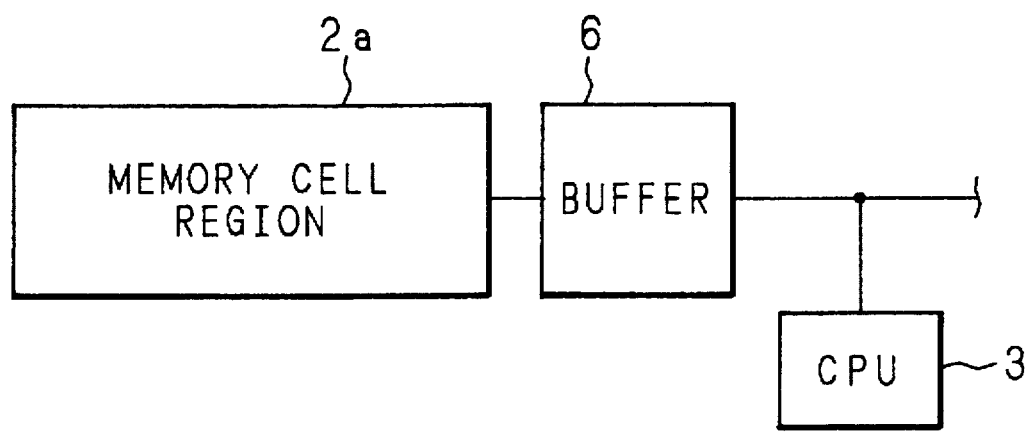
FIG. 39A is a schematic plan view showing an Example 28 of the present invention.
Figure 39B:
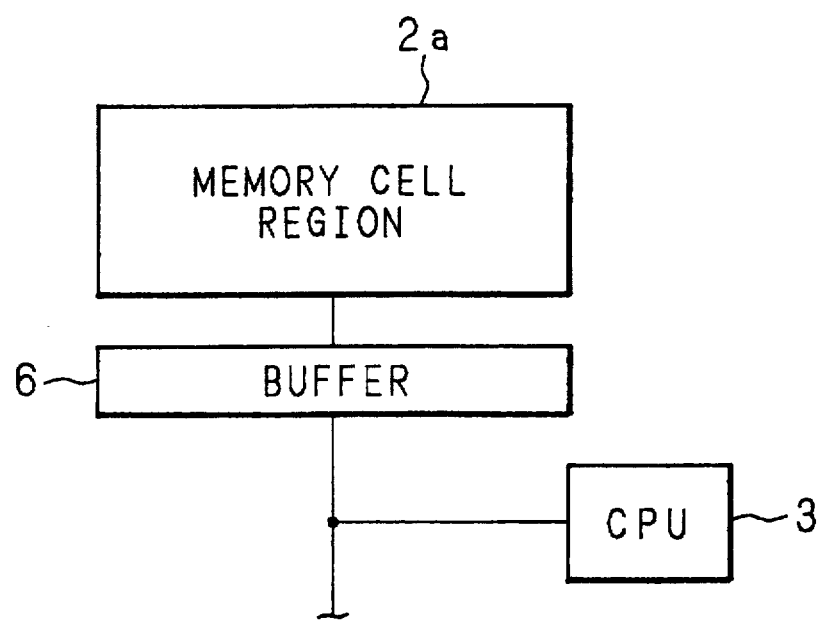
FIG. 39B is a schematic plan view showing an Example 28 of the present invention.

FIG. 39 shows a configuration in which a buffer 6 is provided between the memory cell region 2a and the CPU 3, and applicable for the above-mentioned all Examples. FIG. 39A shows a case where the bus 21 is connected to the short side of the memory cell region 2a, assuming that the length of the buffer 6 is the same as the short side. FIG. 39B shows a case where the bus 21 is connected to the long side of the memory cell region 2a, assuming that the length of the buffer 6 is the same as the long side. Such buffer 6 may be provided to all memory cell regions (2a, 2b, 2c, 2d ... ), or only to memory cell regions required to synchronize with the CPU 3.

Providing the buffer 6 between the memory cell region 2a and the CPU 3 allows the memory cell region 2a to synchronize with the CPU 3. A high speed operation can be realized by allowing required data to have been previously transferred from the memory cell region 2a to the buffer 6 prior to the processing of reading from the CPU 3. Also, a high speed operation can be realized by allowing data to be held in the buffer 6 in processing of reading from the CPU 3, and then transferring the data from the buffer 6 to the memory cell region 2a in parallel with the later processing of the CPU 3.

The buffer 6 is assumed to have configurations shown in FIGS. 40, 41, 42 and 43.

Figure 40:
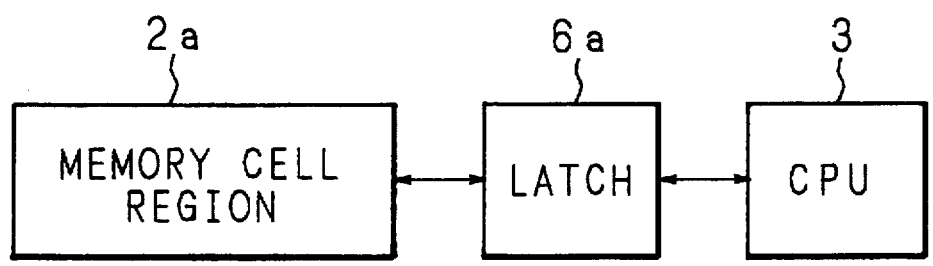
FIG. 40 is a block diagram showing a configuration of a buffer.
Figure 41:
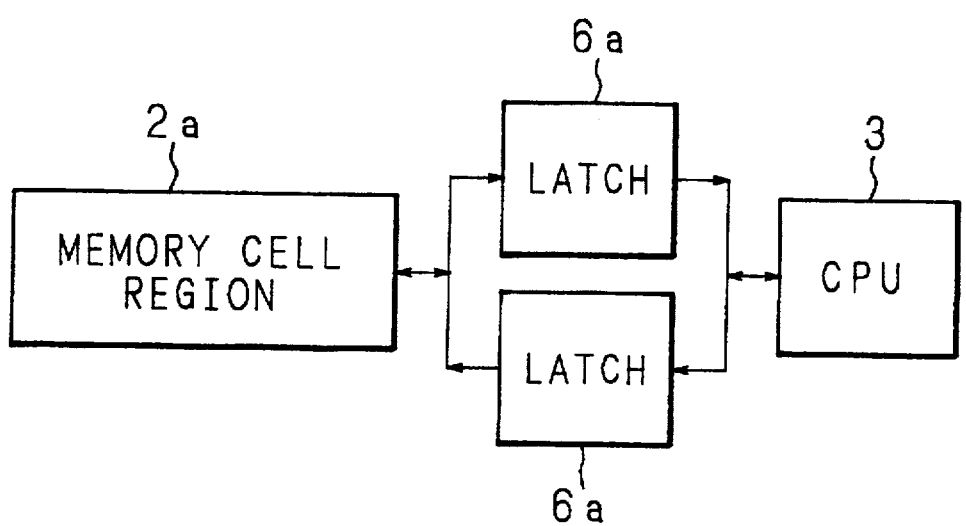
FIG. 41 is a block diagram showing a configuration of a buffer.
Figure 42:
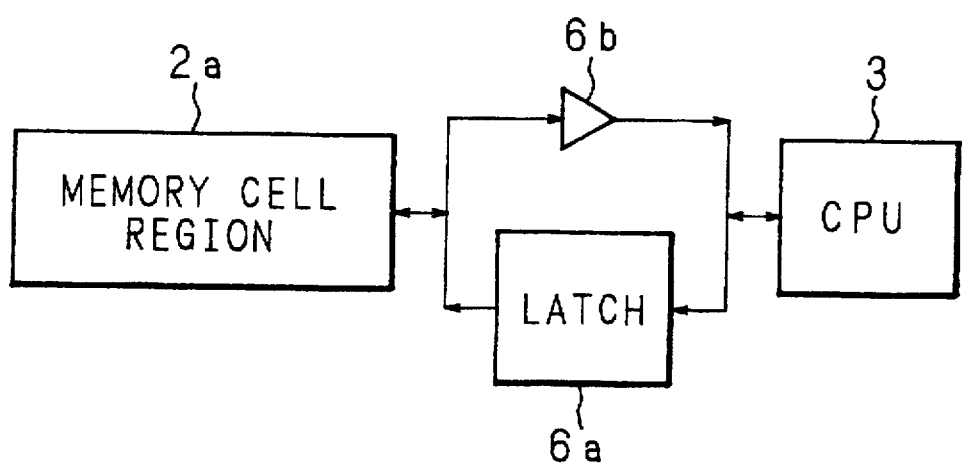
FIG. 42 is a block diagram showing a configuration of a buffer.
Figure 43:
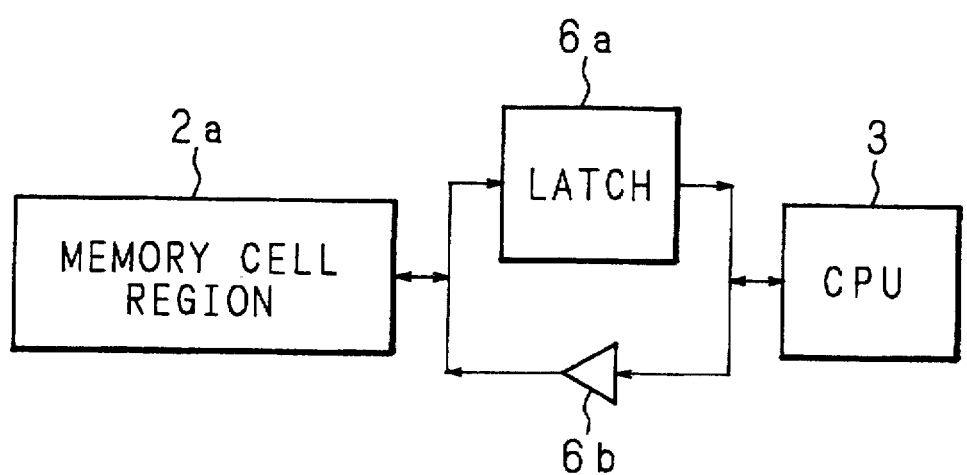
FIG. 43 is a block diagram showing a configuration of a buffer.

In FIG. 40 the buffer 6 is configured by a latch 6a for latching bidirectional signals. In FIG. 41 the buffer 6 is configured by two latches 6a for latching uni-directional signals. One latch 6a is dedicated to signals given from the memory cell region 2a to the CPU 3, while the other latch 6a is dedicated to signals given from the CPU 3 to the memory cell region 2a. In FIGS. 42 and 43 the buffer 6 is configured by a latch 6a for latching by a uni-directional signal and a driver 6b. In FIG. 42 the buffer 6 is provided with the driver 6b for signals given from the memory cell region 2a to the CPU 3 and with the latch 6a for signals given from the CPU 3 to the memory cell region 2a. In FIG. 43 the buffer 6 is provided with the latch 6a for signals given from the memory cell region 2a to the CPU 3 and with the driver 6b for signals given from the CPU 3 to the memory cell region 2a. Also, in FIGS. 40, 41, 42 and 43, the latch 6a may be changed to a flip-flop.

Although the configuration shown in FIG. 40 can process only uni-directional signals at a time, the configurations shown in FIGS. 41, 42 and 43 can process simultaneously bidirectional signals. For example, the accesses for writing and reading can be simultaneously executed. The driver 6b is larger in occupying area than the latch 6a, so that the configurations shown in FIGS. 42 and 43 are more suitable for miniaturization than the others. The latch 6a can hold temporarily signals inputted and drive output signals without allowing the output signals to synchronize with the change in the input signals. The driver 6b amplifies signals inputted to output, but has not a holding function.

EXAMPLE 29

Figure 44:
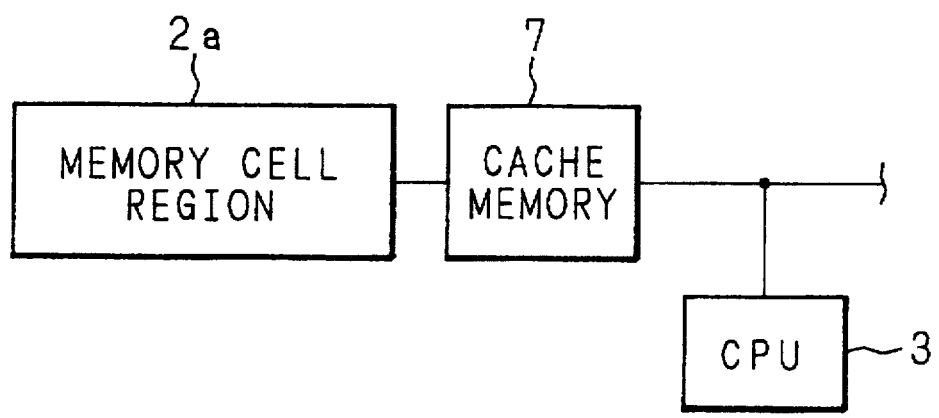
FIG. 44 is a schematic plan view showing an Example 29 of the present invention.

FIG. 44 is a schematic plan view showing Example 29 of the present invention. This Example is configured such that a cache memory 7 is provided between the memory cell region 2a and the CPU 3. Where a region assigned to the cache memory 7 is accessed, an access to the memory cell region 2a is not required, so that a high speed operation can be realized. Also, the cache memory 7, as with the buffer 6, may be provided in all memory cell regions, or only in memory cell regions required to synchronize with the CPU 3.

Those containing a cache memory in a DRAM to achieve a high speed operation have been proposed by the present applicant through the Japanese Patent Application Laid-Open No. 4-247535 (1992), Japanese Patent Application Laid-Open No. 5-310130 (1993), Japanese Patent Application Laid-Open No. 5-299968 (1993), and Japanese Patent Application Laid-Open No. 5-160265 (1993). Also, refer to "K. Dosaka et al., A 100 MHz 4-Mb Cache DRAM with Fast Copy-Back Scheme, IEEE Journal of Solid-State Circuits, Vol. 27, No. 11, pp. 1534–1539, November 1992," "K. Dosaka et al., A 4-Mb Cache DRAM with Fast Copy-Back Scheme Operable at 100 MHz, The Institute of Electronics, Information and Communication Engineers, SDM92-5 ICD92-5, pp. 27–34, Apr. 23, 1992," "A. Yamazaki et al., A Concurrent CDRAM for Low Cost Multi-Media, Symposium on VLSI Circuits of Digest of Technical Papers, pp. 61–62, May 1993" and "A. Yamazaki et al., Cache DRAM for Image, The Institute of Electronics, Information and Communication Engineers, Technical Reports, ICD93-105, pp. 9–14 (1993-10)."

EXAMPLE 30

Figure 45:
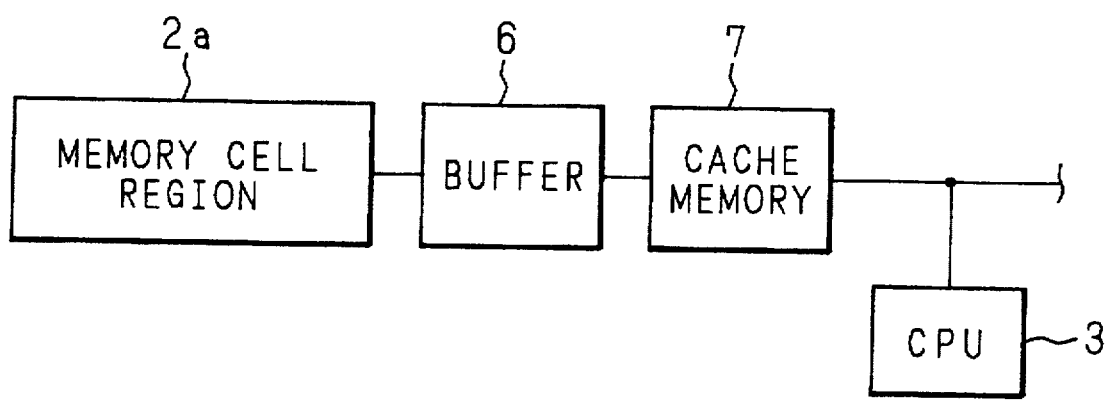
FIG. 45 is a schematic plan view showing an Example 30 of the present invention.

FIG. 45 is a schematic plan view showing Example 30 of the present invention. This Example is configured such that the buffer 6 and the cache memory 7 are provided in that order between the memory cell region 2a and the CPU 3. Obtained in this Example are the effect of the Example 28 and the effect of the Example 29.

EXAMPLE 31

Figure 46:
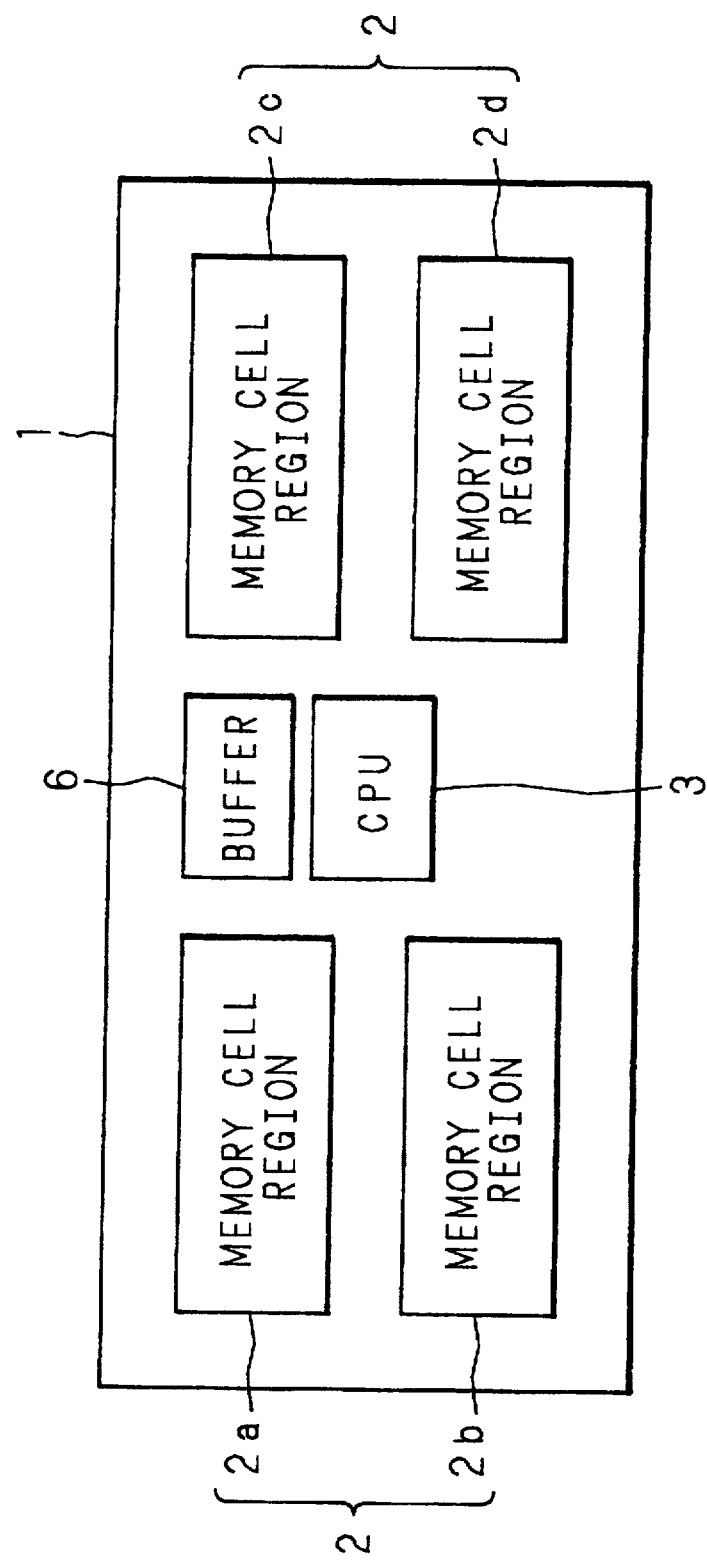
FIG. 46 is a schematic plan view showing an Example 31 of the present invention.

FIG. 46 is a schematic plan view showing Example 31 of the present invention. In the following Examples 31 through 36, the buffer 6 and/or the cache memory 7 are provided not to each memory cell region but to the CPU 3. In this Example, the buffer 6 is arranged in a space on the upper side (or lower side) of the CPU 3.

EXAMPLE 32

Figure 47:
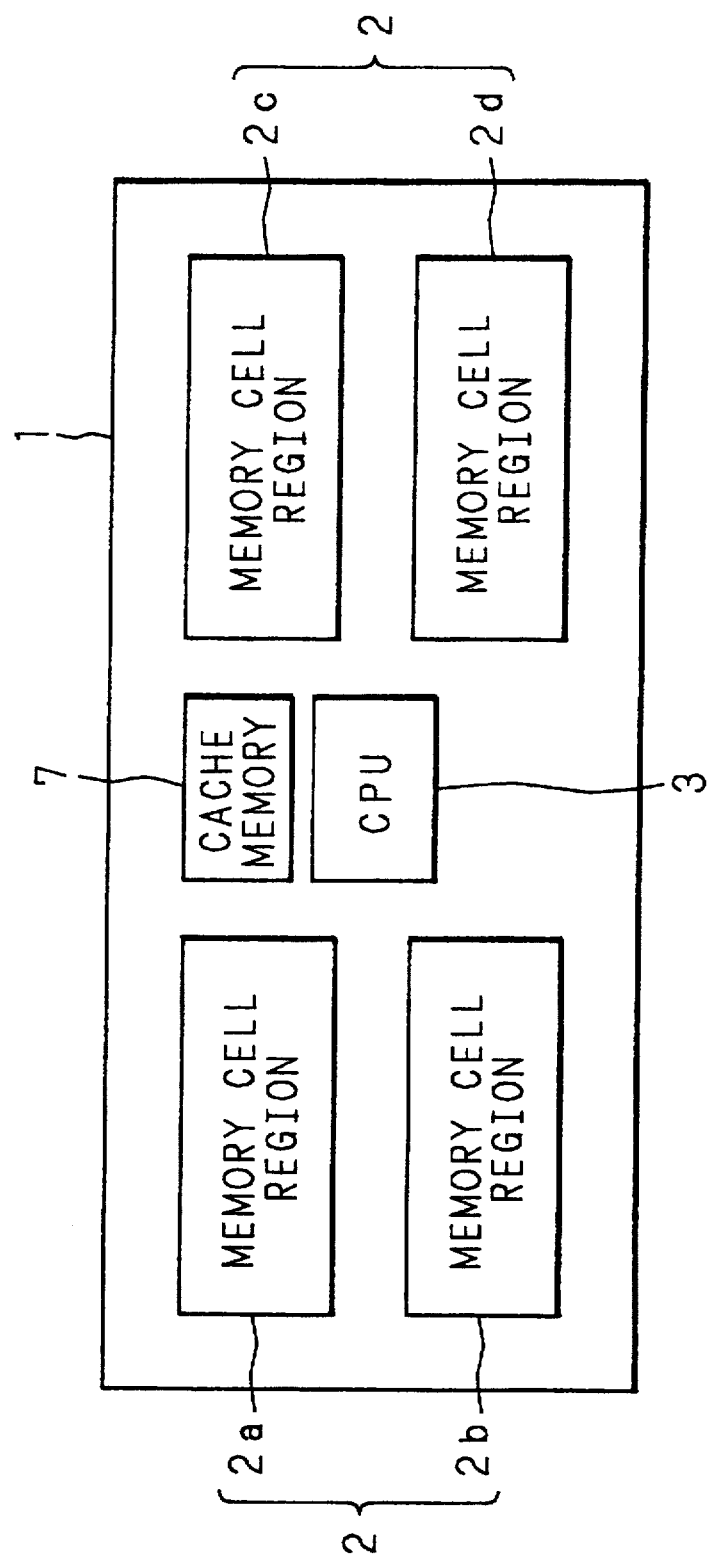
FIG. 47 is a schematic plan view showing an Example 32 of the present invention.

FIG. 47 is a schematic plan view showing Example 32 of the present invention. In this Example, the cache memory 7 is arranged in a space on the upper side (or lower side) of the CPU 3.

EXAMPLE 33

Figure 48:
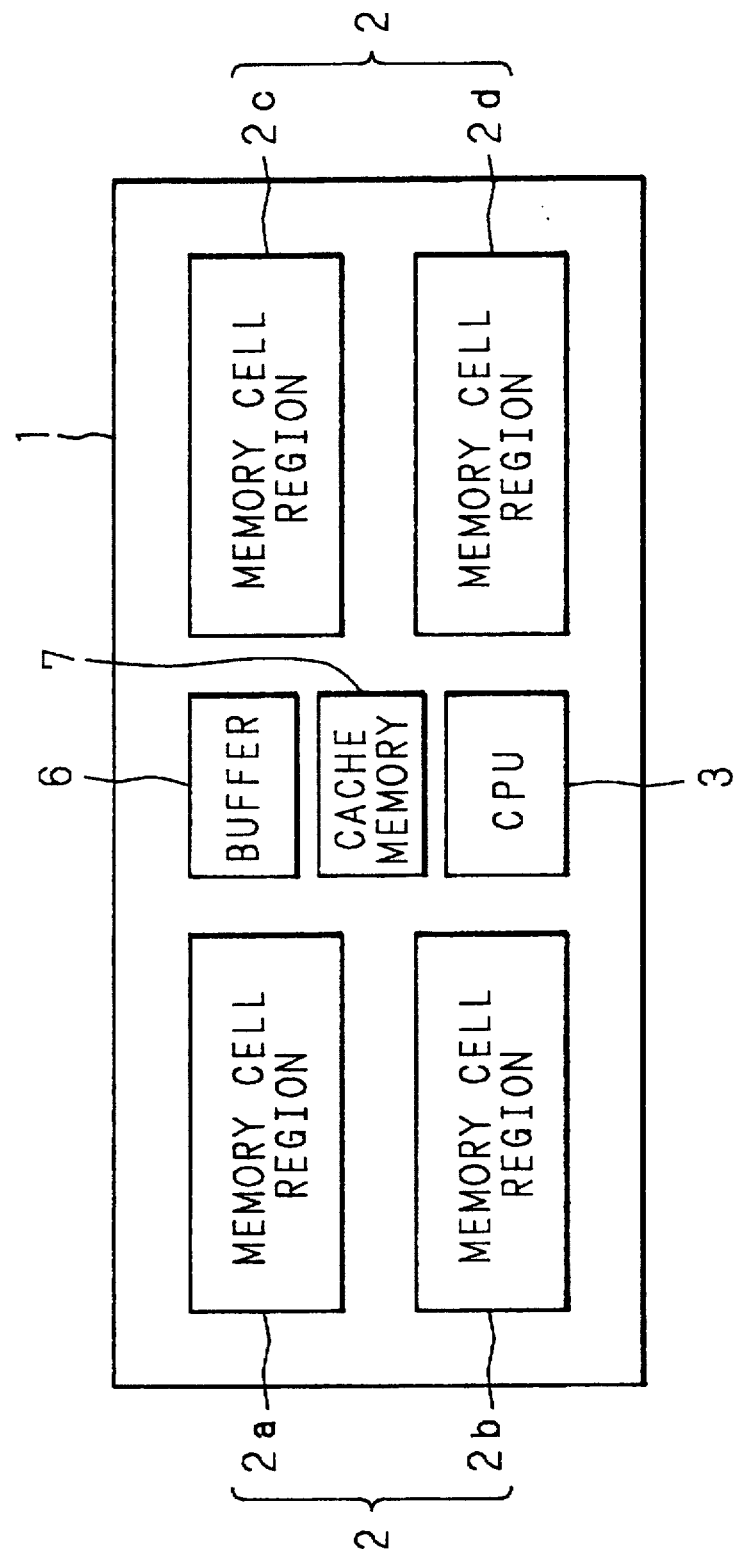
FIG. 48 is a schematic plan view showing an Example 33 of the present invention.

FIG. 48 is a schematic plan view showing Example 33 of the present invention. In this Example, the cache memory 7 is arranged in a space on the upper side (or lower side) of the CPU 3, and the buffer 6 is arranged in a space on the upper side (or lower side) thereof.

In the Examples 31, 32 and 33, where the length of the CPU 3 in the direction of the short side of the memory cell regions is sufficiently shorter than the length in the direction of the short side of the memory cell region row to provide a space, the buffer 6 and/or the cache memory 7 can be arranged without increasing the length in the direction of the long side of the memory cell regions.

EXAMPLE 34

Figure 49:
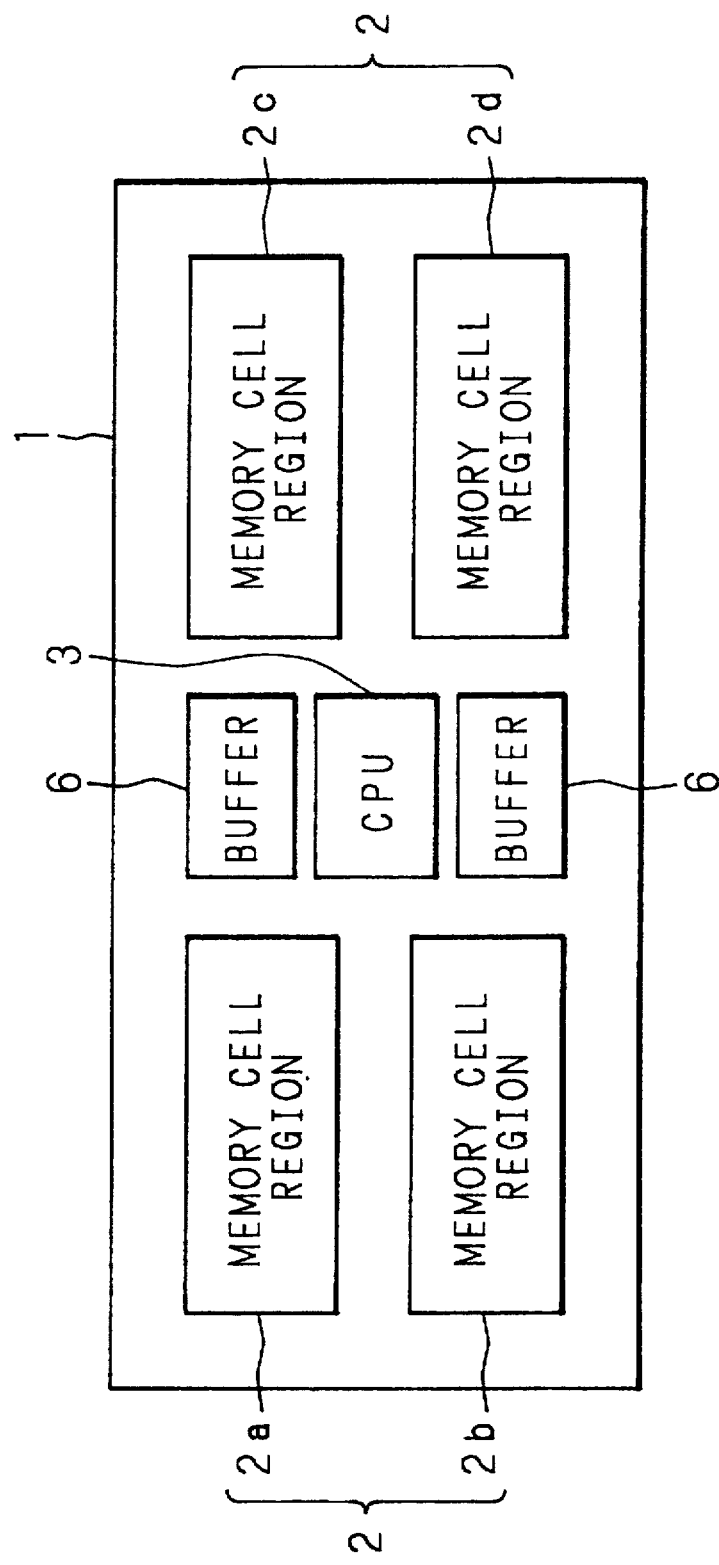
FIG. 49 is a schematic plan view showing an Example 34 of the present invention.

FIG. 49 is a schematic plan view showing Example 34 of the present invention. In this Example, the buffers 6 are arranged on the upper and lower sides of the CPU 3.

In addition to the above-mentioned effect with respect to the layout, this Example is suitable for a case such as the Example 3 wherein the buses 21 for systems are drawn from the both sides (upper and lower sides) of the CPU 3 to access two memory cell regions.

EXAMPLE 35

Figure 50:
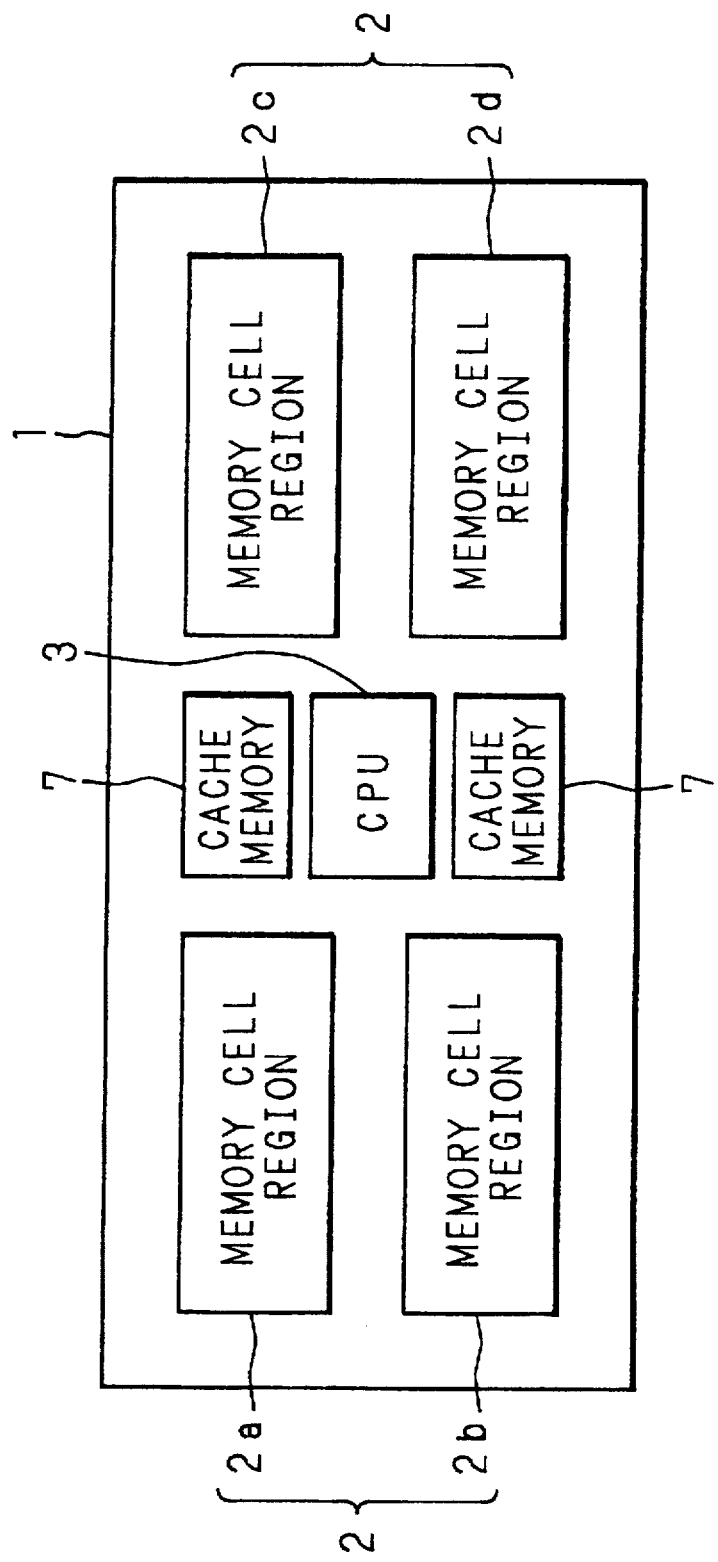
FIG. 50 is a schematic plan view showing an Example 35 of the present invention.

FIG. 50 is a schematic plan view showing Example 35 of the present invention. In this Example, the cache memories 7 are arranged on the upper and lower sides of the CPU 3.

In addition to the above-mentioned effect with respect to the layout, in this Example, two cache memories 7 can be accessed in parallel.

EXAMPLE 36

Figure 51:
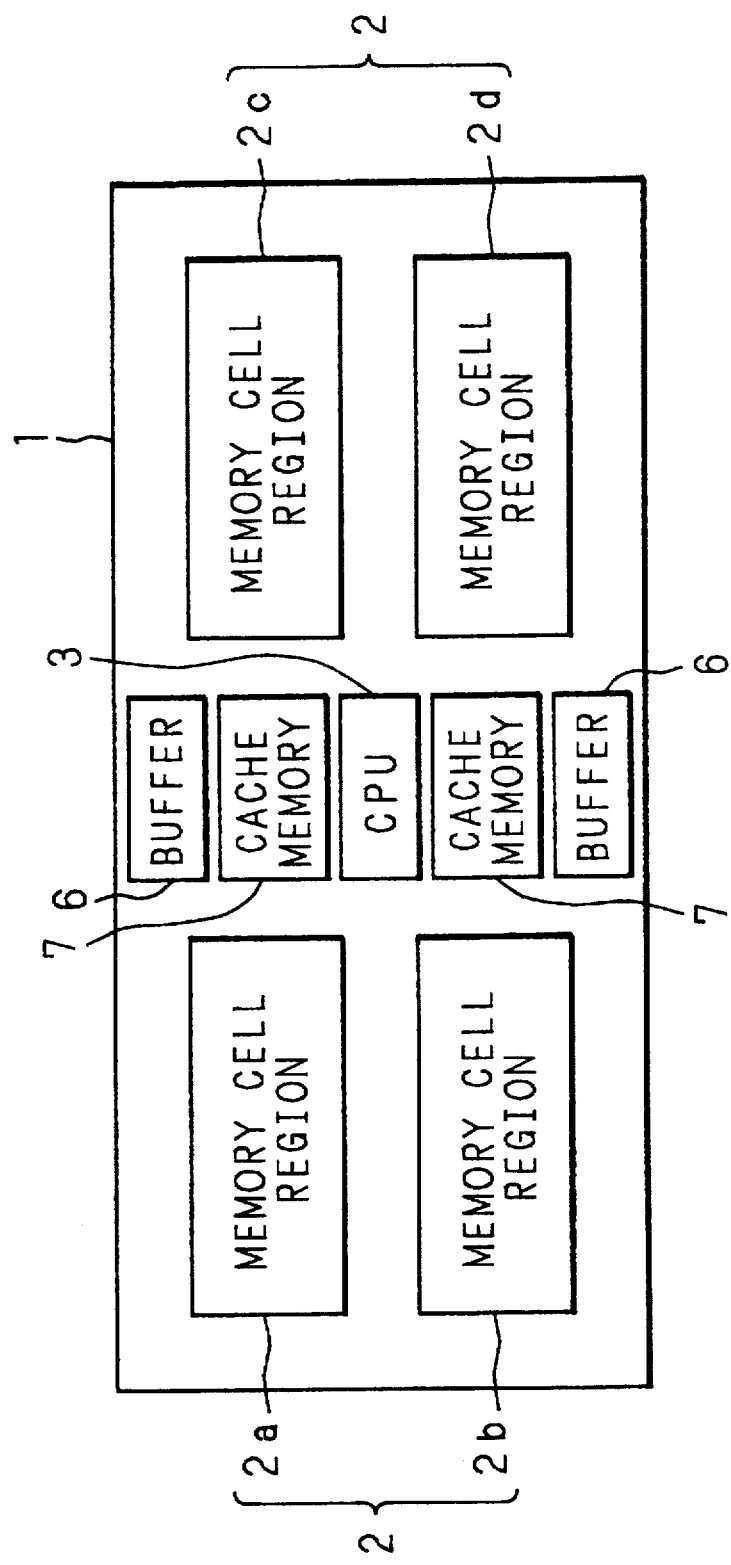
FIG. 51 is a schematic plan view showing an Example 36 of the present invention.

FIG. 51 is a schematic plan view showing Example 36 of the present invention. In this Example, the cache memories 7 are arranged on the upper and lower sides of the CPU 3, and further the buffers 6 are arranged on the upper and lower sides of the cache memories 7.

In this Example, as with the Example 35, two cache memories 7 can be accessed in parallel, and in addition, the buffers 6 are provided between the memory cell region corresponding to each cache memory 7 and the CPU 3, so that the access between the cache memory 7 and the memory cell region can be gained at a higher speed, thereby achieving a higher speed operation as a whole.

EXAMPLE 37

Figure 52:
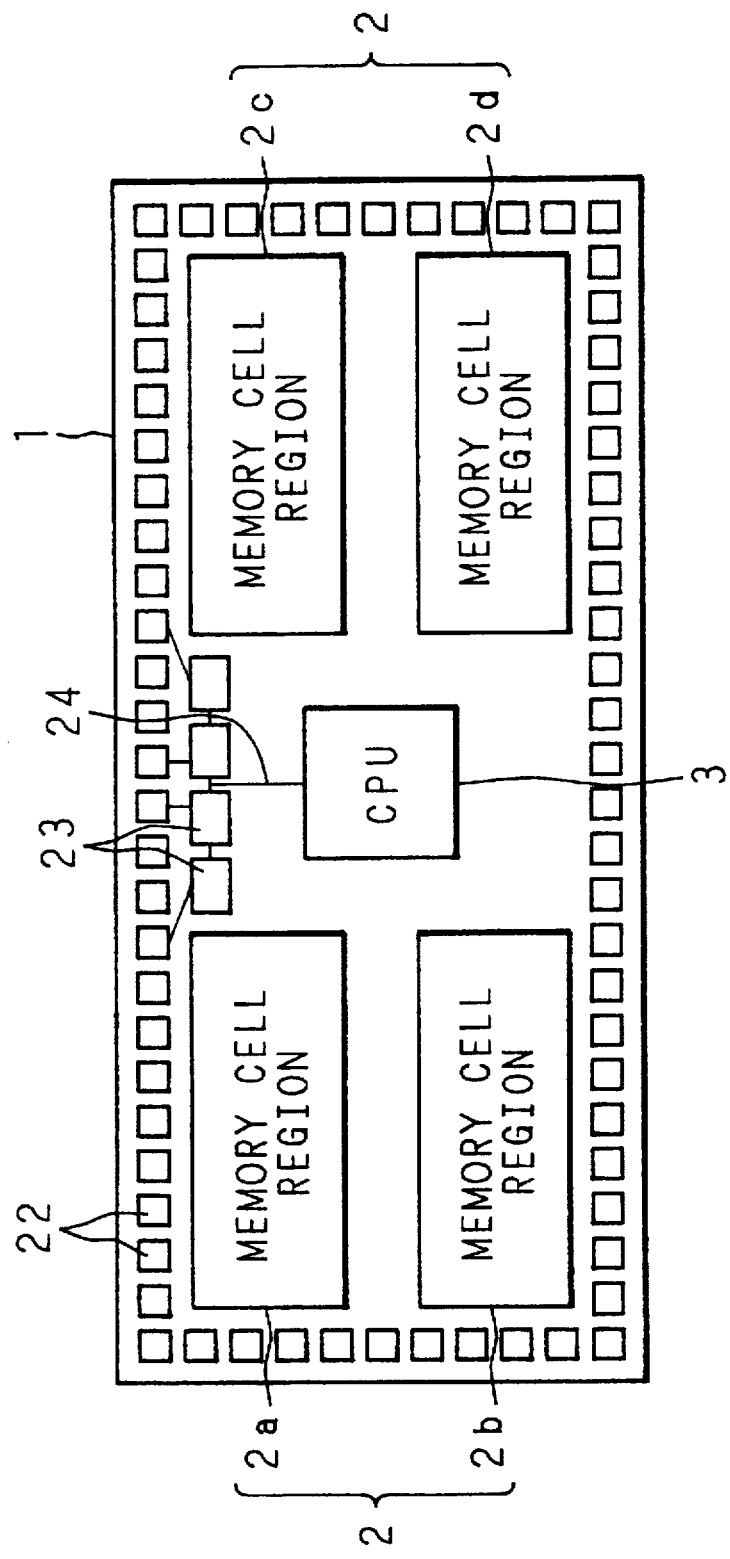
FIG. 52 is a schematic plan view showing an Example 37 of the present invention.

FIG. 52 is a schematic plan view showing Example 37 of the present invention. Provided on the peripheral edge of the chip are pads 22 for connecting with external pins by bonding. In order to allow the pads 22 to synchronize with the CPU 3 to drive, latches 23 connected to the CPU 3 via a clock signal line 24 are connected to the pads 22. In this Example, the latches 23 are provided on the periphery of the CPU 3.

Providing the latches 23 near the CPU 3 allows the length of the clock signal line 24 to be shortened, and the skew of the clock signal to be reduced.

Examples of the layout of the bus where the configuration shown in FIG. 8 is used will be explained hereinafter.

In the following drawings, the same components as those of FIG. 8 are designated by the same numerals.

EXAMPLE 38

Figure 53:
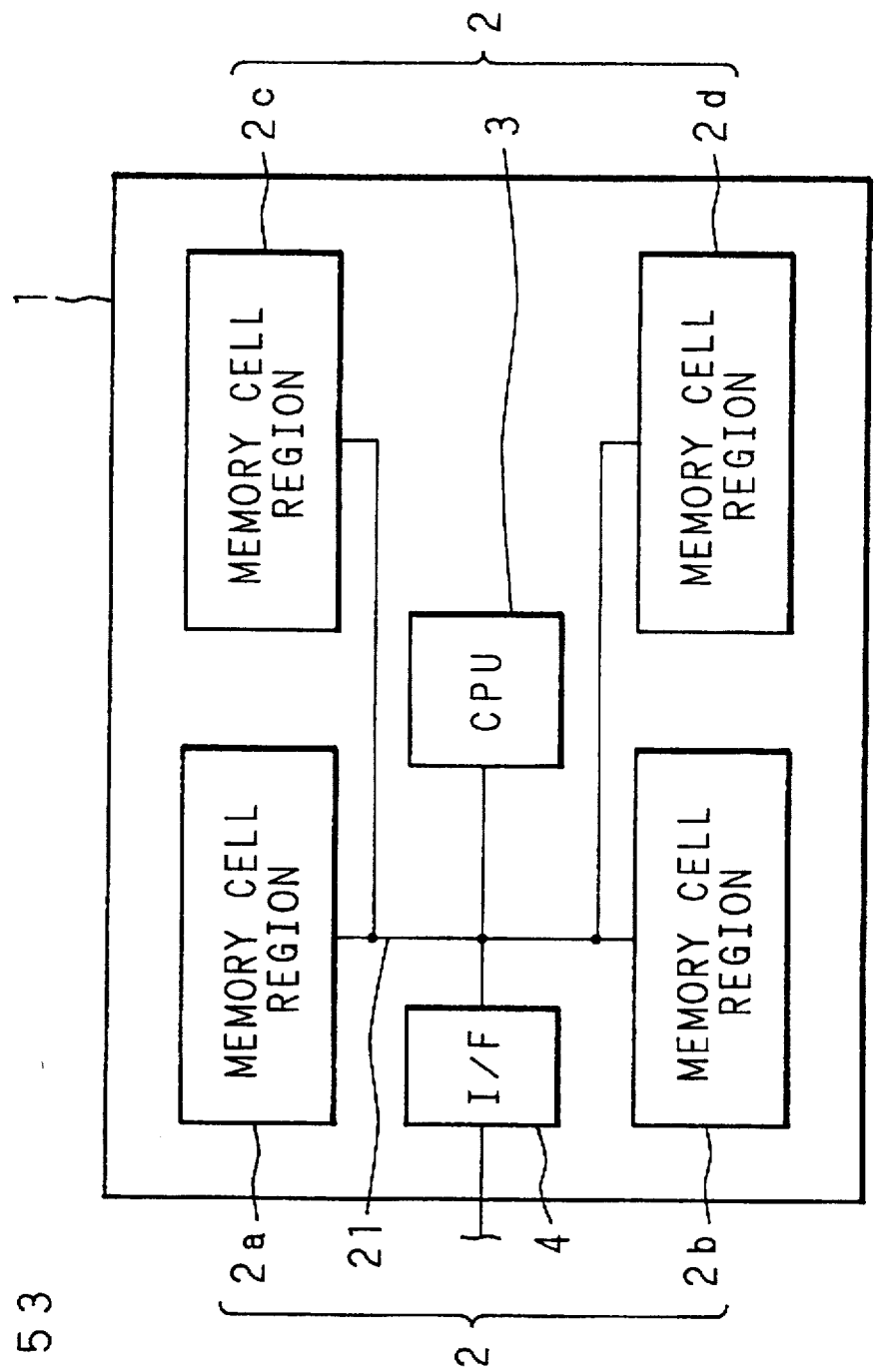
FIG. 53 is a schematic plan view showing an Example 38 of the present invention.

FIG. 53 is a schematic plan view showing Example 38 of the present invention. The bus 21 is drawn from the long sides of the memory cell regions 2a and 2b and connected therebetween, while the bus 21 drawn from the long sides of the memory cell regions 2c and 2d and the bus 21 drawn from the left side of the CPU 3 are connected to the bus 21 between the memory cell regions 2a and 2b.

EXAMPLE 39

Figure 54:
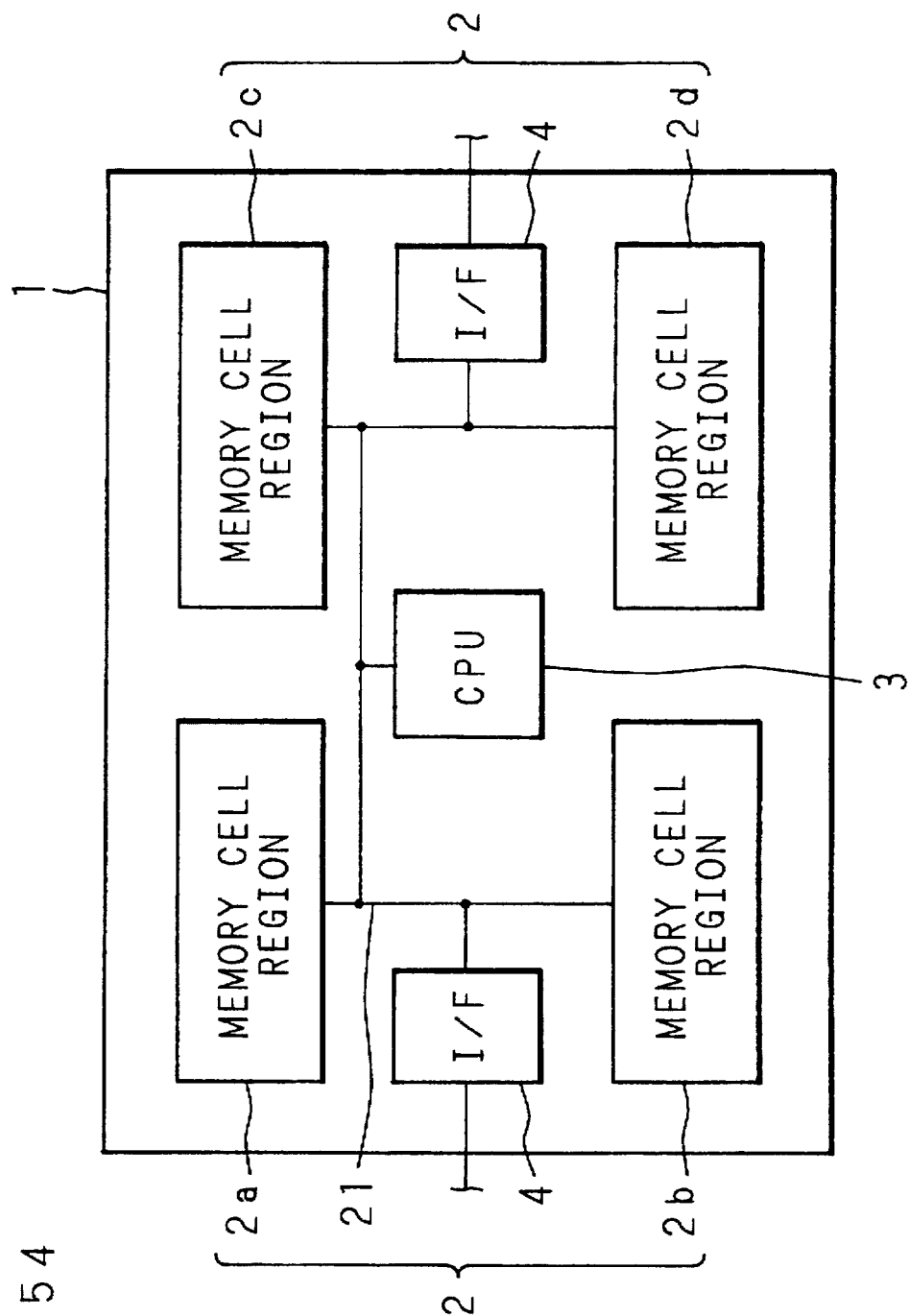
FIG. 54 is a schematic plan view showing an Example 39 of the present invention.

FIG. 54 is a schematic plan view showing Example 39 of the present invention. The bus 21 is drawn from the long sides of the memory cell regions 2a and 2b and connected therebetween, while the bus 21 is drawn from the long sides of the memory cell regions 2c and 2d. The bus 21 drawn from the upper side of the CPU 3 is connected through the lateral bus 21 to the above-mentioned buses 21, 21.

The Example 38 is suitable where a signal is outputted from one side (left side) of the chip 1, while the Example 39 is suitable where a signal is outputted from two sides (left and right sides).

EXAMPLE 40

Figure 55:
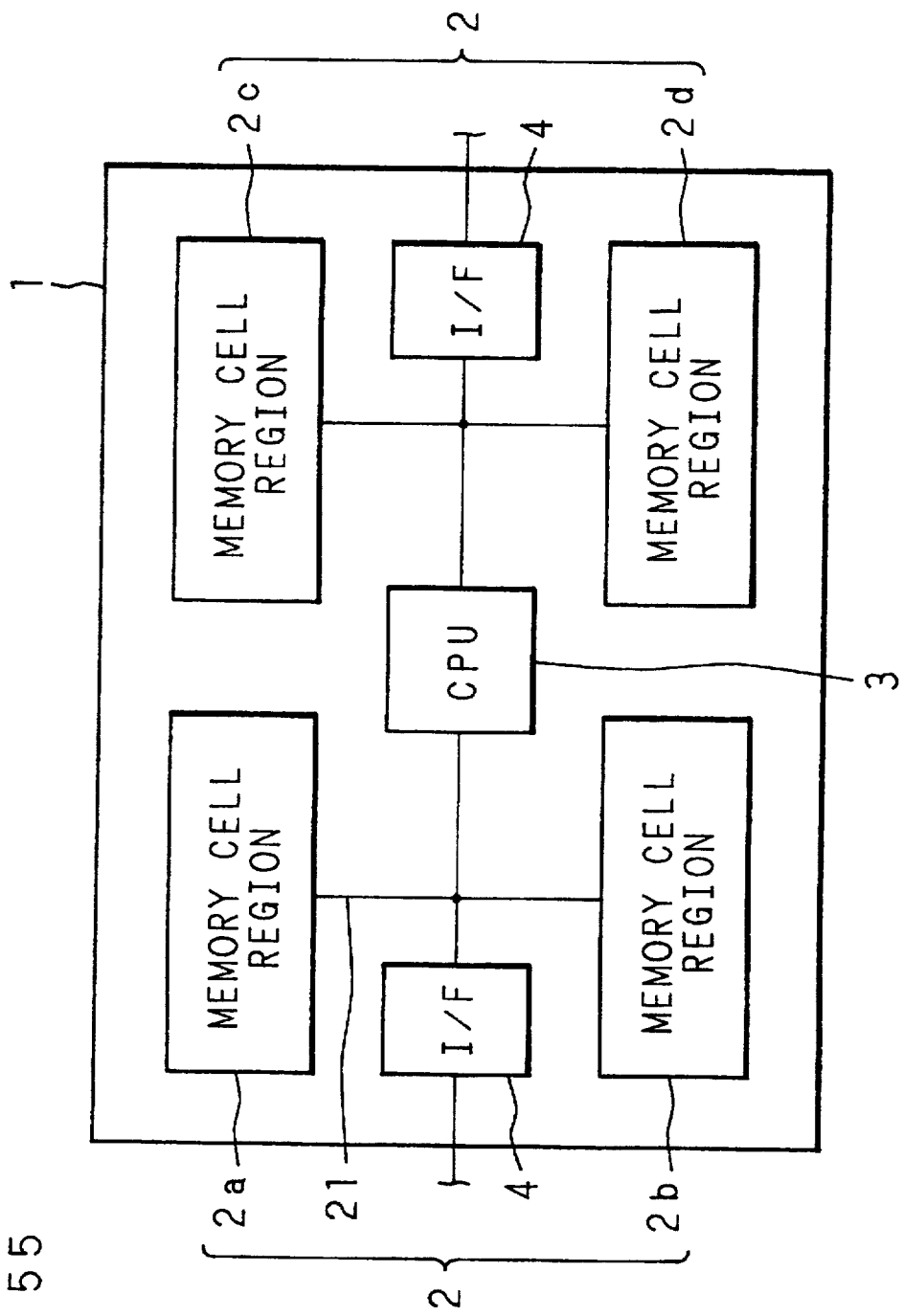
FIG. 55 is a schematic plan view showing an Example 40 of the present invention.

FIG. 55 is a schematic plan view showing Example 40 of the present invention. The bus 21 is drawn from the long sides of the memory cell regions 2a and 2b and connected therebetween, while the bus 21 is drawn from the long sides of the memory cell regions 2c and 2d and connected therebetween. The buses 21, 21 drawn in the lateral direction from the left and right sides of the CPU 3 are connected the above-mentioned buses 21, 21, respectively.

In this Example, the bus 21 connected to the memory cell regions 2a, 2b and the bus 21 connected to the memory cell regions 2c, 2d can be separately controlled and accessed in parallel. Therefore, this configuration is suitable where the memory cell regions 2a, 2b are different in size or application from the memory cell regions 2c, 2d.

EXAMPLE 41

Figure 56:
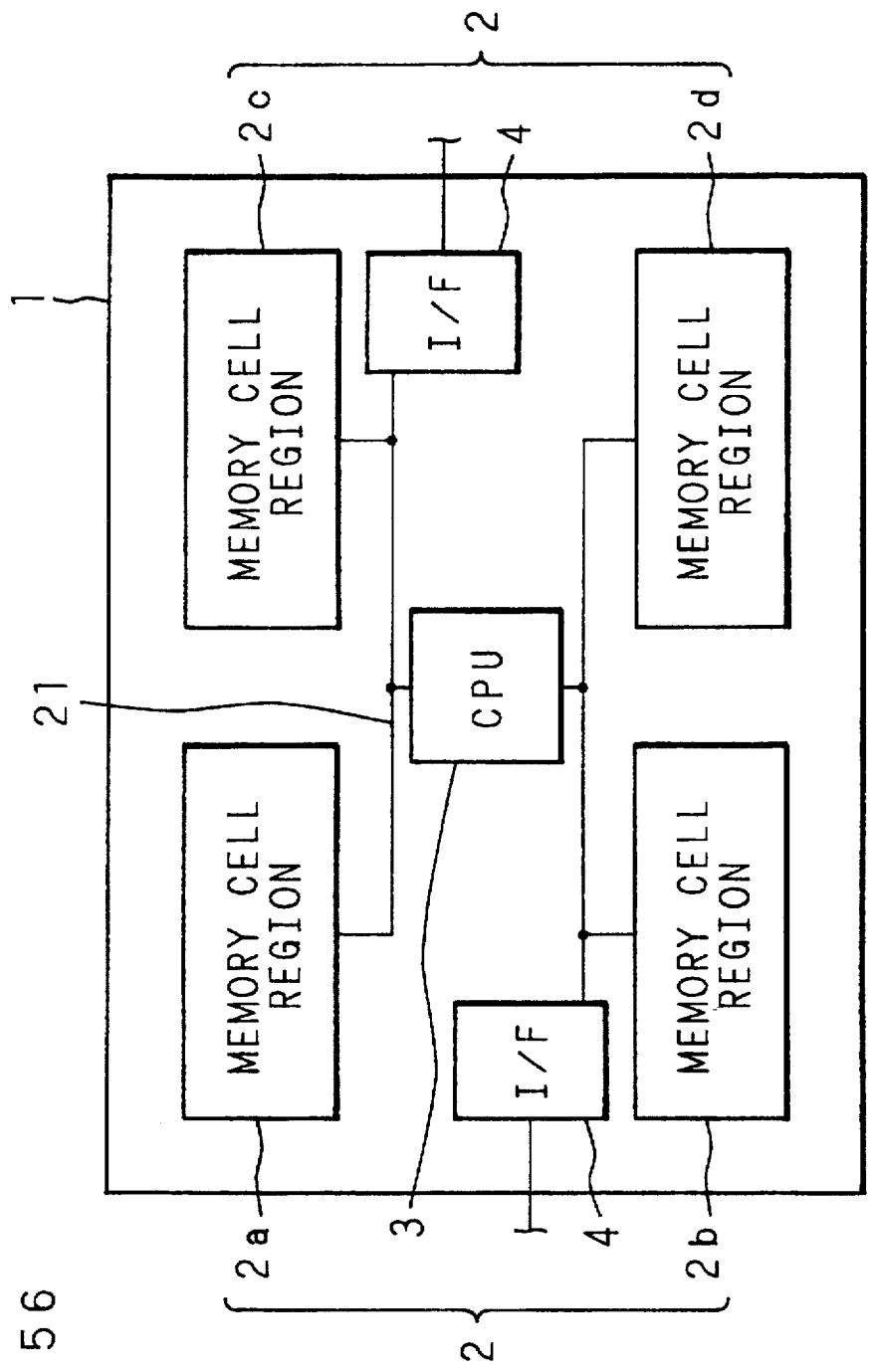
FIG. 56 is a schematic plan view showing an Example 41 of the present invention.

FIG. 56 is a schematic plan view showing Example 41 of the present invention. The bus 21 is drawn from the long sides of the memory cell regions 2a and 2c and connected with the lateral bus 21, while the bus 21 is drawn from the long sides of the memory cell regions 2b and 2d and connected with the lateral bus 21. The buses 21, 21 drawn in the vertical direction from the upper and lower sides of the CPU 3 are connected with the above-mentioned lateral buses 21, 21, respectively.

In this Example, the bus 21 connected to the memory cell regions 2a, 2c and the bus 21 connected to the memory cell regions 2b, 2d can be separately controlled and accessed in parallel. Therefore, this configuration is suitable where the memory cell regions 2a, 2c are different in size or application from the memory cell regions 2b, 2d.

EXAMPLE 42

Figure 57:
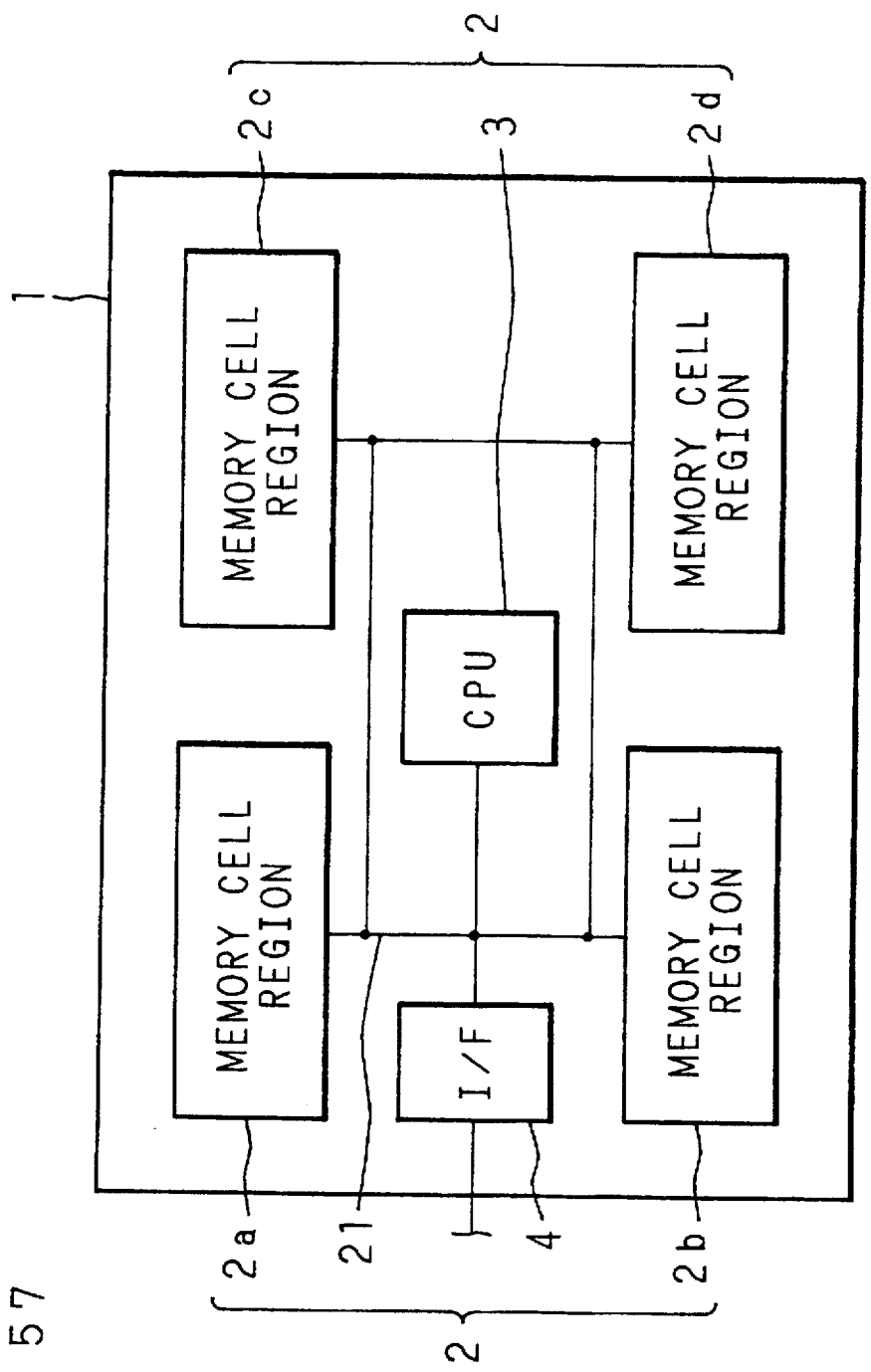
FIG. 57 is a schematic plan view showing an Example 42 of the present invention.

FIG. 57 is a schematic plan view showing Example 42 of the present invention. The bus 21 is drawn from the long sides of the memory cell regions 2a and 2b and connected therebetween, while the bus 21 is drawn from the long sides of the memory cell regions 2c and 2d. The right and left buses 21 are connected to each other by the lateral buses 21 on the upper and lower sides of CPU 3. The bus 21 drawn from the left side of CPU 3 is connected with the vertical bus 21 on the left side.

Although this configuration allows substantially the same effect as the Example 39 (FIG. 54) to be obtained, the length of the bus 21 is longer than that for the Example 39.

EXAMPLE 43

Figure 58:
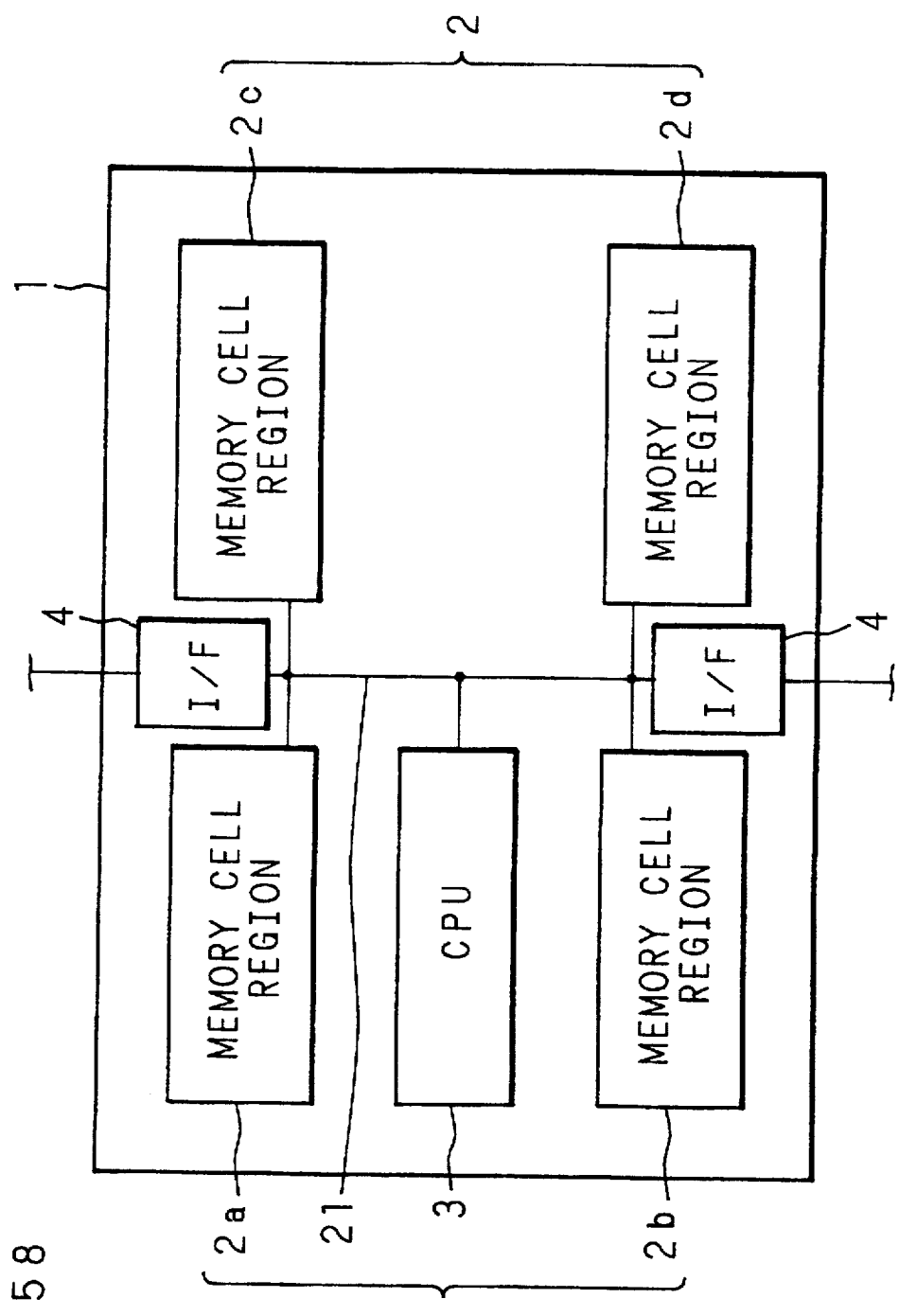
FIG. 58 is a schematic plan view showing an Example 43 of the present invention.

FIG. 58 is a schematic plan view showing Example 43 of the present invention. The bus 21 is drawn from the short sides of the memory cell regions 2a and 2c and connected therebetween, while the bus 21 is drawn from the short sides of the memory cell regions 2b and 2d. The bus 21 drawn from the right side of the CPU 3 is connected with the vertical bus 21.

In the Example 43, the CPU 3 is arranged in a manner to be put to one side, so that another circuit such as the peripheral circuit 5 can be arranged on the other side as shown in the Example 44 described below.

Since in the Examples 38 through 43, as with the examples corresponding to FIG. 7 shown previously, examples with one bus interface 4 or without it can be easily considered, this Example shows only a configuration of providing two (or one) bus interfaces 4.

EXAMPLE 44

Figure 59:
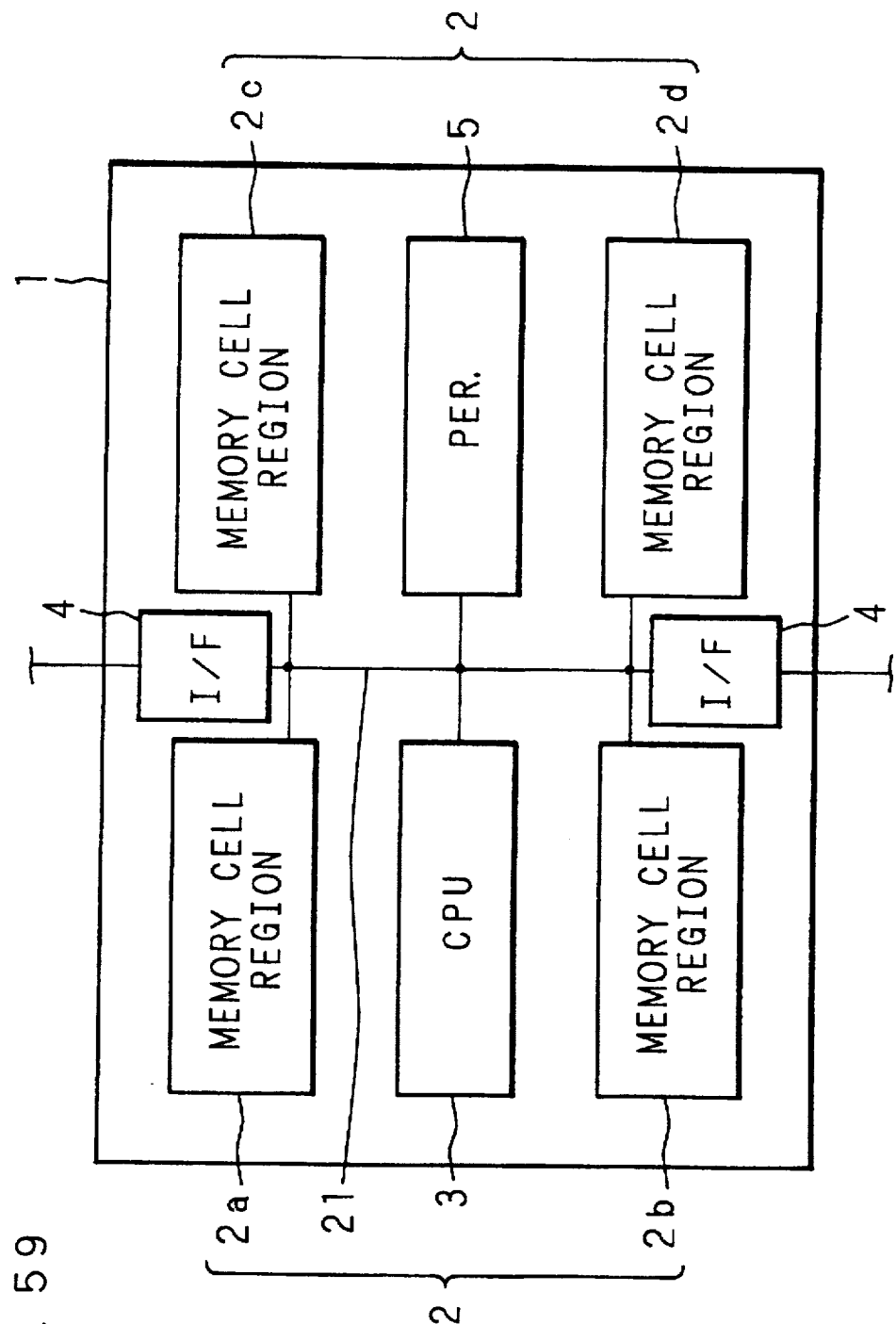
FIG. 59 is a schematic plan view showing an Example 44 of the present invention.

FIG. 59 is a schematic plan view showing Example 44 of the present invention. This Example is configured such that in the configuration of FIG. 58 (Example 43), a peripheral circuit 5 is installed on the opposite side of the CPU 3 with respect to the vertical bus 21, and connected with the bus 21.

In this Example, the bus 21 connecting among the memory cell regions 2a, 2b, 2c, 2d, the CPU 3 and the bus interfaces 4 is short. Also, in this Example, either of the bus interfaces 4 may be provided.

Also, as with the examples corresponding to FIG. 7, the CPU 3 and the peripheral circuit 5 may be placed with each other on one side, and the bus interfaces 4 be arranged in the space thus provided. Further, instead of providing the peripheral circuit 5, the configuration may be of a multi-processor including a plurality of CPUs 3.

Further, it will be appreciated that the configurations of the Examples 15 through 32 can be applied to the examples corresponding to the FIG. 8.

The memory 2 may be various kinds of memory such as SRAM, EPRAM, ROM, erasable ROM and flash memory as well as DRAM. The number of the memory cell region rows may be three or more, and the memory cell region rows may have one or three or more memory cell regions.

Since Examples based on claims and those combining the Examples can be analogized, though the above-mentioned Examples are not all, the illustration and description thereof will be omitted.

As described above, in the microcomputer in connection with the present invention, the processor is arranged between the memory cell regions, so that the distance between the processor and the memory cell regions is made shortened and substantially the same. Signal output terminals can be concentrated on one side of the chip or decentralized onto the two sides thereof. Providing the bus interface on the chip output terminal side allows signals to be outputted at a high speed. A space exists between memory cell region rows, so that in the space, circuits such as peripheral circuits, bus interfaces, and latch circuits between pads and processors, and further processors can be provided. These allow the processing capability of the microcomputer in which processors and memory are integrated on one chip to be improved.

As this invention may be embodied in several forms without departing from the spirit of essential characteristics thereof, the present Example is therefore illustrative and not restrictive, since the scope of the invention is defined by the appended claims rather than by the description preceding them, and all changes that fall within metes and bounds of claims, or equivalence of such metes and bounds thereof are therefore intended to be embraced by the claims.

What is claimed is:

1. A microcomputer comprising:

at least one processor; and a first memory array having a continuous address space and being a single type memory array, said at least one processor and the first memory array being integrated on a common chip; and the first memory array is divided into a plurality of sub-arrays and, the at least one processor is arranged between the plurality of sub-arrays; wherein when a unit of reading out of and writing into by the first memory array is N×M (N and M are positive integral number) bits, the first memory array is divided into M number of sub-arrays of which unit of reading out and writing into is N bits, and M number of sub-arrays are respectively connected to the processor through an N bit data bus.

2. The microcomputer as set forth in claim 1, wherein a region where the M number of sub-arrays are arranged on the chip is divided into at least two arrangement regions with the at least one processor arranged between the at least two arrangement region.

3. The microcomputer as set forth in claim 2, wherein each of the plurality of sub-arrays of the first memory array has a generally rectangular shape with parallel long sides and parallel short sides, in each arrangement region, a long side of each sub-array is arranged adjacent to a long side of another sub-array, and the processor is arranged between short sides of the sub-arrays of the at least two arrangement regions.

4. The microcomputer as set forth in claim 3, further comprising a peripheral circuit arranged side by side with the processor between the at least two arrangement regions.

5. The microcomputer as set forth in claim 4, further comprising a bus interface arranged at a position opposite the processor and the peripheral circuit with respect to the bus and between the at least two arrangement regions.

6. The microcomputer as set forth in claim 3, further comprising a peripheral circuit arranged at a position opposite to the processor with respect to the bus and between the at least two arrangement regions.

7. The microcomputer as set forth in claim 6, further comprising a bus interface arranged side by side with the processor and between the at least two arrangement regions.

8. The microcomputer as set forth in claim 6, further comprising a bus interface arranged side by side with the peripheral circuit and between the at least two arrangement regions.

9. The microcomputer as set forth in claim 3, further comprising:

M number of cache memories corresponding to the M number of sub-arrays respectively, wherein
each cache memory is arranged adjacent to a corresponding sub-array and between the corresponding sub-array and a corresponding processor.

10. The microcomputer as set forth in claim 3, further comprising a plurality of processors arranged between the short sides of the sub-arrays of the at least two arrangement regions.

11. The microcomputer as set forth in claim 2, wherein each of the plurality of sub-arrays of the first memory array has a generally rectangular shape with parallel long sides and parallel short sides, in each arrangement regions, a short side of each sub-array is arranged adjacent to a short side of another sub-array, and the processor is arranged between long sides of the sub-arrays of the at least two arrangement regions.

12. A microcomputer as set forth in claim 2, further comprising:

a plurality of peripheral bus interface circuits, wherein
a peripheral bus interface circuit is arranged in the at least two arrangement regions separately, each of the peripheral bus interface circuits is connected to at least one of the M number of sub-arrays of the first memory array through the N bit data bus.

13. A microcomputer comprising:

a processor;

a memory array, the processor and memory being integrated on a common chip, the memory array being divided into a plurality of sub-arrays with each sub-array having a plurality of memory cells arranged in a plurality of rows and columns, the plurality of sub-arrays being arranged in a plurality of linear rows;

a plurality of pads arranged on a periphery of the chip for connection with external pins; and a plurality of latch circuits for holding data which the processor sends or receives through the plurality of pads, wherein
said processor is arranged between said plurality of linear rows of said plurality of sub-arrays, and
said plurality of latch circuits are arranged on a periphery of said processor between said plurality of linear rows of said plurality of sub-arrays.

* * * * *